(12) United States Patent
Johnson et al.

(10) Patent No.: US 12,030,980 B2
(45) Date of Patent: Jul. 9, 2024

(54) REPROCESSABLE COMPOSITIONS

(71) Applicant: Massachusetts Institute of Technology, Cambridge, MA (US)

(72) Inventors: Jeremiah A. Johnson, Boston, MA (US); Peyton Shieh, Cambridge, MA (US); Keith Husted, Boston, MA (US); Christopher M. Brown, Boston, MA (US); Samantha Lynn Kristufek, Lubbock, TX (US)

(73) Assignee: Massachusetts Institute of Technology, Cambridge, MA (US)

( * ) Notice: Subject to any disclaimer, the term of this patent is extended or adjusted under 35 U.S.C. 154(b) by 178 days.

(21) Appl. No.: 17/538,098

(22) Filed: Nov. 30, 2021

(65) Prior Publication Data

US 2022/0251288 A1 Aug. 11, 2022

Related U.S. Application Data

(60) Provisional application No. 63/144,437, filed on Feb. 1, 2021.

(51) Int. Cl.
  *C08G 61/02* (2006.01)
  *C08G 61/12* (2006.01)

(52) U.S. Cl.
  CPC ............. *C08G 61/02* (2013.01); *C08G 61/12* (2013.01); *C08G 2261/314* (2013.01);
  (Continued)

(58) Field of Classification Search
  CPC .. C08G 61/02; C08G 61/12; C08G 2261/314; C08G 2261/3222; C08G 2261/418;
  (Continued)

(56) References Cited

U.S. PATENT DOCUMENTS 2,482,276 A 9/1949 Hyde et al.
2,676,182 A 4/1954 Daudt et al.
(Continued)

FOREIGN PATENT DOCUMENTS

JP H05-112739 A1 5/1993
WO WO 2013/169739 A1 11/2013
(Continued)

OTHER PUBLICATIONS

Johnson et al., Nature Chemistry | vol. 11, Dec. 2019, 1124-1132.*
(Continued)

*Primary Examiner* — Shane Fang
(74) *Attorney, Agent, or Firm* — Wolf, Greenfield & Sacks, P.C.

(57) ABSTRACT

The present disclosure provides compositions comprising:
  a) a copolymer prepared by a method comprising polymerizing in the presence of a metathesis catalyst:
    i) a first monomer, wherein each instance of the first monomer is independently of the formula:

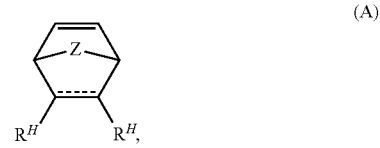

or salt thereof;
    ii) a second monomer, wherein each instance of the second monomer is independently of the formula:
(Continued)

| | | |
|---|---|---|
| 10,591,818 | B2 | 3/2020 Knapp et al. |
| 10,988,491 | B2 | 4/2021 Johnson et al. |
| 11,897,905 | B2 | 2/2024 Johnson et al. |
| 2001/0006988 | A1 | 7/2001 Kuhnle et al. |
| 2008/0063937 | A1 | 3/2008 Lee et al. |
| 2018/0312634 | A1 | 11/2018 Chung |
| 2019/0039617 | A1 | 2/2019 Miura et al. |
| 2020/0055879 | A1 | 2/2020 Johnson et al. |
| 2020/0239626 | A1 | 7/2020 Miyake et al. |
| 2021/0113701 | A1 | 4/2021 Johnson et al. |
| 2021/0147598 | A1 | 5/2021 Johnson et al. |
| 2021/0284664 | A1 | 9/2021 Johnson et al. |
| 2021/0386861 | A1 | 12/2021 Johnson et al. |
| 2023/0416283 | A1 | 12/2023 Johnson et al. |

FOREIGN PATENT DOCUMENTS

| | | | |
|---|---|---|---|
| WO | WO 2017/208209 | A1 | 12/2017 |
| WO | WO 2020/037236 | A1 | 2/2020 |
| WO | WO 2022/099210 | A1 | 5/2022 |
| WO | WO 2022/212752 | A1 | 10/2022 |

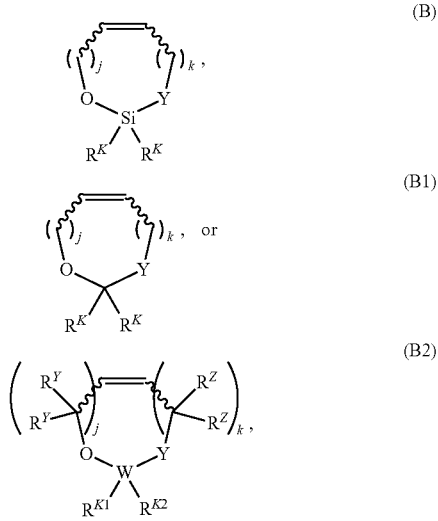

or a salt thereof;
  iii) optionally a third monomer, wherein the third monomer is different from the first monomer and the second monomer; and
  iv) optionally a reprocessing catalyst; and
b) optionally the reprocessing catalyst;
wherein the reprocessing catalyst is a Brønsted acid, Lewis acid, Brønsted base, Lewis base, or a salt thereof;
provided that the composition comprises at least one of the reprocessing catalyst of iv) and the reprocessing catalyst of b).

The compositions may be reprocessed (e.g., remolded) under elevated temperature and/or elevated pressure.

36 Claims, 14 Drawing Sheets

(52) U.S. Cl.
  CPC ............... C08G 2261/3222 (2013.01); C08G 2261/418 (2013.01); C08G 2261/70 (2013.01)
(58) Field of Classification Search
  CPC .................. C08G 2261/70; C09D 171/00; C09D 171/02; C09D 171/08; C09D 171/14; C09D 173/00; C09D 173/02; C12Q 1/6874; C12Q 1/6886; C12Q 2600/118; C12Q 2600/156; C12Q 2600/112
  See application file for complete search history.

(56) References Cited

U.S. PATENT DOCUMENTS

| | | |
|---|---|---|
| 3,256,308 A | 6/1966 | Pawloski et al. |
| 3,337,598 A | 8/1967 | Pawloski et al. |
| 4,510,136 A | 4/1985 | Moberg |
| 5,811,515 A | 9/1998 | Grubbs et al. |
| 7,183,059 B2 | 2/2007 | Verdine et al. |
| 8,829,206 B2 | 9/2014 | Terrill et al. |
| 8,829,207 B2 | 9/2014 | Billodeaux et al. |
| 8,958,920 B2 | 2/2015 | Dazai |
| 8,969,598 B2 | 3/2015 | Terrill et al. |
| 9,381,253 B2 | 7/2016 | Johnson et al. |
| 9,944,730 B2 | 4/2018 | Rhodes et al. |

OTHER PUBLICATIONS

PCT/US/2021/061135, dated Apr. 28, 2022, International Search Report and Written Opinion.
International Preliminary Report on Patentability for Application No. PCT/US2021/061135 dated Aug. 10, 2023.
International Preliminary Report on Patentability for Application No. PCT/US2021/058668 dated May 19, 2023.
Invitation to Pay Additional Fees for Application No. PCT/US2023/062223 dated Apr. 20, 2023.
International Search Report and Written Opinion for Application No. PCT/US2023/062223 dated Jul. 19, 2023.
Alvaredejo et al., Polyoxazoline-Based Bottlebrush and Brush-Arm Star Polymers via ROMP: Syntheses and Applications as Organic Radical Contrast Agents. ACS Macro Lett. Apr. 16, 2019;8(4):473-478. doi: 10.1021/acsmacrolett.9b00016. Epub Apr. 4, 2019.
Amass, A.J., Ring-opening metathesis polymerization of cyclic alkenes. In: New Methods of Polymer Synthesis. 1991. J.R. Ebdon, Ed. Blackie & Son Ltd., Glasgow, Scotland. Chapter 3:209 pages.
Bingham et al., Degradable vinyl copolymers through thiocarbonyl addition-ring-opening (TARO) polymerization. Chem Commun. 2019;55:55-8. doi: 10.1039/C8CC08287A.
Dutta et al., Dilute solution structure of bottlebrush polymers. Soft Matter. Apr. 3, 2019;15(14):2928-2941. doi: 10.1039/c9sm00033j.
Ekladious et al., Polymer-drug conjugate therapeutics: advances, insights and prospects. Nat Rev Drug Discov. Apr. 2019;18(4):273-294. doi: 10.1038/s41573-018-0005-0.
Foster et al., Getting into Shape: Reflections on a New Generation of Cylindrical Nanostructures' Self-Assembly Using Polymer Building Blocks. J Am Chem Soc. Feb. 20, 2019;141(7):2742-2753. doi: 10.1021/jacs.8b08648. Epub Feb. 8, 2019.
Ho et al., An overview on biodegradation of polystyrene and modified polystyrene: the microbial approach. Crit Rev Biotechnol. Mar. 2018;38(2):308-320. doi: 10.1080/07388551.2017.1355293. Epub Aug. 1, 2017.
Kodger, T., Mechanical Failure in Colloidal Gels. Dissertation. Harvard University. Dec. 2014. 255 pages.
Li et al., Thermoresponsive PNIPAAM bottlebrush polymers with tailored side-chain length and end-group structure. Soft Matter. Mar. 28, 2014;10(12):2008-15. doi: 10.1039/c3sm52614c.
Perrier et al., Macromolecular design via reversible addition-fragmentation chain transfer (RAFT)/xanthates (MADIX) polymerization. J Polym Sci. Nov. 15, 2005;43(22):5347-93. doi: 10.1002/pola.20986.
Qiu et al., ROMP synthesis of benzaldehyde-containing amphiphilic block polynorbornenes used to conjugate drugs for pH-responsive release. React Func Polym. Jul. 2018;128:1-15. doi: 10.1016/j.reactfunctpolym.2018.03.010.
Shibuya et al., Mikto-Brush-Arm Star Polymers via Cross-Linking of Dissimilar Bottlebrushes: Synthesis and Solution Morphologies.

(56) References Cited

OTHER PUBLICATIONS

ACS Macro Lett. Sep. 19, 2017;6(9):963-968. doi: 10.1021/acsmacrolett.7b00529. Epub Aug. 21, 2017.
Shim et al., Fully crosslinked poly(styrene-co-divinylbenzene) microspheres by precipitation polymerization and their superior thermal properties. J Polym Sci. Feb. 15, 2004;42(4):835-45. doi: 10.1002/pola.11028.
Sowers et al., Redox-responsive branched-bottlebrush polymers for in vivo MRI and fluorescence imaging. Nat Commun. Nov. 18, 2014;5:5460. doi: 10.1038/ncomms6460.
Tu et al., Recent advances towards applications of molecular bottlebrushes and their conjugates. Curr Opin Solid State Mater Sci. Feb. 2019;23(1):50-61. doi: 10.1016/j.cossms.2019.01.003.
International Search Report and Written Opinion for PCT/US2019/046872, dated Oct. 29, 2019.
International Preliminary Report on Patentability for PCT/US2019/046872, dated Mar. 4, 2021.
International Search Report and Written Opinion for Application No. PCT/US2020/050927 dated Jan. 21, 2021.
International Preliminary Report on Patentability for PCT/US2020/050927, dated May 27, 2022.
Invitation to Pay Additional Fees for Application No. PCT/US2021/058668 dated Jan. 10, 2022.
International Search Report and Written Opinion for Application No. PCT/US2021/058668 dated Mar. 10, 2022.
Invitation to Pay Additional Fees for Application No. PCT/US2022/031759 dated Aug. 16, 2022.
International Search Report and Written Opinion for Application No. PCT/US2022/031759 dated Aug. 8, 2022.
[No Author Listed], Dimethyl-[(1R)-1-naphthalen-1-yl-2-[(2-naphthalen-2-yloxyacetyl)amino]ethyl]azanium. PubChem CID No. 8701426. Feb. 12, 2015. Retrieved from <https://pubchem.ncbi.nlm.nih.gov/compound/8701426> on Nov. 4, 2022. 7 pages.
Altuna et al., Self-healable polymer networks based on the cross-linking of epoxidised soybean oil by an aqueous citric acid solution. Green Chem. Sep. 9, 2013;15(12):3360-6. doi: 10.1039/C3GC41384E.
Asaro et al., Recycling of rubber wastes by devulcanization. Res Conserv Rec. Jun. 2018;133:250-62. doi: 10.1016/j.resconrec.2018.02.016.
Autenrieth et al., Stereospecific Ring-Opening Metathesis Polymerization (ROMP) of endo-Dicyclopentadiene by Molybdenum and Tungsten Catalysts. Macromolecules. Apr. 2015;48(8):2480-92. doi: 10.1021/acs.macromol.5b00123.
Bang et al., Polydicyclopentadiene aerogels from first- versus second-generation Grubbs' catalysts: a molecular versus a nanoscopic perspective. J Sol-Gel Sci Technol. 2015;75(2):460-74. doi: 10.1007/s10971-015-3718-0.
Bento et al., Nucleophilic substitution at silicon (SN2@Si) via a central reaction barrier. J Org Chem. Mar. 16, 2007;72(6):2201-7. doi: 10.1021/jo070076e. Epub Feb. 15, 2007.
Blackmore, P.M., Synthesis and properties of stereoregular fluoropolymers. Doctoral thesis at Durham University. 1986. pp. i-iii, 46, 62. Accessed from <http://etheses.dur.ac.uk/6795/>.
Boadi et al., Alternating Ring-Opening Metathesis Polymerization Provides Easy Access to Functional and Fully Degradable Polymers. Macromolecules. Jul. 28, 2020;53(14):5857-5868. doi: 10.1021/acs.macromol.0c01051. Epub Jul. 16, 2020.
Capelot et al., Catalytic Control of the Vitrimer Glass Transition. ACS Macro Lett. Jul. 17, 2012;1(7):789-792. doi: 10.1021/mz300239f. Epub Jun. 11, 2012.
Chen et al., Characterization of thermally reworkable thermosets: materials for environmentally friendly processing and reuse. Polymer. Jan. 2002;43(1):131-9. doi: 10.1016/S0032-3861(01)00605-X.
Chen et al., Thermally Crosslinked Functionalized Polydicyclopentadiene with a High $T_g$ and Tunable Surface Energy. ACS Omega. Oct. 6, 2016;1(4):532-540. doi: 10.1021/acsomega.6b00193. Erratum in: ACS Omega. Jun. 9, 2017;2(6):2593.

Christensen et al., Closed-loop recycling of plastics enabled by dynamic covalent diketoenamine bonds. Nat Chem. May 2019;11(5):442-448. doi: 10.1038/s41557-019-0249-2. Epub Apr. 22, 2019.
Cole et al., Microplastics as contaminants in the marine environment: A review. Mar Pol Bull. Dec. 2011;62(12):2588-97. doi: 10.1016/j.marpolbul.2011.09.025.
Corey et al., Diisopropylsilyl ditriflate and di-tert-butylsilyl ditriflate: new reagents for the protection of diols. Tetrahedron Letters. 1982;23(47):4871-4874.
Corma et al., Formation and hydrolysis of acetals catalysed by acid Faujasites. Appl Catal. Mar. 12, 1990;59(1):333-40. doi: 10.1016/S0166-9834(00)82207-1.
Cuthbert et al., Structure of the Thermally Induced Cross-Link in C-Linked Methyl Ester-Functionalized Polydicyclopentadiene (fPDCPD). Macromolecules. Feb. 28, 2018;51(5):2038-47. doi: 10.1021/acs.macromol.7b02750.
Cypryk et al., Mechanism of the Acid-Catalyzed Si—O Bond Cleavage in Siloxanes and Siloxanols. A Theoretical Study. Organometallics. Apr. 24, 2002;21(11):2165-75. doi: 10.1021/om011055s.
Davidson et al., Polymerization of Dicyclopentadiene: A Tale of Two Mechanisms. Macromolecules. 1996;29:786-8.
Davies et al., Protection of hydroxy groups by silylation: use in peptide synthesis and as lipophilicity modifiers for peptides. J Chem Soc Perkin Trans. 1;1992:3043-8. doi: 10.1039/P19920003043.
Defauchy et al., Kinetic analysis of polydicyclopentadiene oxidation. Polym Degrad Stab. Aug. 2017;142:169-77. doi: 10.1016/j.polymdegradstab.2017.06.005.
Delancey et al., Controlling crosslinking in thermosets via chain transfer with monoterpenes. Polym Chem. Jun. 20, 2011;49(17):3719-27. doi: 10.1002/pola.24808.
Denissen et al., Chemical control of the viscoelastic properties of vinylogous urethane vitrimers. Nat Commun. Mar. 20, 2017;8:14857. doi: 10.1038/ncomms14857.
Dong et al., A Simple and Versatile Method for the Formation of Acetals/Ketals Using Trace Conventional Acids. ACS Omega. May 7, 2018;3(5):4974-4985. doi: 10.1021/acsomega.8b00159.
Elder et al., Nanovoid formation and mechanics: a comparison of poly(dicyclopentadiene) and epoxy networks from molecular dynamics simulations. Soft Matter. 2016;12:4418-34. doi: 10.1039/C6SM00691D.
Fedorenko et al., Facial selectivity in the reaction of dihalocarbenes with 2-substituted 4,7-dihydro-1,3-dioxepines. Mendeleev Comm. May 29, 2007;17:170-1. doi: 10.1016/J.MENCOM.2007.05.013.
Feist et al., Enol Ethers Are Effective Monomers for Ring-Opening Metathesis Polymerization: Synthesis of Degradable and Depolymerizable Poly(2,3-dihydrofuran). J Am Chem Soc. Dec. 27, 2019;142(3):1186-9. doi: 10.1021/jacs.9b11834.
Flory, P.J., Molecular Size Distribution in Three Dimensional Polymers. I. Gelation. J Am Chem Soc. Nov. 1, 1941;63(11):3083-90. doi: 10.1021/ja01856a061.
Fortman et al., Approaches to Sustainable and Continually Recyclable Cross-Linked Polymers. ACS Sus Chem Eng. Aug. 26, 2018;6(9):11145-59. doi: 10.1021/acssuschemeng.8b02355.
Fortman et al., Mechanically activated, catalyst-free polyhydroxyurethane vitrimers. J Am Chem Soc. Nov. 11, 2015;137(44):14019-22. doi: 10.1021/jacs.5b08084. Epub Nov. 2, 2015.
Frauenrath et al., Synthesis of 2,3-substituted tetrahydropyrans by rearrangement of 5,6-dihydro-4H-1,3-dioxocins. Tetrahedron Lett. Jan. 1, 1990;31(5):649-50. doi: 10.1016/S0040-4039(00)94591-X.
Furstner et al., Alkyne metathesis: development of a novel molybdenum-based catalyst system and its application to the total synthesis of epothilone A and C. Chemistry. Dec. 17, 2001;7(24):5299-317. doi: 10.1002/1521-3765(20011217)7:24<5299::aid-chem5299>3.0.co;2-x.
Furstner et al., Mo[N(t-Bu)(Ar)]3 Complexes As Catalyst Precursors: In Situ Activation and Application to Metathesis Reactions of Alkynes and Diynes. J Am Chem Soc. Sep. 23, 1999;121(40):9453-4. doi: 10.1021/ja991340r.

(56) References Cited

OTHER PUBLICATIONS

Gallivan et al., A neutral, water-soluble olefin metathesis catalyst based on an N-heterocyclic carbene ligand. Tetrahedron Lett. Apr. 11, 2005;46(15):2577-80. doi: 10.1016/j.tetlet.2005.02.096.

Grubbs et al., Ring-Closing Metathesis and Related Processes in Organic Synthesis. Acc Chem Res. Nov. 1, 1995;28(11):446-52. doi: 10.1021/ar00059a002.

Gu et al., A (Macro)Molecular-Level Understanding of Polymer Network Topology. Trends Chem. Jun. 2019;1(3):318-34. doi: 10.1016/j.trechm.2019.02.017.

Gu et al., A unifying review of polymer networks: from rubbers and gels to porous frameworks. Angew Chemie Int Ed. Jul. 2019;59(13):5022-49. doi: 0.1002/anie.201902900. Author Manuscript, 66 pages.

Gu et al., Mechanism of the reactions of dimethylsilylene with oxetanes. J. Am. Chem. Soc. 1980, 102, 5, 1641-1644.

Gu et al., Polymer Networks: From Plastics and Gels to Porous Frameworks. Angew Chem Int Ed Engl. Mar. 23, 2020;59(13):5022-5049. doi: 10.1002/anie.201902900. Epub Jan. 15, 2020.

Hann et al., The impact of the use of "oxo-degradable" plastic on the environment. European Commission, Directorate-General for Environment. Sep. 20, 2016. doi: 10.2779/992559. 150 pages.

Hartley et al., Photochemistry of Ketone Polymers. II. Studies of Model Compounds. Macromolecules. Sep. 1, 1968;1(5):413-7. doi: 10.1021/ma60005a009.

Herges et al., Synthesis and Fragmentation of 2,2-Diazido-1,3,2-dioxasila-5-cycloheptenes. The Chemical Vapor Deposition of SiO2. J Am Chem Soc. Dec. 18, 1996;18(50):12752-7. doi: 10.1021/ja9615886.

Hilf et al., End Capping Ring-Opening Olefin Metathesis Polymerization Polymers with Vinyl Lactones. J Am Chem Soc. Jul. 23, 2008;130(33):11040-8. doi: 10.1021/ja8022863.

Hilf et al., Heterotelechelic Ring-Opening Metathesis Polymers. Macromolecules. Nov. 16, 2009;43(1):208-12. doi: 10.1021/ma902074y.

Hine et al., Structure property relationships in linear and cross-linked poly(imidonorbornenes) prepared using ring opening metathesis polymerisation (ROMP). Polymer. Nov. 2001;42(23):9413-22. doi: 10.1016/S0032-3861(01)00488-8.

Hoye et al., Silicon tethered ring-closing metathesis reactions for self- and cross-coupling of alkenols. Tetrahedron Letters. Feb. 19, 1999;40(8):1429-1432.

Hu et al., Thermal oxidation aging of polydicyclopentadiene and composites. Polym Comp. Jun. 21, 2016;39(5):1742-51. doi: 10.1002/pc.24125.

Huang et al., Thermal oxidation of Poly(dicyclopentadiene)-kinetic modeling of double bond consumption. Polym Degrad Stab. Aug. 2019;166:258-71. doi: 10.1016/j.polymdegradstab.2019.06.003.

Kaburagi et al., Operationally simple and efficient workup procedure for TBAF-mediated desilylation: application to halichondrin synthesis. Org Lett. Feb. 15, 2007;9(4):723-6. doi: 10.1021/ol063113h.

Kantor et al., The Mechanism of the Acid- and Base-Catalyzed Equilibration of Siloxanes. J Am Chem Soc. Oct. 1, 1954;76(20):5190-7. doi: 10.1021/ja01649a076.

Kawamoto et al., Loops versus Branch Functionality in Model Click Hydrogels. Macromolecules. Dec. 1, 2015;48(24):8980-88. doi: 10.1021/acs.macromol.5b02243.

Kessler et al., Cure kinetics of the ring-opening metathesis polymerization of dicyclopentadiene. J Polym Sci Part A: Polym Chem. May 30, 2002;40:2373-83. doi: 10.1002/pola.10317.

Klimovitskii et al., Conformational isomerism in 3,5,8-trioxabicyclo[5.1.0]octane and its diastereomeric 4-methyl derivatives. A combined IR, X-ray and ab initio study. J Mol Struc. Feb. 28, 2007;828(1-3):147-53. doi: 10.1016/j.molstruc.2006.05.045.

Kloxin et al., Covalent Adaptable Networks (CANs): A Unique Paradigm in Crosslinked Polymers. Macromolecules. Mar. 23, 2010;43(6):2643-2653. doi: 10.1021/ma902596s.

Kovacic et al., Ring-opening Metathesis Polymerisation derived poly(dicyclopentadiene) based materials. Mater Chem Front. Jun. 4, 2020;4:2235-55. doi: 10.1039/D0QM00296H.

Lexer et al., Acrylates as termination reagent for the preparation of semi-telechelic polymers made by ring opening metathesis polymerization. J Polym Sci Part A: Polym Chem. Jan. 1, 2009;47(1):299-305. doi: 10.1002/pola.23137.

Li et al., Reprocessable Polymer Networks via Thiourethane Dynamic Chemistry: Recovery of Cross-link Density after Recycling and Proof-of-Principle Solvolysis Leading to Monomer Recovery. Macromolecules. Oct. 22, 2019;52(21):8207-16. doi: 10.1021/acs.macromol.9b01359.

Li et al., Vitrimers Designed Both To Strongly Suppress Creep and To Recover Original Cross- Link Density after Reprocessing: Quantitative Theory and Experiments. Macromolecules. Jul. 1, 20187;51(15):5537-46. doi: 10.1021/acs.macromol.8b00922.

Liu et al., "Brush-first" method for the parallel synthesis of photocleavable, nitroxide-labeled poly(ethylene glycol) star polymers. J Am Chem Soc. Oct. 3, 2012;134(39):16337-44. doi: 10.1021/ja3067176. Epub Sep. 24, 2012.

Liu et al., Dynamic transfer auto-catalysis of epoxy vitrimers enabled by the carboxylic acid/epoxy ratio based on facilely synthesized trifunctional monoesterified cyclic anhydrides. Eur Polym J. Jul. 15, 2020;135:109881. doi: 10.1016/j.eurpolymj.2020.109881.

Liu et al., Particles without a box: brush-first synthesis of photodegradable PEG star polymers under ambient conditions. J Vis Exp. Oct. 10, 2013;(80):50874. doi: 10.3791/50874.

Long et al., Ballistic Response of Polydicyclopentadiene vs. Epoxy Resins and Effects of Crosslinking. In: Dynamic Behavior of Materials, vol. 1. Conference Proceedings of the Society for Experimental Mechanics. Chapter 37. 2017:285-90. Springer New York LLC. doi: 10.1007/978-3-319-41132-3_37.

Ma et al., Degradable thermosets based on labile bonds or linkages: A review. Prog Polym Sci. Jan. 2018;76:65-110. doi: 10.1016/j.progpolymsci.2017.07.008.

Machida et al., Efficient approach to medium-sized cyclic molecules containing (E)-Alkene via z to e photochemical isomerization in the presence of AgNO3-impregnated silica gel. Chem Lett. Jan. 11, 2018;47(2): 186-8. doi: 10.1246/cl.170937.

Macosko et al., A new derivation of average molecular weights of nonlinear polymers. Macromolecules. Mar.-Apr. 1976;9(2):199-206. doi: 10.1021/ma60050a003.

Mathers et al., Functional Hyperbranched Polymers Using Ring-Opening Metathesis Polymerization of Dicyclopentadiene with Monoterpenes. Macromolecules. Feb. 10, 2009;42(5): 1512-8. doi: 10.1021/ma802441t.

Mohite et al., Polydicyclopentadiene aerogels grafted with PMMA: I. Molecular and interparticle crosslinking. Soft Matter. Dec. 6, 2012;9:1516-30. doi: 10.1039/C2SM26931G.

Montarnal et al., Silica-like malleable materials from permanent organic networks. Science. Nov. 18, 2011;334(6058):965-8. doi: 10.1126/science.1212648.

Nagarkar et al., End functional ROMP polymers via degradation of a ruthenium Fischer type carbene. Chem Sci. Sep. 2, 2014;5(12):4687-92. doi: 10.1039/C4SC02242D.

Nishimura et al., Silyl Ether as a Robust and Thermally Stable Dynamic Covalent Motif for Malleable Polymer Design. J Am Chem Soc. Oct. 25, 2017;139(42):14881-14884. doi: 10.1021/jacs.7b08826. Epub Oct. 16, 2017.

Osthoff et al., Chemical Stress-Relaxation of Polydimethylsiloxane Elastomers. J Am Chem Soc. Sep. 1, 1954;76(18):4659-63. doi: 10.1021/ja01647a052.

Parker et al., Halogen radicals contribute to photooxidation in coastal and estuarine waters. Proc Natl Acad Sci U S A. May 24, 2016;113(21):5868-73. doi: 10.1073/pnas. 1602595113. Epub May 9, 2016.

Parrott et al., Tunable bifunctional silyl ether cross-linkers for the design of acid-sensitive biomaterials. J Am Chem Soc. Dec. 22, 2010;132(50):17928-32. doi: 10.1021/ja108568g. Epub Nov. 24, 2010.

(56) References Cited

OTHER PUBLICATIONS

Perring et al., Epoxidation of the surface of polydicyclopentadiene for the self-assembly of organic monolayers. J Mater Chem. Sep. 8, 2010;20:8679-85. doi: 10.1039/C0JM01999B.

Post et al., A Review on the Potential and Limitations of Recyclable Thermosets for Structural Applications. Polym Rev. Oct. 8, 2019;60(2):359-88. doi: 10.1080/15583724.2019.1673406.

Price, F.P., Freezing Point Depression of Sulfuric Acid by Siloxane. J Am Chem Soc. Feb. 1, 1948;70(2):871-2. doi: 10.1021/ja01182a516.

Reddy et al., Mechanism of cyclic acetal formation. Tetrahedron. 1982;38(12):1825-6. doi: 10.1016/0040-4020(82)80257-3.

Robertson et al., Alkyl Phosphite Inhibitors for Frontal Ring-Opening Metathesis Polymerization Greatly Increase Pot Life. ACS Macro Lett. Jun. 2, 20170;6(6):609-612. doi: 10.1021/acsmacrolett.7b00270. Epub May 24, 2017.

Robertson et al., Frontal Ring-Opening Metathesis Polymerization of Exo-Dicyclopentadiene for Low Catalyst Loadings. ACS Macro Lett. May 17, 2016;5(5):593-596. doi: 10.1021/acsmacrolett.6b00227. Epub Apr. 25, 2016.

Robertson et al., Rapid energy-efficient manufacturing of polymers and composites. Nature. May 9, 2018;557:223-7. doi: 10.1038/s41586-018-0054-x.

Rohde et al., Thermoset Blends of an Epoxy Resin and Polydicyclopentadiene. Macromolecules. Nov. 30, 2016;49(23):8960-70. doi: 10.1021/acs.macromol.6b01649.

Rule et al., ROMP Reactivity of endo- and exo-Dicyclopentadiene. Macromolecule. Sep. 6, 2002;35:7878-82. doi: 10.1021/MA0209489.

Röttger et al., High-performance vitrimers from commodity thermoplastics through dioxaborolane metathesis. Science. Apr. 7, 2017;356(6333):62-65. doi: 10.1126/science.aah5281.

Saed et al., Catalytic Control of Plastic Flow in Siloxane-Based Liquid Crystalline Elastomer Networks. ACS Macro Lett. May 19, 2020;9(5):749-755. doi: 10.1021/acsmacrolett.0c00265. Epub May 6, 2020.

Saed et al., Siloxane crosslinks with dynamic bond exchange enable shape programming in liquid-crystalline elastomers. Sci Rep. Apr. 20, 2020;10(1):6609. doi: 10.1038/s41598-020-63508-4.

Saha et al., Cross-linked ROMP polymers based on odourless dicyclopentadiene derivative. Polym Chem. Apr. 14, 2016;7:3071-5. doi: 10.1039/C6PY00378H.

Sanda et al., Vinylcyclopropanone Cyclic Acetal-Synthesis, Polymerization, Structure of the Polymer and Mechanism of the Polymerization. Macromolecules. Feb. 1994;27(5):1099-111. doi: 10.1021/ma00083a006.

Schrock et al., Tungsten(VI) neopentylidyne complexes. Organometallics. Dec. 1, 1982;1(12):1645-51. doi: 10.1021/om00072a018.

Scott, D.W., Equilibria between Linear and Cyclic Polymers in Methylpolysiloxanes. J Am Chem Soc. Nov. 1, 1946;68(11):2294-8. doi: 10.1021/ja01215a050.

Self et al., Brønsted-Acid-Catalyzed Exchange in Polyester Dynamic Covalent Networks. ACS Macro Lett. Jul. 17, 2018;7(7):817-821. doi: 10.1021/acsmacrolett.8b00370. Epub Jun. 22, 2018.

Sheng et al., The influence of cross-linking agents on ring-opening metathesis polymerized thermosets. J Thermal Analys Calorimet. Jul. 19, 2007;89(2):459-64. doi: 10.1007/s10973-006-8468-3.

Shieh et al., A Comonomer Strategy for Triggered Degradation and Re/Upcycling of High- Performance Thermoset Plastics. Dec. 13, 2019. 18 pages. Accessed Dec. 27, 2022 from <https://chemrxiv.org/engage/chemrxiv/article-details/60c7467bee301c7f63c79516>.

Shieh et al., Cleavable comonomers enable degradable, recyclable thermoset plastics. Nature. Jul. 2020;583(7817):542-547. doi: 10.1038/s41586-020-2495-2. Epub Jul. 22, 2020. Erratum in: Nature. Sep. 2020;585(7823):E4. Supplementary Information, 55 pages.

Snyder et al., Reprocessable Acid-Degradable Polycarbonate Vitrimers. Macromolecules. Jan. 4, 2018;51(2):389-97. doi: 10.1021/acs.macromol.7b02299.

Sommazzi et al., Olefin-carbon monoxide copolymers. Prog Polym Sci. 1997;22(8):1547-605. doi: 10.1016/S0079-6700(97)00009-9.

Stockmayer et al., Theory of Molecular Size Distribution and Gel Formation in Branched Polymers II. General Cross Linking. J Chem Phys. Apr. 1944;12(4):125-31. doi: 10.1063/1.1723922.

Takahashi et al., Degradable epoxy resins prepared from diepoxide monomer with dynamic covalent disulfide linkage. Polymer. Jan. 15, 2016;82:319-26. doi: 10.1016/J.POLYMER.2015.11.057.

Takayama et al., Topographical Micropatterning of Poly(dimethylsiloxane) Using Laminar Flows of Liquids in Capillaries. Adv Mater. Apr. 18, 2001;13(8):570-4. doi: 10.1002/1521-4095(200104)13:8<570::AID-ADMA570>3.0.CO;2-B.

Tanino et al., Control of Stereochemistry by sigma-Participation of a Silyl Group. A Novel Method for Diastereoselective Polyol Synthesis. J Org Chem. Jun. 27, 1997;62(13):4206-4207. doi: 10.1021/jo9703515. PMID: 11671736.

Tomooka et al., Planar chiral dialkoxysilane:introduction of inherent chirality and high reactivity in conventional achiral alkene. Chemistry. Jun. 16, 2014;20(25):7598-602. doi: 10.1002/chem.201402434. Epub May 6, 2014.

Tournier et al., An engineered PET depolymerase to break down and recycle plastic bottles. Nature. Apr. 2020;580(7802):216-219. doi: 10.1038/s41586-020-2149-4. Epub Apr. 8, 2020.

Tretbar et al., Direct Silyl Ether Metathesis for Vitrimers with Exceptional Thermal Stability. J Am Chem Soc. Oct. 23, 2019;141(42):16595-16599. doi: 10.1021/jacs.9b08876. Epub Oct. 14, 2019.

Veysset et al., Dynamics of supersonic microparticle impact on elastomers revealed by real-time multi-frame imaging. Sci Rep. May 9, 2016;6:25577. doi: 10.1038/srep25577. Erratum in: Sci Rep. Feb. 16, 2018;8:46944.

Wang et al., Counting loops in sidechain-crosslinked polymers from elastic solids to single-chain nanoparticles. Chem Sci. May 1, 2019;10(20):5332-5337. doi: 10.1039/c9sc01297d.

Wang et al., Counting Secondary Loops Is Required for Accurate Prediction of End-Linked Polymer Network Elasticity. ACS Macro Lett. Feb. 6, 2018;7(2):244-9. doi: 10.1021/acsmacrolett.8b00008.

Wang et al., Readily recyclable carbon fiber reinforced composites based on degradable thermosets: a review. Green Chem. Sep. 19, 2019;21(21):5781-96. doi: 10.1039/C9GC01760G.

Wiles et al., Polyolefins with controlled environmental degradability. Polym Degrad Stab. Jul. 2006;91(7):1581-92. doi: 10.1016/j.polymdegradstab.2005.09.010.

Winne et al., Dynamic covalent chemistry in polymer networks: a mechanistic perspective. Polym Chem. Oct. 16, 2019;10:6091-108. doi: 10.1039/C9PY01260E.

Yang et al., Curing Kinetics and Mechanical Properties of endo-Dicyclopentadiene Synthesized Using Different Grubbs' Catalysts. Ind Eng Chem Res. Jan. 28, 2014;53(8):3001-11. doi: 10.1021/ie403285q.

Yang et al., Curing study of dicyclopentadiene resin and effect of elastomer on its polymer network. Polymer. Mar. 1997;38(5):1121-30. doi: 10.1016/S0032-3861(96)00599-X.

Yang et al., Reworkable Epoxies: Thermosets with Thermally Cleavable Groups for Controlled Network Breakdown. Chem Mater. Jun. 1998;10(6):1475-82.

Zhang et al., Loading dependent swelling and release properties of novel biodegradable, elastic and environmental stimuli-sensitive polyurethanes. J Control Release. Oct. 21, 2008;131(2):128-36. doi: 10.1016/j.jconrel.2008.07.026. Epub Jul. 24, 2008.

Zheng et al., A Surprise from 1954: Siloxane Equilibration Is a Simple, Robust, and Obvious Polymer Self-Healing Mechanism. J Am Chem Soc. Jan. 18, 2012;134(4):2024-7. doi: 10.1021/ja2113257.

Zhong et al., Quantifying the impact of molecular defects on polymer network elasticity. Science. Sep. 16, 2016;353(6305):1264-8. doi: 10.1126/science.aag0184.

Zhou et al., Counting primary loops in polymer gels. Proc Natl Acad Sci U S A. Nov. 20, 2012;109(47):19119-24. doi: 10.1073/pnas.1213169109. Epub Nov. 6, 2012.

Zych et al., Polyethylene vitrimers via silyl ether exchange reaction. Polymer. Jun. 11, 2020;99:112567. doi: 10.1016/j.polymer.2020.122567.

International Search Report and Written Opinion for Application No. PCT/US2021/061135 dated Apr. 28, 2022.

(56) References Cited

OTHER PUBLICATIONS

Fraser et al., Degradable Cyclooctadiene/Acetal Copolymers: versatile Precursors to 1,4-Hydroxytelechelic Polybutadiene and Hydroytelechelic Polyethylene. Macromolecules. Oct. 9, 1995;28(21):7256-61. doi: 10.1021/ma00125a031.
Hilf et al., Monofunctional metathesis polymers via sacrificial diblock copolymers. Angew Chem Int Ed Engl. Dec. 4, 2006;45(47):8045-8. doi: 10.1002/anie.200602323.
Hilf et al., Sacrificial Synthesis of Hydroxy-Telechelic Metathesis Polymers via Multiblock-Copolymers. Macromolecules. Feb. 24, 2009;42(4):1099-106. doi: 10.1021/ma802440k.
Moatsou et al., Degradable precision polynorbornenes via ring-opening metathesis polymerization. J Polym Sci Part A: Polym Chem. May 1, 2016;54(9):1236-42. doi: 10.1002/pola.27964.
Ogata et al., Scissionable polymer resists for extreme ultraviolet lithography. Proceedings of the SPIE, Extreme Ultraviolet (EUV) Lithography. Mar. 22, 2010;7636:763634/1. doi: 10.1117/12.847320.
Prévost et al., Strained organosilacyclic compounds: synthesis of anti-Bredt olefins and trans-dioxasilacyclooctenes. Dalton Trans. Oct. 21, 2010;39(39):9275-81. doi: 10.1039/c003227a. Epub Jul. 8, 2010.
Shieh et al., Tailored silyl ether monomers enable backbone-degradable polynorbornene-based linear, bottlebrush and star copolymers through ROMP. Nat Chem. Dec. 2019;11(12):1124-1132. doi: 10.1038/s41557-019-0352-4. Epub Oct. 28, 2019.
Tong et al., Copolymers of Functionalized and Nonfunctionalized Polydicyclopentadiene. ACS Applied Polymer Materials. Jan. 8, 2021;3(1):110-115.
U.S. Appl. No. 16/542,824, filed Aug. 16, 2019, Johnson et al.
U.S. Appl. No. 17/204,462, filed Mar. 17, 2021, Johnson et al.
U.S. Appl. No. 17/022,021, filed Sep. 15, 2020, Johnson et al.
PCT/US2019/046872, dated Oct. 29, 2019, International Search Report and Written Opinion.
PCT/US2019/046872, dated Mar. 4, 2021, International Preliminary Report on Patentability.
PCT/US2020/050927, dated Jan. 21, 2021, International Search Report and Written Opinion.
PCT/US2020/050927, dated May 27, 2022, International Preliminary Report on Patentability.
PCT/US2021/058668, dated Jan. 10, 2022, Invitation to Pay Additional Fees.
PCT/US2021/058668, dated Mar. 10, 2022, International Search Report and Written Opinion.
PCT/US2022/031759, dated Aug. 16, 2022, Invitation to Pay Additional Fees.
PCT/US2022/031759, dated Nov. 8, 2022, International Search Report and Written Opinion.
U.S. Appl. No. 18/401,860, filed Jan. 2, 2024, Johnson et al.
U.S. Appl. No. 18/565,783, filed Nov. 30, 2023, Johnson et al.
PCT/US2022/031759, dated Dec. 14, 2023, International Preliminary Report on Patentability.
PCT/US2023/072765, dated Nov. 14, 2023, Invitation to Pay Additional Fees.
PCT/US2023/072768, dated Nov. 16, 2023, Invitation to Pay Additional Fees.
International Preliminary Report on Patentability for Application No. PCT/US2022/031759 dated Dec. 14, 2023.
Invitation to Pay Additional Fees for Application No. PCT/US2023/072765 dated Nov. 14, 2023.
Invitation to Pay Additional Fees for Application No. PCT/US2023/072768 dated Nov. 16, 2023.
[No Author Listed], Bis-hydroxybutoxydimethyl silane. PubChem CID No. 101548982. Dec. 18, 2015. Retrieved from <https://pubchem.ncbi.nlm.nih.gov/compound/101548982> on Nov. 7, 2023. 9 pages.
[No Author Listed], Dimethylsilanediol. PubChem CID No. 14014. Sep. 16, 2004. Retrieved from <https://pubchem.ncbi.nlm.nih.gov/compound/14014>. 35 pages.

Aime et al., Lanthanide(III) chelates for NMR biomedical applications. Chem Soc Rev. 1998;27:19-29. doi: 10.1039/A827019Z.
Barnes et al., Using an RNAi Signature Assay To Guide the Design of Three-Drug- Conjugated Nanoparticles with Validated Mechanisms, In Vivo Efficacy, and Low Toxicity. J Am Chem Soc. Sep. 14, 2016;138(38):12494-501. doi: 10.1021/jacs.6b06321.
Blum et al., Peptides displayed as high density brush polymers resist proteolysis and retain bioactivity. J Am Chem Soc. Oct. 29, 2014;136(43):15422-37. doi: 10.1021/ja5088216. Epub Oct. 14, 2014.
Burts et al., Brush-first and Click: Efficient Synthesis of Nanoparticles that Degrade and Release Doxorubicin in Response to Light. Photochem Photobiol. Mar./Apr. 2014;90(2):380-5. doi: 10.1111/php.12182. Epub Oct. 7, 2013.
Cavalli et al., Self-Propagated para-Fluoro-Thiol Reaction. Chem Eur J. Aug. 1, 2019;25(43):10049-53. doi: 10.1002/chem.201901290.
Duncan, R., The dawning era of polymer therapeutics. Nat Rev Drug Discov. May 2003;2(5):347-60. doi: 10.1038/nrd1088.
Fishman et al., Synthesis of functionalizable and degradable polymers by ring-opening metathesis polymerization. Angew Chem Int Ed Engl. May 3, 2013;52(19):5061-4. doi: 10.1002/anie.201300293. Epub Apr. 8, 2013.
Fox et al., Soluble Polymer Carriers for the Treatment of Cancer: The Importance of Molecular Architecture. Acc Chem Res. Jun. 25, 2009;42(8):1141-51. doi: 10.1021/ar900035f.
Gao et al., Synthesis of Acid-Labile PEG and PEG-Doxorubicin-Conjugate Nanoparticles via Brush-First ROMP. ACS Macro Lett. Aug. 3, 2014;3(9):854-7. doi: 10.1021/mz5004097.
Gutekunst et al., A General Approach to Sequence-Controlled Polymers Using Macrocyclic Ring Opening Metathesis Polymerization. J Am Chem Soc. Jul. 1, 2015;137(25):8038-41. doi: 10.1021/jacs.5b04940. Epub Jun. 23, 2015.
Hein et al., Copper-catalyzed azide-alkyne cycloaddition (CuAAC) and beyond: new reactivity of copper(I) acetylides. Chem Soc Rev. Apr. 2010;39(4):1302-15. doi: 10.1039/b904091a. Epub Mar. 4, 2010.
Kawamoto et al., Graft-through Synthesis and Assembly of Janus Bottlebrush Polymers from A-Branch-B Diblock Macromonomers. J Am Chem Soc. Sep. 14, 2016;138(36):11501-4. doi: 10.1021/jacs.6b07670. Epub Sep. 1, 2016.
Lee et al., Stimuli-responsive molecular brushes. J Prog Polym Sci. Jan.-Feb. 2010; 35(1-2):24-44. doi: 10.1016/j.progpolymsci.2009.11.002.
Liang et al., The copper(I)-catalyzed alkyne-azide cycloaddition (CuAAC) "click" reaction and its applications. An overview. J Coord Chem Rev. Dec. 2011;255(23-24):2933-45. doi: 10.1016/j.ccr.2011.06.028.
Liao et al., A Convergent Synthetic Platform for Single-Nanoparticle Combination Cancer Therapy: Ratiometric Loading and Controlled Release of Cisplatin, Doxorubicin, and Camptothecin. J Am Chem Soc. Apr. 11, 2014;136(16):5896-99. doi: 10.1021/ja502011g.
Maeda et al., Polymeric drugs for efficient tumor-targeted drug delivery based on EPR-effect. Eur J Pharm Biopharm. Mar. 2009;71(3):409-19. doi: 10.1016/j.ejpb.2008.11.010. Epub Dec. 3, 2008.
Mann et al., Probing Low Affinity and Multivalent Interactions with SurfacePlasmon Resonance: Ligands for Concanavalin A. J Am Chem Soc. Oct. 6, 1998;120(41):10575-82. doi: 10.1021/ja9818506.
Mekcham et al., Synthesis of Bottlebrush Polymers by Z-/E-Specific Living Ring-Opening Metathesis Polymerization, Exhibiting Different Thermal Properties. J Am Chem Soc. Jul. 27, 2023;145(31):17001-6. doi: 10.1021/jacs.3c05795.
Miyake et al., Precisely tunable photonic crystals from rapidly self-assembling brush block copolymer blends. Angew Chem Int Ed Engl. Nov. 5, 2012;51(45):11246-8. doi: 10.1002/anie.201205743. Epub Sep. 13, 2012.
Neises et al., Simple Method for the Esterification of Carboxylic Acids. Angew Chem Int Ed Engl. Jul. 1978;17(7):522-4. doi: 10.1002/anie.197805221.

(56) References Cited

OTHER PUBLICATIONS

Peer et al., Nanocarriers as an emerging platform for cancer therapy. Nat Nanotechnol. Dec. 2007;2(12):751-60. doi: 10.1038/nnano.2007.387.
Ren et al., Star Polymers. Chem Rev. Jun. 22, 2016;116(12):6743-836. doi: 10.1021/acs.chemrev.6b00008. Epub Jun. 14, 2016.
Rzayev, J., Molecular Bottlebrushes: New Opportunities in Nanomaterials Fabrication. ACS Macro Lett. Sep. 18, 2012;1(9):1146-1149. doi: 10.1021/mz300402x. Epub Sep. 10, 2012.
Sheiko et al., Cylindrical molecular brushes: Synthesis, characterization, and properties. J Prog Polym Sci. Jul. 2008;33(7):759-85. doi: 10.1016/j.progpolymsci.2008.05.001.
Sveinbjornsson et al., Rapid self-assembly of brush block copolymers to photonic crystals. Proc Natl Acad Sci USA. Sep. 4, 2012;109(36):14332-6.
Verduzco et al., Structure, function, self-assembly, and applications of bottlebrush copolymers. Chem Soc Rev. Feb. 17, 2015;44(8):2405-20. doi: 10.1039/C4CS00329B.
Worrell et al., Direct evidence of a dinuclear copper intermediate in Cu(I)-catalyzed azide-alkyne cycloadditions. Science. Apr. 26, 2013;340(6131):457-60. doi: 10.1126/science.1229506. Epub Apr. 4, 2013.
Xia et al., Efficient synthesis of narrowly dispersed brush copolymers and study of their assemblies: the importance of side chain arrangement. J Am Chem Soc. Dec. 30, 2009;131(51):18525-32. doi: 10.1021/ja908379q.

* cited by examiner

Swell in THF
Cut into Fragments

Hot Press

Dynamic Strands

0% iPrSi  
5 phr cat.

10% iPrSi  
1 phr cat.

10% iPrSi  
0 phr cat.

Dynamic Crosslinkers

40% SiXL  
0 phr cat.

40% SiXL  
1 phr cat.

40% SiXL  
5 phr cat.

REPROCESSABLE COMPOSITIONS

RELATED APPLICATIONS

This application claims priority under 35 U.S.C. § 119(e) to U.S. Provisional Application No. 63/144,437, filed Feb. 1, 2021, which is incorporated herein by reference.

GOVERNMENT SUPPORT

This invention was made with government support under Grant No. R01 CA220468 awarded by the National Institutes of Health, and under Grant No. CHE1629358 awarded by the National Science Foundation. The government has certain rights in the invention.

SUMMARY OF THE DISCLOSURE

The present disclosure provides compositions comprising:

a) a copolymer prepared by a method comprising polymerizing in the presence of a metathesis catalyst:
  i) a first monomer, wherein each instance of the first monomer is independently of the formula:

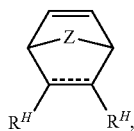

(A)

or salt thereof;
  ii) a second monomer, wherein each instance of the second monomer is independently of the formula:

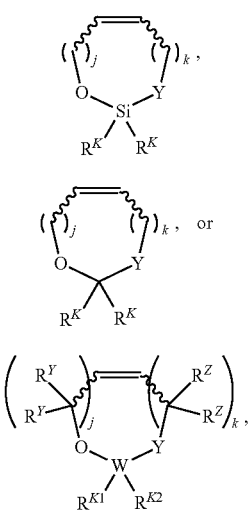

or a salt thereof;
  iii) optionally a third monomer, wherein the third monomer is different from the first monomer and the second monomer; and
  iv) optionally a reprocessing catalyst; and
b) optionally the reprocessing catalyst;
wherein the reprocessing catalyst is a Brønsted acid, Lewis acid, Brønsted base, Lewis base, urea, thiourea, carbamate, thiocarbamate, or a salt thereof;
provided that the composition comprises at least one of the reprocessing catalyst of iv) and the reprocessing catalyst of b).

The copolymers and compositions described herein may be useful as bulk materials. The compositions described herein may be reprocessed (e.g., remolded) under elevated temperature and/or elevated pressure. Therefore, the compositions described herein may self-heal and may be useful for (e.g., solvent-free) reprocessing, remolding, reusing, repairing, and/or recycling the copolymers (e.g., copolymers as scrap materials).

Without being bound by any particular theory, the copolymers and compositions described herein may behave as covalent adaptable networks. The reprocessing catalyst may promote bond exchange within the copolymers. The reprocessing of the copolymers and compositions described herein may be catalyzed by the reprocessing catalyst.

The present disclosure also provides kits comprising the copolymer and the reprocessing catalyst; methods of preparing the composition; and methods of reprocessing the composition.

Definitions

Definitions of specific functional groups and chemical terms are described in more detail below. The chemical elements are identified in accordance with the Periodic Table of the Elements, CAS version, *Handbook of Chemistry and Physics*, 75$^{th}$ Ed., inside cover, and specific functional groups are generally defined as described therein. Additionally, general principles of organic chemistry, as well as specific functional moieties and reactivity, are described in Thomas Sorrell, *Organic Chemistry*, University Science Books, Sausalito, 1999; Smith and March, *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; and Carruthers, *Some Modern Methods of Organic Synthesis*, 3$^{rd}$ Edition, Cambridge University Press, Cambridge, 1987.

Compounds described herein can comprise one or more asymmetric centers, and thus can exist in various isomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC), supercritical fluid chromatography (SFC), and the formation and crystallization of chiral salts; or preferred isomers can be prepared by asymmetric syntheses. See, for example, Jacques et al., *Enantiomers, Racemates and Resolutions* (Wiley Interscience, New York, 1981); Wilen et al., *Tetrahedron* 33:2725 (1977); Eliel, *Stereochemistry of Carbon Compounds* (McGraw-Hill, NY, 1962); and Wilen, *Tables of Resolving Agents and Optical Resolutions* p. 268 (E. L. Eliel, Ed., Univ. of Notre Dame Press, Notre Dame, IN 1972). The present disclosure additionally encompasses compounds described herein as individual isomers substantially free of other isomers, and alternatively, as mixtures of various isomers.

In a formula, the bond ⁓ is a single bond, the dashed line - - - is a single bond or absent, and the bond ═ or ═ is a single or double bond.

Unless otherwise provided, a formula depicted herein includes compounds that do not include isotopically enriched atoms and also compounds that include isotopically enriched atoms. Compounds that include isotopically enriched atoms may be useful as, for example, analytical tools, and/or probes in biological assays.

The term "aliphatic" includes both saturated and unsaturated, nonaromatic, straight chain (i.e., unbranched), branched, acyclic, and cyclic (i.e., carbocyclic) hydrocarbons. In some embodiments, an aliphatic group is optionally substituted with one or more functional groups (e.g., halo, such as fluorine). As will be appreciated by one of ordinary skill in the art, "aliphatic" is intended herein to include alkyl, alkenyl, alkynyl, cycloalkyl, cycloalkenyl, and cycloalkynyl moieties.

When a range of values ("range") is listed, it is intended to encompass each value and sub-range within the range. A range is inclusive of the values at the two ends of the range unless otherwise provided. For example, "an integer between 1 and 4" refers to 1, 2, 3, and 4. For example "$C_{1-6}$ alkyl" is intended to encompass, $C_1$, $C_2$, $C_3$, $C_4$, $C_5$, $C_6$, $C_{1-6}$, $C_1$-5, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

"Alkyl" refers to a radical of a straight-chain or branched saturated hydrocarbon group having from 1 to 20 carbon atoms ("$C_{1-20}$ alkyl"). In some embodiments, an alkyl group has 1 to 12 carbon atoms ("$C_{1-12}$ alkyl"). In some embodiments, an alkyl group has 1 to 10 carbon atoms ("$C_{1-10}$ alkyl"). In some embodiments, an alkyl group has 1 to 9 carbon atoms ("$C_{1-9}$ alkyl"). In some embodiments, an alkyl group has 1 to 8 carbon atoms ("$C_{1-8}$ alkyl"). In some embodiments, an alkyl group has 1 to 7 carbon atoms ("$C_{1-7}$ alkyl"). In some embodiments, an alkyl group has 1 to 6 carbon atoms ("$C_{1-6}$ alkyl"). In some embodiments, an alkyl group has 1 to 5 carbon atoms ("$C_{1-5}$ alkyl"). In some embodiments, an alkyl group has 1 to 4 carbon atoms ("$C_{1-4}$ alkyl"). In some embodiments, an alkyl group has 1 to 3 carbon atoms ("$C_1$-3 alkyl"). In some embodiments, an alkyl group has 1 to 2 carbon atoms ("$C_{1-2}$ alkyl"). In some embodiments, an alkyl group has 1 carbon atom ("$C_1$ alkyl"). In some embodiments, an alkyl group has 2 to 6 carbon atoms ("$C_{2-6}$ alkyl"). Examples of $C_{1-6}$ alkyl groups include methyl ($C_1$), ethyl ($C_2$), n-propyl ($C_3$), isopropyl ($C_3$), n-butyl ($C_4$), tert-butyl ($C_4$), sec-butyl ($C_4$), iso-butyl ($C_4$), n-pentyl ($C_5$), 3-pentanyl ($C_5$), amyl ($C_5$), neopentyl ($C_5$), 3-methyl-2-butanyl ($C_5$), tertiary amyl ($C_5$), and n-hexyl ($C_6$). Additional examples of alkyl groups include n-heptyl ($C_7$), n-octyl ($C_5$) and the like. Unless otherwise specified, each instance of an alkyl group is independently optionally substituted, e.g., unsubstituted (an "unsubstituted alkyl") or substituted (a "substituted alkyl") with one or more substituents. In certain embodiments, the alkyl group is unsubstituted $C_{1-12}$ alkyl (e.g., —$CH_3$ (Me), unsubstituted ethyl (Et), unsubstituted propyl (Pr, e.g., unsubstituted n-propyl (n-Pr), unsubstituted isopropyl (i-Pr)), unsubstituted butyl (Bu, e.g., unsubstituted n-butyl (n-Bu), unsubstituted tert-butyl (tert-Bu or t-Bu), unsubstituted sec-butyl (sec-Bu or s-Bu), unsubstituted isobutyl (i-Bu)). In certain embodiments, the alkyl group is substituted $C_{1-12}$ alkyl (such as substituted $C_{1-6}$ alkyl, e.g., —$CH_2F$, —$CHF_2$, —$CF_3$, —$CH_2CH_2F$, —$CH_2CHF_2$, —$CH_2CF_3$, or benzyl (Bn)). The attachment point of alkyl may be a single bond (e.g., as in —$CH_3$), double bond (e.g., as in =$CH_2$), or triple bond (e.g., as in ≡CH). The moieties =$CH_2$ and ≡CH are also alkyl.

In some embodiments, an alkyl group is substituted with one or more halogens. "Perhaloalkyl" is a substituted alkyl group as defined herein wherein all of the hydrogen atoms are independently replaced by a halogen, e.g., fluoro, bromo, chloro, or iodo. In some embodiments, the alkyl moiety has 1 to 8 carbon atoms ("$C_{1-8}$ perhaloalkyl"). In some embodiments, the alkyl moiety has 1 to 6 carbon atoms ("$C_{1-6}$ perhaloalkyl"). In some embodiments, the alkyl moiety has 1 to 4 carbon atoms ("$C_{1-4}$ perhaloalkyl"). In some embodiments, the alkyl moiety has 1 to 3 carbon atoms ("$C_{1-3}$ perhaloalkyl"). In some embodiments, the alkyl moiety has 1 to 2 carbon atoms ("$C_{1-2}$ perhaloalkyl"). In some embodiments, all of the hydrogen atoms are replaced with fluoro. In some embodiments, all of the hydrogen atoms are replaced with chloro. Examples of perhaloalkyl groups include —$CF_3$, —$CF_2CF_3$, —$CF_2CF_2CF_3$, —$CCl_3$, —$CFCl_2$, —$CF_2Cl$, and the like.

"Alkenyl" refers to a radical of a straight-chain or branched hydrocarbon group having from 2 to 20 carbon atoms, one or more (e.g., two, three, or four, as valency permits) carbon-carbon double bonds, and no triple bonds ("$C_{2-20}$ alkenyl"). In some embodiments, an alkenyl group has 2 to 10 carbon atoms ("$C_{2-10}$ alkenyl"). In some embodiments, an alkenyl group has 2 to 9 carbon atoms ("$C_{2-9}$ alkenyl"). In some embodiments, an alkenyl group has 2 to 8 carbon atoms ("$C_{2-8}$ alkenyl"). In some embodiments, an alkenyl group has 2 to 7 carbon atoms ("$C_{2-7}$ alkenyl"). In some embodiments, an alkenyl group has 2 to 6 carbon atoms ("$C_{2-6}$ alkenyl"). In some embodiments, an alkenyl group has 2 to 5 carbon atoms ("$C_{2-5}$ alkenyl"). In some embodiments, an alkenyl group has 2 to 4 carbon atoms ("$C_{2-4}$ alkenyl"). In some embodiments, an alkenyl group has 2 to 3 carbon atoms ("$C_{2-3}$ alkenyl"). In some embodiments, an alkenyl group has 2 carbon atoms ("$C_2$ alkenyl"). The one or more carbon-carbon double bonds can be internal (such as in 2-butenyl) or terminal (such as in 1-butenyl). Examples of $C_{2-4}$ alkenyl groups include ethenyl ($C_2$), 1-propenyl ($C_3$), 2-propenyl ($C_3$), 1-butenyl ($C_4$), 2-butenyl ($C_4$), butadienyl ($C_4$), and the like. Examples of $C_{2-6}$ alkenyl groups include the aforementioned $C_{2-4}$ alkenyl groups as well as pentenyl ($C_5$), pentadienyl ($C_5$), hexenyl ($C_6$), and the like. Additional examples of alkenyl include heptenyl ($C_7$), octenyl ($C_8$), octatrienyl ($C_8$), and the like. Unless otherwise specified, each instance of an alkenyl group is independently optionally substituted, e.g., unsubstituted (an "unsubstituted alkenyl") or substituted (a "substituted alkenyl") with one or more substituents. In certain embodiments, the alkenyl group is unsubstituted $C_{2-10}$ alkenyl. In certain embodiments, the alkenyl group is substituted $C_{2-10}$ alkenyl. In an alkenyl group, a C=C double bond for which the stereochemistry is not specified (e.g., —CH=$CHCH_3$ or

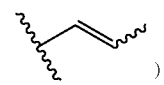
)

may be in the (E)- or (Z)-configuration.

"Alkynyl" refers to a radical of a straight-chain or branched hydrocarbon group having from 2 to 20 carbon atoms, one or more (e.g., two, three, or four, as valency permits) carbon carbon triple bonds, and optionally one or more double bonds ("$C_{2-20}$ alkynyl"). In some embodiments, an alkynyl group has 2 to 10 carbon atoms ("$C_{2-10}$ alkynyl"). In some embodiments, an alkynyl group has 2 to 9 carbon atoms ("$C_{2-9}$ alkynyl"). In some embodiments, an alkynyl group has 2 to 8 carbon atoms ("$C_{2-8}$ alkynyl"). In some embodiments, an alkynyl group has 2 to 7 carbon atoms ("$C_{2-7}$ alkynyl"). In some embodiments, an alkynyl group has 2 to 6 carbon atoms ("$C_{2-6}$ alkynyl"). In some embodiments, an alkynyl group has 2 to 5 carbon atoms ("$C_{2-5}$ alkynyl"). In some embodiments, an alkynyl group has 2 to 4 carbon atoms ("$C_{2-4}$ alkynyl"). In some embodiments, an alkynyl group has 2 to 3 carbon atoms ("$C_{2-3}$ alkynyl"). In some embodiments, an alkynyl group has 2 carbon atoms ("$C_2$ alkynyl"). The one or more carbon-carbon triple bonds can be internal (such as in 2-butynyl) or terminal (such as in 1-butynyl). Examples of $C_{2-4}$ alkynyl groups include ethynyl ($C_2$), 1-propynyl ($C_3$), 2-propynyl ($C_3$), 1-butynyl ($C_4$), 2-butynyl ($C_4$), and the like. Examples of $C_{2-6}$ alkenyl groups include the aforementioned $C_{2-4}$ alkynyl groups as well as pentynyl ($C_5$), hexynyl ($C_6$), and the like. Additional examples of alkynyl include heptynyl ($C_7$), octynyl ($C_8$), and the like. Unless otherwise specified, each instance of an alkynyl group is independently optionally substituted, e.g., unsubstituted (an "unsubstituted alkynyl") or substituted (a "substituted alkynyl") with one or more substituents. In certain embodiments, the alkynyl group is unsubstituted $C_{2-10}$ alkynyl. In certain embodiments, the alkynyl group is substituted $C_{2-10}$ alkynyl.

"Carbocyclyl" or "carbocyclic" refers to a radical of a non-aromatic cyclic hydrocarbon group having from 3 to 13 ring carbon atoms ("$C_{3-13}$ carbocyclyl") and zero heteroatoms in the non-aromatic ring system. In some embodiments, a carbocyclyl group has 3 to 8 ring carbon atoms ("$C_{3-8}$ carbocyclyl"). In some embodiments, a carbocyclyl group has 3 to 7 ring carbon atoms ("$C_{3-7}$ carbocyclyl"). In some embodiments, a carbocyclyl group has 3 to 6 ring carbon atoms ("$C_{3-6}$ carbocyclyl"). In some embodiments, a carbocyclyl group has 5 to 10 ring carbon atoms ("$C_{5-10}$ carbocyclyl"). Exemplary $C_{3-6}$ carbocyclyl groups include cyclopropyl ($C_3$), cyclopropenyl ($C_3$), cyclobutyl ($C_4$), cyclobutenyl ($C_4$), cyclopentyl ($C_5$), cyclopentenyl ($C_5$), cyclohexyl ($C_6$), cyclohexenyl ($C_6$), cyclohexadienyl ($C_6$), and the like. Exemplary $C_{3-8}$ carbocyclyl groups include the aforementioned $C_{3-6}$ carbocyclyl groups as well as cycloheptyl ($C_7$), cycloheptenyl ($C_7$), cycloheptadienyl ($C_7$), cycloheptatrienyl ($C_7$), cyclooctyl ($C_8$), cyclooctenyl ($C_8$), bicyclo[2.2.1]heptanyl ($C_7$), bicyclo[2.2.2]octanyl ($C_8$), and the like. Exemplary $C_{3-10}$ carbocyclyl groups include the aforementioned $C_{3-8}$ carbocyclyl groups as well as cyclononyl ($C_9$), cyclononenyl ($C_9$), cyclodecyl ($C_{10}$), cyclodecenyl ($C_{10}$), octahydro-1H-indenyl ($C_9$), decahydronaphthalenyl ($C_{10}$), spiro[4.5]decanyl ($C_{10}$), and the like. As the foregoing examples illustrate, in certain embodiments, the carbocyclyl group is either monocyclic ("monocyclic carbocyclyl") or contain a fused, bridged, or spiro ring system such as a bicyclic system ("bicyclic carbocyclyl"). Carbocyclyl can be saturated, and saturated carbocyclyl is referred to as "cycloalkyl." In some embodiments, carbocyclyl is a monocyclic, saturated carbocyclyl group having from 3 to 10 ring carbon atoms ("$C_{3-10}$ cycloalkyl"). In some embodiments, a cycloalkyl group has 3 to 8 ring carbon atoms ("$C_{3-8}$ cycloalkyl"). In some embodiments, a cycloalkyl group has 3 to 6 ring carbon atoms ("$C_{3-6}$ cycloalkyl"). In some embodiments, a cycloalkyl group has 5 to 6 ring carbon atoms ("$C_{5-6}$ cycloalkyl"). In some embodiments, a cycloalkyl group has 5 to 10 ring carbon atoms ("$C_{5-10}$ cycloalkyl"). Examples of $C_{5-6}$ cycloalkyl groups include cyclopentyl ($C_5$) and cyclohexyl ($C_5$). Examples of $C_{3-6}$ cycloalkyl groups include the aforementioned $C_{5-6}$ cycloalkyl groups as well as cyclopropyl ($C_3$) and cyclobutyl ($C_4$). Examples of $C_{3-8}$ cycloalkyl groups include the aforementioned $C_{3-6}$ cycloalkyl groups as well as cycloheptyl ($C_7$) and cyclooctyl ($C_8$). Unless otherwise specified, each instance of a cycloalkyl group is independently unsubstituted (an "unsubstituted cycloalkyl") or substituted (a "substituted cycloalkyl") with one or more substituents. In certain embodiments, the cycloalkyl group is unsubstituted $C_{3-10}$ cycloalkyl. In certain embodiments, the cycloalkyl group is substituted $C_{3-10}$ cycloalkyl. Carbocyclyl can be partially unsaturated. Carbocyclyl may include zero, one, or more (e.g., two, three, or four, as valency permits) C=C double bonds in all the rings of the carbocyclic ring system that are not aromatic or heteroaromatic. Carbocyclyl including one or more (e.g., two or three, as valency permits) C=C double bonds in the carbocyclic ring is referred to as "cycloalkenyl." Carbocyclyl including one or more (e.g., two or three, as valency permits) C=C triple bonds in the carbocyclic ring is referred to as "cycloalkynyl." Carbocyclyl includes aryl. "Carbocyclyl" also includes ring systems wherein the carbocyclyl ring, as defined above, is fused with one or more aryl or heteroaryl groups wherein the point of attachment is on the carbocyclyl ring, and in such instances, the number of carbons continue to designate the number of carbons in the carbocyclic ring system. Unless otherwise specified, each instance of a carbocyclyl group is independently optionally substituted, e.g., unsubstituted (an "unsubstituted carbocyclyl") or substituted (a "substituted carbocyclyl") with one or more substituents. In certain embodiments, the carbocyclyl group is unsubstituted $C_{3-10}$ carbocyclyl. In certain embodiments, the carbocyclyl group is a substituted $C_{3-10}$ carbocyclyl. In certain embodiments, the carbocyclyl is substituted or unsubstituted, 3- to 7-membered, and monocyclic. In certain embodiments, the carbocyclyl is substituted or unsubstituted, 5- to 13-membered, and bicyclic.

In some embodiments, "carbocyclyl" is a monocyclic, saturated carbocyclyl group having from 3 to 10 ring carbon atoms ("$C_{3-10}$ cycloalkyl"). In some embodiments, a cycloalkyl group has 3 to 8 ring carbon atoms ("$C_{3-8}$ cycloalkyl"). In some embodiments, a cycloalkyl group has 3 to 6 ring carbon atoms ("$C_{3-6}$ cycloalkyl"). In some embodiments, a cycloalkyl group has 5 to 6 ring carbon atoms ("$C_{5-6}$ cycloalkyl"). In some embodiments, a cycloalkyl group has 5 to 10 ring carbon atoms ("$C_{5-10}$ cycloalkyl"). Examples of $C_{5-6}$ cycloalkyl groups include cyclopentyl ($C_5$) and cyclohexyl ($C_5$). Examples of $C_{3-6}$ cycloalkyl groups include the aforementioned $C_{5-6}$ cycloalkyl groups as well as cyclopropyl ($C_3$) and cyclobutyl ($C_4$). Examples of $C_{3-8}$ cycloalkyl groups include the aforementioned $C_{3-6}$ cycloalkyl groups as well as cycloheptyl ($C_7$) and cyclooctyl ($C_8$). Unless otherwise specified, each instance of a cycloalkyl group is independently unsubstituted (an "unsubstituted cycloalkyl") or substituted (a "substituted cycloalkyl") with one or more substituents. In certain embodiments, the cycloalkyl group is unsubstituted $C_{3-10}$ cycloalkyl. In certain embodiments, the cycloalkyl group is substituted $C_{3-10}$ cycloalkyl.

"Heterocyclyl" or "heterocyclic" refers to a radical of a 3- to 13-membered non-aromatic ring system having ring carbon atoms and 1 to 4 ring heteroatoms, wherein each heteroatom is independently selected from nitrogen, oxygen, and sulfur ("3-13 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or a fused, bridged, or spiro ring system such as a bicyclic system ("bicyclic heterocyclyl"). A heterocyclyl group can be saturated or can be partially unsaturated. Heterocyclyl may include zero, one, or more (e.g., two, three, or four, as valency permits) double bonds in all the rings of the heterocyclic ring system that are not aromatic or heteroaromatic. Partially unsaturated heterocyclyl groups includes heteroaryl. Heterocyclyl bicyclic ring systems can include one or more heteroatoms in one or both rings. "Heterocyclyl" also includes ring systems wherein the heterocyclyl ring, as defined above, is fused with one or more carbocyclyl groups wherein the point of attachment is either on the carbocyclyl or heterocyclyl ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. Unless otherwise specified, each instance of heterocyclyl is independently optionally substituted, e.g., unsubstituted (an "unsubstituted heterocyclyl") or substituted (a "substituted heterocyclyl") with one or more substituents. In certain embodiments, the heterocyclyl group is unsubstituted 3-10 membered heterocyclyl. In certain embodiments, the heterocyclyl group is substituted 3-10 membered heterocyclyl. In certain embodiments, the heterocyclyl is substituted or unsubstituted, 3- to 7-membered, and monocyclic. In certain embodiments, the heterocyclyl is substituted or unsubstituted, 5- to 13-membered, and bicyclic.

In some embodiments, a heterocyclyl group is a 5-10 membered non-aromatic ring system having ring carbon atoms and 1-4 ring heteroatoms, wherein each heteroatom is independently selected from nitrogen, oxygen, and sulfur ("5-10 membered heterocyclyl"). In some embodiments, a heterocyclyl group is a 5-8 membered non-aromatic ring system having ring carbon atoms and 1-4 ring heteroatoms, wherein each heteroatom is independently selected from nitrogen, oxygen, and sulfur ("5-8 membered heterocyclyl"). In some embodiments, a heterocyclyl group is a 5-6 membered non-aromatic ring system having ring carbon atoms and 1-4 ring heteroatoms, wherein each heteroatom is independently selected from nitrogen, oxygen, and sulfur ("5-6 membered heterocyclyl"). In some embodiments, the 5-6 membered heterocyclyl has 1-3 ring heteroatoms selected from nitrogen, oxygen, and sulfur. In some embodiments, the 5-6 membered heterocyclyl has 1-2 ring heteroatoms selected from nitrogen, oxygen, and sulfur. In some embodiments, the 5-6 membered heterocyclyl has one ring heteroatom selected from nitrogen, oxygen, and sulfur.

Exemplary 3-membered heterocyclyl groups containing one heteroatom include azirdinyl, oxiranyl, or thiiranyl. Exemplary 4-membered heterocyclyl groups containing one heteroatom include azetidinyl, oxetanyl and thietanyl. Exemplary 5-membered heterocyclyl groups containing one heteroatom include tetrahydrofuranyl, dihydrofuranyl, tetrahydrothiophenyl, dihydrothiophenyl, pyrrolidinyl, dihydropyrrolyl and pyrrolyl-2,5-dione. Exemplary 5-membered heterocyclyl groups containing two heteroatoms include dioxolanyl, oxasulfuranyl, disulfuranyl, and oxazolidin-2-one. Exemplary 5-membered heterocyclyl groups containing three heteroatoms include triazolinyl, oxadiazolinyl, and thiadiazolinyl. Exemplary 6-membered heterocyclyl groups containing one heteroatom include piperidinyl, tetrahydropyranyl, dihydropyridinyl, and thianyl. Exemplary 6-membered heterocyclyl groups containing two heteroatoms include piperazinyl, morpholinyl, dithianyl, and dioxanyl. Exemplary 6-membered heterocyclyl groups containing two heteroatoms include triazinanyl. Exemplary 7-membered heterocyclyl groups containing one heteroatom include azepanyl, oxepanyl and thiepanyl. Exemplary 8-membered heterocyclyl groups containing one heteroatom include azocanyl, oxecanyl, and thiocanyl. Exemplary 5-membered heterocyclyl groups fused to a $C_6$ aryl ring (also referred to herein as a 5,6-bicyclic heterocyclic ring) include indolinyl, isoindolinyl, dihydrobenzofuranyl, dihydrobenzothienyl, benzoxazolinonyl, and the like. Exemplary 6-membered heterocyclyl groups fused to an aryl ring (also referred to herein as a 6,6-bicyclic heterocyclic ring) include tetrahydroquinolinyl, tetrahydroisoquinolinyl, and the like.

"Aryl" refers to a radical of a monocyclic or polycyclic (e.g., bicyclic or tricyclic) 4n+2 aromatic ring system (e.g., having 6, 10, or 14 π electrons shared in a cyclic array) having 6-14 ring carbon atoms and zero heteroatoms provided in the aromatic ring system ("$C_{6-14}$ aryl"). In some embodiments, an aryl group has six ring carbon atoms ("$C_6$ aryl"; e.g., phenyl). In some embodiments, an aryl group has ten ring carbon atoms ("$C_{10}$ aryl"; e.g., naphthyl such as 1-naphthyl and 2-naphthyl). In some embodiments, an aryl group has fourteen ring carbon atoms ("$C_{14}$ aryl"; e.g., anthracyl). "Aryl" also includes ring systems wherein the aryl ring, as defined above, is fused with one or more carbocyclyl or heterocyclyl groups wherein the radical or point of attachment is on the aryl ring, and in such instances, the number of carbon atoms continue to designate the number of carbon atoms in the aryl ring system. Unless otherwise specified, each instance of an aryl group is independently optionally substituted, e.g., unsubstituted (an "unsubstituted aryl") or substituted (a "substituted aryl") with one or more substituents. In certain embodiments, the aryl group is unsubstituted $C_{6-14}$ aryl. In certain embodiments, the aryl group is substituted $C_{6-14}$ aryl.

"Heteroaryl" refers to a radical of a 5-10 membered monocyclic or bicyclic 4n+2 aromatic ring system (e.g., having 6 or 10 π electrons shared in a cyclic array) having ring carbon atoms and 1-4 ring heteroatoms provided in the aromatic ring system, wherein each heteroatom is independently selected from nitrogen, oxygen and sulfur ("5-10 membered heteroaryl"). In heteroaryl groups that contain one or more nitrogen atoms, the point of attachment can be a carbon or nitrogen atom, as valency permits. Heteroaryl bicyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused (aryl/heteroaryl) ring system. Bicyclic heteroaryl groups wherein one ring does not contain a heteroatom (e.g., indolyl, quinolinyl, carbazolyl, and the like) the point of attachment can be on either ring, e.g., either the ring bearing a heteroatom (e.g., 2-indolyl) or the ring that does not contain a heteroatom (e.g., 5-indolyl).

In some embodiments, a heteroaryl group is a 5-10 membered aromatic ring system having ring carbon atoms and 1-4 ring heteroatoms provided in the aromatic ring system, wherein each heteroatom is independently selected from nitrogen, oxygen, and sulfur ("5-10 membered heteroaryl"). In some embodiments, a heteroaryl group is a 5-8 membered aromatic ring system having ring carbon atoms and 1-4 ring heteroatoms provided in the aromatic ring system, wherein each heteroatom is independently selected from nitrogen, oxygen, and sulfur ("5-8 membered heteroaryl"). In some embodiments, a heteroaryl group is a 5-6 membered aromatic ring system having ring carbon atoms and 1-4 ring heteroatoms provided in the aromatic ring system, wherein each heteroatom is independently selected from nitrogen, oxygen, and sulfur ("5-6 membered heteroaryl"). In some embodiments, the 5-6 membered heteroaryl has 1-3 ring heteroatoms selected from nitrogen, oxygen, and sulfur. In some embodiments, the 5-6 membered heteroaryl has 1-2 ring heteroatoms selected from nitrogen, oxygen, and sulfur. In some embodiments, the 5-6 membered heteroaryl has 1 ring heteroatom selected from nitrogen, oxygen, and sulfur. Unless otherwise specified, each instance of a heteroaryl group is independently optionally substituted, e.g., unsubstituted ("unsubstituted heteroaryl") or substituted ("substituted heteroaryl") with one or more substituents. In certain embodiments, the heteroaryl group is unsubstituted 5-14 membered heteroaryl. In certain embodiments, the heteroaryl group is substituted 5-14 membered heteroaryl.

Exemplary 5-membered heteroaryl groups containing one heteroatom include pyrrolyl, furanyl and thiophenyl. Exemplary 5-membered heteroaryl groups containing two heteroatoms include imidazolyl, pyrazolyl, oxazolyl, isoxazolyl, thiazolyl, and isothiazolyl. Exemplary 5-membered heteroaryl groups containing three heteroatoms include triazolyl, oxadiazolyl, and thiadiazolyl. Exemplary 5-membered heteroaryl groups containing four heteroatoms include tetrazolyl. Exemplary 6-membered heteroaryl groups containing one heteroatom include pyridinyl. Exemplary 6-membered heteroaryl groups containing two heteroatoms include pyridazinyl, pyrimidinyl, and pyrazinyl. Exemplary 6-membered heteroaryl groups containing three or four heteroatoms include triazinyl and tetrazinyl, respectively. Exemplary 7-membered heteroaryl groups containing one heteroatom include azepinyl, oxepinyl, and thiepinyl. Exemplary 5,6-bicyclic heteroaryl groups include indolyl, isoindolyl, indazolyl, benzotriazolyl, benzothiophenyl, isobenzothiophenyl, benzofuranyl, benzoisofuranyl, benzimidazolyl, benzoxazolyl, benzisoxazolyl, benzoxadiazolyl, benzthiazolyl, benzisothiazolyl, benzthiadiazolyl, indolizinyl, and purinyl. Exemplary 6,6-bicyclic heteroaryl groups include naphthyridinyl, pteridinyl, quinolinyl, isoquinolinyl, cinnolinyl, quinoxalinyl, phthalazinyl, and quinazolinyl.

"Partially unsaturated" refers to a group that includes at least one double or triple bond. The term "partially unsaturated" is intended to encompass rings having multiple sites of unsaturation, but is not intended to include aromatic groups (e.g., aryl or heteroaryl groups) as herein defined. Likewise, "saturated" refers to a group that does not contain a double or triple bond, i.e., contains all single bonds.

In some embodiments, aliphatic, alkyl, alkenyl, alkynyl, carbocyclyl, heterocyclyl, aryl, and heteroaryl groups, as defined herein, are optionally substituted (e.g., "substituted" or "unsubstituted" alkyl, "substituted" or "unsubstituted" alkenyl, "substituted" or "unsubstituted" alkynyl, "substituted" or "unsubstituted" carbocyclyl, "substituted" or "unsubstituted" heterocyclyl, "substituted" or "unsubstituted" aryl or "substituted" or "unsubstituted" heteroaryl group). In general, the term "substituted", whether preceded by the term "optionally" or not, means that at least one hydrogen present on a group (e.g., a carbon or nitrogen atom) is replaced with a permissible substituent, e.g., a substituent which upon substitution results in a stable compound, e.g., a compound which does not spontaneously undergo transformation such as by rearrangement, cyclization, elimination, or other reaction. Unless otherwise indicated, a "substituted" group has a substituent at one or more substitutable positions of the group, and when more than one position in any given structure is substituted, the substituent is either the same or different at each position. The term "substituted" is contemplated to include substitution with all permissible substituents of organic compounds, any of the substituents described herein that results in the formation of a stable compound. The present disclosure contemplates any and all such combinations in order to arrive at a stable compound. For purposes of this disclosure, heteroatoms such as nitrogen may have hydrogen substituents and/or any suitable substituent as described herein which satisfy the valencies of the heteroatoms and results in the formation of a stable moiety.

Exemplary carbon atom substituents include halogen, —CN, —NO$_2$, —N$_3$, —SO$_2$H, —SO$_3$H, —OH, —OR$^{aa}$, —ON(R$^{bb}$)$_2$, —N(R$^{bb}$)$_2$, —N(R$^{bb}$)$_3$$^+$X$^-$, —N(OR$^{cc}$)R$^{bb}$, —SH, —SR$^{aa}$, —SSR$^{cc}$, —C(=O)R$^{aa}$, —CO$_2$H, —CHO, —C(OR$^{cc}$)$_2$, —CO$_2$R$^{aa}$, —OC(=O)R$^{aa}$, —OCO$_2$R$^{aa}$, —C(=O)N(R$^{bb}$)$_2$, —OC(=O)N(R$^{bb}$)$_2$, —NR$^{bb}$C(=O)R$^{aa}$, —NR$^{bb}$CO$_2$R$^{aa}$, —NR$^{bb}$C(=O)N(R$^{bb}$)$_2$, —C(=NR$^{bb}$)R$^{aa}$, —C(=NR$^{bb}$)OR$^{aa}$, —OC(=NR$^{bb}$)R$^{aa}$, —OC(=NR$^{bb}$)OR$^{aa}$, —C(=NR$^{bb}$)N(R$^{bb}$)$_2$, —OC(=NR$^{bb}$)N(R$^{bb}$)$_2$, —NR$^{bb}$C(=NR$^{bb}$)N(R$^{bb}$)$_2$, —C(=O) NR$^{bb}$SO$_2$R$^{aa}$, —NR$^{bb}$SO$_2$R$^{aa}$, —SO$_2$N(R$^{bb}$)$_2$, —SO$_2$R$^{aa}$, —SO$_2$OR$^{aa}$, —OSO$_2$R$^{aa}$, —S(=O)R$^{aa}$, —OS(=O)R$^{aa}$, —Si(R$^{aa}$)$_3$, —OSi(R$^{aa}$)$_3$, —C(=S)N(R$^{bb}$)$_2$, —C(=O) SR$^{aa}$, —C(=S)SR$^{aa}$, —SC(=S)SR$^{aa}$, —SC(=O)SR$^{aa}$, —OC(=O)SR$^{aa}$, —SC(=O)OR$^{aa}$, —SC(=O)R$^{aa}$, —P(=O)(R$^{aa}$)$_2$, —P(=O)(OR$^{cc}$)$_2$, —OP(=O)(R$^{aa}$)$_2$, —OP(=O)(OR$^{cc}$)$_2$, —P(=O)(N(R$^{bb}$)$_2$)$_2$, —OP(=O)(N (R$^{bb}$)$_2$)$_2$, —NR$^{bb}$P(=O)(R$^{aa}$)$_2$, —NR$^{bb}$P(=O)(OR$^{cc}$)$_2$, —NR$^{bb}$P(=O)(N(R$^{bb}$)$_2$)$_2$, —P(R$^{cc}$)$_2$, —P(OR$^{cc}$)$_2$, —P(R$^{cc}$)$_3$$^+$X$^-$, —P(OR$^{cc}$)$_3$$^+$X$^-$, —P(R$^{cc}$)$_4$, —P(OR$^{cc}$)$_4$, —OP (R$^{cc}$)$_2$, —OP(R$^{cc}$)$_3$$^+$X$^-$, —OP(OR$^{cc}$)$_2$, —OP(OR$^{cc}$)$_3$$^+$X$^-$, —OP(R$^{cc}$)$_4$, —OP(OR$^{cc}$)$_4$, —B(R$^{aa}$)$_2$, —B(OR$^{cc}$)$_2$, —BR$^{aa}$ (OR$^{cc}$), C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups; wherein X$^-$ is a counterion;

or two geminal hydrogens on a carbon atom are replaced with the group =O, =S, =NN(R$^{bb}$)$_2$, =NNR$^{bb}$C(=O) R$^{aa}$, =NNR$^{bb}$C(=O)OR$^{aa}$, =NNR$^{bb}$S(=O)$_2$R$^{aa}$, =NR$^{bb}$, or =NOR$^{cc}$;

each instance of R$^{aa}$ is, independently, selected from C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$alkenyl, heteroC$_{2-10}$alkynyl, C$_{3-10}$ carbocyclyl, 3-14 membered heterocyclyl, C$_{6-14}$ aryl, and 5-14 membered heteroaryl, or two R$^{aa}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{bb}$ is, independently, selected from hydrogen, —OH, —OR$^{aa}$, —N(R$^{cc}$)$_2$, —CN, —C(=O)R$^{aa}$, —C(=O)N(R$^{cc}$)$_2$, —CO$_2$R$^{aa}$, —SO$_2$R$^{aa}$, —C(=NR$^{cc}$) OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, —P(=O)(R$^{aa}$)$_2$, —P(=O)(OR$^{cc}$)$_2$, —P(=O)(N(R$^{cc}$)$_2$)$_2$, C$_{1-10}$ alkyl, C$_{1-10}$ perhaloalkyl, C$_{2-10}$ alkenyl, C$_{2-10}$ alkynyl, heteroC$_{1-10}$alkyl, heteroC$_{2-10}$alkenyl, heteroC$_{2-10}$alkynyl, C$_{3-10}$ carbocyclyl, 3-14 membered heterocyclyl, C$_{6-14}$ aryl, and 5-14 membered heteroaryl, or two $R^{bb}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 $R^{dd}$ groups; wherein $X^-$ is a counterion;

each instance of $R^{cc}$ is, independently, selected from hydrogen, $C_{1-10}$ alkyl, $C_{1-10}$ perhaloalkyl, $C_{2-10}$ alkenyl, $C_{2-10}$ alkynyl, hetero$C_{1-10}$ alkyl, hetero$C_{2-10}$ alkenyl, hetero$C_{2-10}$ alkynyl, $C_{3-10}$ carbocyclyl, 3-14 membered heterocyclyl, $C_{6-14}$ aryl, and 5-14 membered heteroaryl, or two $R^{cc}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 $R^{dd}$ groups;

each instance of $R^{dd}$ is, independently, selected from halogen, —CN, —NO$_2$, —N$_3$, —SO$_2$H, —SO$_3$H, —OH, —ON($R^{ff}$)$_2$, —N($R^{ff}$)$_2$, —N($R^{ff}$)$_3^+$X$^-$, —N(OR$^{ee}$)R$^{ff}$, —SH, —SSR$^{ee}$, —C(=O)R$^{ee}$, —CO$_2$H, —CO$_2$R$^{ee}$, —OC(=O)R$^{ee}$, —OCO$_2$R$^{ee}$, —C(=O)N(R$^{ff}$)$_2$, —OC(=O)N(R$^{ff}$)$_2$, —NR$^{ff}$C(=O)R$^{ee}$, —NR$^{ff}$CO$_2$R$^{ee}$, —NR$^{ff}$C(=O)N(R$^{ff}$)$_2$, —C(=NR$^{ff}$)OR$^{ee}$, —OC(=NR$^{ff}$)R$^{ee}$, —OC(=NR$^{ff}$)OR$^{ee}$, —C(=NR$^{ff}$)N(R$^{ff}$)$_2$, —OC(=NR$^{ff}$)N(R$^{ff}$)$_2$, —NR$^{ff}$C(=NR$^{ff}$)N(R$^{ff}$)$_2$, —NR$^{ff}$SO$_2$R$^{ee}$, —SO$_2$N(R$^{ff}$)$_2$, SO$_2$R$^{ee}$, —SO$_2$OR$^{ee}$, —OSO$_2$R$^{ee}$, —S(=O)R$^{ee}$, —Si(R$^{ee}$)$_3$, —OSi(R$^{ee}$)$_3$, —C(=S)N(R$^{ff}$)$_2$, —C(=O)SR$^{ee}$, —C(=S)SR$^{ee}$, —SC(=S)SR$^{ee}$, —P(=O)(OR$^{ee}$)$_2$, —P(=O)(R$^{ee}$)$_2$, —OP(=O)(R$^{ee}$)$_2$, —OP(=O)(OR$^{ee}$)$_2$, $C_{1-6}$ alkyl, $C_{1-6}$ perhaloalkyl, $C_{2-6}$ alkenyl, $C_{2-6}$ alkynyl, hetero$C_{1-6}$alkyl, hetero$C_{2-6}$alkenyl, hetero$C_{2-6}$alkynyl, $C_{3-10}$ carbocyclyl, 3-10 membered heterocyclyl, $C_{6-10}$ aryl, 5-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 $R^{gg}$ groups, or two geminal $R^{dd}$ substituents can be joined to form =O or =S; wherein $X^-$ is a counterion;

each instance of $R^{ee}$ is, independently, selected from $C_{1-6}$ alkyl, $C_{1-6}$ perhaloalkyl, $C_{2-6}$ alkenyl, $C_{2-6}$ alkynyl, hetero$C_{1-6}$ alkyl, hetero$C_{2-6}$alkenyl, hetero$C_{2-6}$ alkynyl, $C_{3-10}$ carbocyclyl, $C_{6-10}$ aryl, 3-10 membered heterocyclyl, and 3-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 $R^{gg}$ groups;

each instance of $R^{ff}$ is, independently, selected from hydrogen, $C_{1-6}$ alkyl, $C_{1-6}$ perhaloalkyl, $C_{2-6}$ alkenyl, $C_{2-6}$ alkynyl, hetero$C_{1-6}$alkyl, hetero$C_{2-6}$alkenyl, hetero$C_{2-6}$alkynyl, $C_{3-10}$ carbocyclyl, 3-10 membered heterocyclyl, $C_{6-10}$ aryl and 5-10 membered heteroaryl, or two $R^{ff}$ groups are joined to form a 3-10 membered heterocyclyl or 5-10 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 $R^{gg}$ groups; and each instance of $R^{gg}$ is, independently, halogen, —CN, —NO$_2$, —N$_3$, —SO$_2$H, —SO$_3$H, —OH, —OC$_{1-6}$ alkyl, —ON(C$_{1-6}$ alkyl)$_2$, —N(C$_{1-6}$ alkyl)$_2$, —N(C$_{1-6}$ alkyl)$_3^+$X$^-$, —NH(C$_{1-6}$ alkyl)$_2^+$X$^-$, —NH$_2$(C$_{1-6}$ alkyl)$^+$X$^-$, —NH$_3^+$X$^-$, —N(OC$_{1-6}$ alkyl)(C$_{1-6}$ alkyl), —N(OH)(C$_{1-6}$ alkyl), —NH(OH), —SH, —SC$_{1-6}$ alkyl, —SS(C$_{1-6}$ alkyl), —C(=O)(C$_{1-6}$ alkyl), —CO$_2$H, —CO$_2$(C$_{1-6}$ alkyl), —OC(=O)(C$_{1-6}$ alkyl), —OCO$_2$(C$_{1-6}$ alkyl), —C(=O)NH$_2$, —C(=O)N(C$_{1-6}$ alkyl)$_2$, —OC(=O)NH(C$_{1-6}$ alkyl), —NHC(=O)(C$_{1-6}$ alkyl), —N(C$_{1-6}$ alkyl)C(=O)(C$_{1-6}$ alkyl), —NHCO$_2$(C$_{1-6}$ alkyl), —NHC(=O)N(C$_{1-6}$ alkyl)$_2$, —NHC(=O)NH(C$_{1-6}$ alkyl), —NHC(=O)NH$_2$, —C(=NH)O(C$_{1-6}$ alkyl), —OC(=NH)(C$_{1-6}$ alkyl), —OC(=NH)OC$_{1-6}$ alkyl, —C(=NH)N(C$_{1-6}$ alkyl)$_2$, —C(=NH)NH(C$_{1-6}$ alkyl), —C(=NH)NH$_2$, —OC(=NH)N(C$_{1-6}$ alkyl)$_2$, —OC(NH)NH(C$_{1-6}$ alkyl), —OC(NH)NH$_2$, —NHC(NH)N(C$_{1-6}$ alkyl)$_2$, —NHC(=NH)NH$_2$, —NHSO$_2$(C$_{1-6}$ alkyl), —SO$_2$N(C$_{1-6}$ alkyl)$_2$, —SO$_2$NH(C$_{1-6}$ alkyl), —SO$_2$NH$_2$, —SO$_2$C$_{1-6}$ alkyl, —SO$_2$OC$_{1-6}$ alkyl, —OSO$_2$C$_{1-6}$ alkyl, —SOC$_{1-6}$ alkyl, —Si(C$_{1-6}$ alkyl)$_3$, —OSi(C$_{1-6}$ alkyl)$_3$ —C(=S)N(C$_{1-6}$ alkyl)$_2$, C(=S)NH(C$_{1-6}$ alkyl), C(=S)NH$_2$, —C(=O)S(C$_{1-6}$ alkyl), —C(=S)SC$_{1-6}$ alkyl, —SC(=S)SC$_{1-6}$ alkyl, —P(=O)(OC$_{1-6}$ alkyl)$_2$, —P(=O)(C$_{1-6}$ alkyl)$_2$, —OP(=O)(C$_{1-6}$ alkyl)$_2$, —OP(=O)(OC$_{1-6}$ alkyl)$_2$, $C_{1-6}$ alkyl, $C_{1-6}$ perhaloalkyl, $C_{2-6}$ alkenyl, $C_{2-6}$ alkynyl, hetero$C_{1-6}$alkyl, hetero$C_{2-6}$alkenyl, hetero$C_{2-6}$alkynyl, $C_3$-10 carbocyclyl, $C_6$-10 aryl, 3-10 membered heterocyclyl, 5-10 membered heteroaryl; or two geminal $R^{gg}$ substituents can be joined to form =O or =S; wherein $X^-$ is a counterion.

In certain embodiments, the carbon atom substituents are independently halogen, substituted (e.g., substituted with one or more halogen) or unsubstituted $C_{1-6}$ alkyl, —OR$^{aa}$, —SR$^{aa}$, —N(R$^{bb}$)$_2$, —CN, —SCN, —NO$_2$, —C(=O)R$^{aa}$, —CO$_2$R$^{aa}$, —C(=O)N(R$^{bb}$)$_2$, —OC(=O)R$^{aa}$, —OCO$_2$R$^{aa}$, —OC(=O)N(R$^{bb}$)$_2$, —NR$^{bb}$C(=O)R$^{aa}$, —NR$^{bb}$CO$_2$R$^{aa}$, or —NR$^{bb}$C(=O)N(R$^{bb}$)$_2$. In certain embodiments, the carbon atom substituents are independently halogen, substituted (e.g., substituted with one or more halogen) or unsubstituted $C_{1-6}$ alkyl, —OR$^{aa}$, —SR$^{aa}$, —N(R$^{bb}$)$_2$, —CN, —SCN, —NO$_2$, C(=O)R$^{aa}$, —CO$_2$R$^{aa}$, —C(=O)N(R$^{bb}$)$_2$, —OC(=O)R$^{aa}$, —OCO$_2$R$^{aa}$, —OC(=O)N(R$^{bb}$)$_2$, —NR$^{bb}$C(=O)R$^{aa}$, —NR$^{bb}$CO$_2$R$^{aa}$, or —NR$^{bb}$C(=O)N(R$^{bb}$)$_2$, wherein R$^{aa}$ is hydrogen, substituted (e.g., substituted with one or more halogen) or unsubstituted $C_{1-6}$ alkyl, an oxygen protecting group when attached to an oxygen atom, or a sulfur protecting group (e.g., acetamidomethyl, t-Bu, 3-nitro-2-pyridine sulfenyl, 2-pyridine-sulfenyl, or triphenylmethyl) when attached to a sulfur atom; and each R$^{bb}$ is independently hydrogen, substituted (e.g., substituted with one or more halogen) or unsubstituted $C_{1-6}$ alkyl, or a nitrogen protecting group. In certain embodiments, the carbon atom substituents are independently halogen, substituted (e.g., substituted with one or more halogen) or unsubstituted $C_{1-6}$ alkyl, —OR$^{aa}$, —SR$^{aa}$, —N(R$^{bb}$)$_2$, —CN, —SCN, or —NO$_2$. In certain embodiments, the carbon atom substituents are independently halogen, substituted (e.g., substituted with one or more halogen moieties) or unsubstituted $C_{1-6}$ alkyl, —OR$^{aa}$, —SR$^{aa}$, —N(R$^{bb}$)$_2$, —CN, —SCN, or —NO$_2$, wherein R$^{aa}$ is hydrogen, substituted (e.g., substituted with one or more halogen) or unsubstituted $C_{1-6}$ alkyl, an oxygen protecting group when attached to an oxygen atom, or a sulfur protecting group (e.g., acetamidomethyl, t-Bu, 3-nitro-2-pyridine sulfenyl, 2-pyridine-sulfenyl, or triphenylmethyl) when attached to a sulfur atom; and each R$^{bb}$ is independently hydrogen, substituted (e.g., substituted with one or more halogen) or unsubstituted $C_{1-6}$ alkyl, or a nitrogen protecting group.

A "counterion" or "anionic counterion" is a negatively charged group associated with a positively charged group in order to maintain electronic neutrality. An anionic counterion may be monovalent (i.e., including one formal negative charge). An anionic counterion may also be multivalent (i.e., including more than one formal negative charge), such as divalent or trivalent. Exemplary counterions include halide ions (e.g., F$^-$, Cl$^-$, Br$^-$, I$^-$), NO$_3^-$, ClO$_4^-$, OH$^-$, H$_2$PO$_4^-$, HCO$_3^-$, HSO$_4^-$, sulfonate ions (e.g., methansulfonate, trifluoromethanesulfonate, p-toluenesulfonate, benzenesulfonate, 10-camphor sulfonate, naphthalene-2-sulfonate, naphthalene-1-sulfonic acid-5-sulfonate, ethan-1-sulfonic acid-2-sulfonate, and the like), carboxylate ions (e.g., acetate, propanoate, benzoate, glycerate, lactate, tartrate, glycolate, gluconate, and the like), $BF_4^-$, $PF_4^-$, $PF_6^-$, $AsF_6^-$, $SbF_6^-$, $B[3,5\text{-}(CF_3)_2C_6H_3]_4^-$, $B(C_6F_5)_4^-$, $BPh_4^-$, $Al(OC(CF_3)_3)_4^-$, and carborane anions (e.g., $CB_{11}H_{12}^-$ or $(HCB_{11}Me_5Br_6)^-$). Exemplary counterions which may be multivalent include $CO_3^{2-}$, $HPO_4^{2-}$, $PO_4^{3-}$, $B_4O_7^{2-}$, $SO_4^{2-}$, $S_2O_3^{2-}$, carboxylate anions (e.g., tartrate, citrate, fumarate, maleate, malate, malonate, gluconate, succinate, glutarate, adipate, pimelate, suberate, azelate, sebacate, salicylate, phthalates, aspartate, glutamate, and the like), and carboranes.

"Halo" or "halogen" refers to fluorine (fluoro, —F), chlorine (chloro, —Cl), bromine (bromo, —Br), or iodine (iodo, —I).

Nitrogen atoms can be substituted or unsubstituted as valency permits, and include primary, secondary, tertiary, and quaternary nitrogen atoms. Exemplary nitrogen atom substituents include hydrogen, —OH, —OR$^{aa}$, —N(R$^{cc}$)$_2$, —CN, —C(=O)R$^{aa}$, —C(=O)N(R$^{cc}$)$_2$, —CO$_2$R$^{aa}$, —SO$_2$R$^{aa}$, —C(=NR$^{bb}$)R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, —P(=O)(OR$^{cc}$)$_2$, —P(=O)(R$^{aa}$)$_2$, —P(=O)(N(R$^{cc}$)$_2$)$_2$, $C_{1\text{-}10}$ alkyl, $C_{1\text{-}10}$ perhaloalkyl, $C_{2\text{-}10}$ alkenyl, $C_{2\text{-}10}$ alkynyl, hetero$C_{1\text{-}10}$alkyl, hetero$C_{2\text{-}10}$alkenyl, hetero$C_{2\text{-}10}$alkynyl, $C_{3\text{-}10}$ carbocyclyl, 3-14 membered heterocyclyl, $C_{6\text{-}14}$ aryl, and 5-14 membered heteroaryl, or two R$^{cc}$ groups attached to an N atom are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups, and wherein R$^{aa}$, R$^{bb}$, R$^{cc}$ and R$^{dd}$ are as defined above.

In certain embodiments, the nitrogen atom substituents are independently substituted (e.g., substituted with one or more halogen) or unsubstituted $C_{1\text{-}6}$ alkyl, —C(=O)R$^{aa}$, —CO$_2$R$^{aa}$, —C(=O)N(R$^{bb}$)$_2$, or a nitrogen protecting group. In certain embodiments, the nitrogen atom substituents are independently substituted (e.g., substituted with one or more halogen) or unsubstituted $C_{1\text{-}6}$ alkyl, C(=O)R$^{aa}$, —CO$_2$R$^{aa}$, —C(=O)N(R$^{bb}$)$_2$, or a nitrogen protecting group, wherein R$^{aa}$ is hydrogen, substituted (e.g., substituted with one or more halogen) or unsubstituted $C_{1\text{-}6}$ alkyl, or an oxygen protecting group when attached to an oxygen atom; and each R$^{bb}$ is independently hydrogen, substituted (e.g., substituted with one or more halogen) or unsubstituted $C_{1\text{-}6}$ alkyl, or a nitrogen protecting group. In certain embodiments, the nitrogen atom substituents are independently substituted (e.g., substituted with one or more halogen) or unsubstituted $C_{1\text{-}6}$ alkyl or a nitrogen protecting group.

In certain embodiments, the substituent present on a nitrogen atom is a nitrogen protecting group (also referred to as an amino protecting group). Nitrogen protecting groups include —OH, —OR$^{aa}$, —N(R$^{cc}$)$_2$, —C(=O)R$^{aa}$, —C(=O)N(R$^{cc}$)$_2$, —CO$_2$R$^{aa}$, —SO$_2$R$^{aa}$, —C(=NR$^{cc}$)R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, $C_{1\text{-}10}$ alkyl (e.g., aralkyl, heteroaralkyl), $C_{2\text{-}10}$ alkenyl, $C_{2\text{-}10}$ alkynyl, $C_{3\text{-}10}$ carbocyclyl, 3-14 membered heterocyclyl, $C_{6\text{-}14}$ aryl, and 5-14 membered heteroaryl groups, wherein each alkyl, alkenyl, alkynyl, carbocyclyl, heterocyclyl, aralkyl, aryl, and heteroaryl is independently substituted with 0, 1, 2, 3, 4, or 5 R$^{dd}$ groups, and wherein R$^{aa}$, R$^{bb}$, R$^{cc}$, and R$^{dd}$ are as defined herein. Nitrogen protecting groups are well known in the art and include those described in detail in *Protecting Groups in Organic Synthesis*, T. W. Greene and P. G. M. Wuts, 3$^{rd}$ edition, John Wiley & Sons, 1999, incorporated herein by reference.

Amide nitrogen protecting groups (e.g., —C(=O)R$^{aa}$) include formamide, acetamide, chloroacetamide, trichloroacetamide, trifluoroacetamide, phenylacetamide, 3-phenylpropanamide, picolinamide, 3-pyridylcarboxamide, N-benzoylphenylalanyl derivative, benzamide, p-phenylbenzamide, o-nitrophenylacetamide, o-nitrophenoxyacetamide, acetoacetamide, (N'-dithiobenzyloxyacylamino)acetamide, 3-(p-hydroxyphenyl)propanamide, 3-(o-nitrophenyl)propanamide, 2-methyl-2-(o-nitrophenoxy)propanamide, 2-methyl-2-(o-phenylazophenoxy)propanamide, 4-chlorobutanamide, 3-methyl-3-nitrobutanamide, o-nitrocinnamide, N-acetylmethionine, o-nitrobenzamide, and o-(benzoyloxymethyl)benzamide.

Carbamate nitrogen protecting groups (e.g., —C(=O)OR$^{aa}$) include methyl carbamate, ethyl carbamate, 9-fluorenylmethyl carbamate (Fmoc), 9-(2-sulfo)fluorenylmethyl carbamate, 9-(2,7-dibromo)fluorenylmethyl carbamate, 2,7-di-t-butyl-[9-(10,10-dioxo-10,10,10,10-tetrahydrothioxanthyl)]methyl carbamate (DBD-Tmoc), 4-methoxyphenacyl carbamate (Phenoc), 2,2,2-trichloroethyl carbamate (Troc), 2-trimethylsilylethyl carbamate (Teoc), 2-phenylethyl carbamate (hZ), 1-(1-adamantyl)-1-methylethyl carbamate (Adpoc), 1,1-dimethyl-2-haloethyl carbamate, 1,1-dimethyl-2,2-dibromoethyl carbamate (DB-t-BOC), 1,1-dimethyl-2,2,2-trichloroethyl carbamate (TCBOC), 1-methyl-1-(4-biphenylypethyl carbamate (Bpoc), 1-(3,5-di-t-butylphenyl)-1-methylethyl carbamate (t-Bumeoc), 2-(2'-and 4'-pyridyl)ethyl carbamate (Pyoc), 2-(N,N-dicyclohexylcarboxamido)ethyl carbamate, t-butyl carbamate (BOC), 1-adamantyl carbamate (Adoc), vinyl carbamate (Voc), allyl carbamate (Alloc), 1-isopropylallyl carbamate (Ipaoc), cinnamyl carbamate (Coc), 4-nitrocinnamyl carbamate (Noc), 8-quinolyl carbamate, N-hydroxypiperidinyl carbamate, alkyldithio carbamate, benzyl carbamate (Cbz), p-methoxybenzyl carbamate (Moz), p-nitrobenzyl carbamate, p-bromobenzyl carbamate, p-chlorobenzyl carbamate, 2,4-dichlorobenzyl carbamate, 4-methylsulfinylbenzyl carbamate (Msz), 9-anthrylmethyl carbamate, diphenylmethyl carbamate, 2-methylthioethyl carbamate, 2-methylsulphonylethyl carbamate, 2-(p-toluenesulfonyl)ethyl carbamate, [2-(1,3-dithianyl]methyl carbamate (Dmoc), 4-methylthiophenyl carbamate (Mtpc), 2,4-dimethylthiophenyl carbamate (Bmpc), 2-phosphonioethyl carbamate (Peoc), 2-triphenylphosphonioisopropyl carbamate (Ppoc), 1,1-dimethyl-2-cyanoethyl carbamate, mchloropacyloxybenzyl carbamate, p-(dihydroxyboryl)benzyl carbamate, 5-benzisoxazolylmethyl carbamate, 2-(trifluoromethyl)-6-chromonylmethyl carbamate (Tcroc), m-nitrophenyl carbamate, 3,5-dimethoxybenzyl carbamate, o-nitrobenzyl carbamate, 3,4-dimethoxy-6-nitrobenzyl carbamate, phenyl(o-nitrophenyl)methyl carbamate, t-amyl carbamate, S-benzyl thiocarbamate, p-cyanobenzyl carbamate, cyclobutyl carbamate, cyclohexyl carbamate, cyclopentyl carbamate, cyclopropylmethyl carbamate, p-decyloxybenzyl carbamate, 2,2-dimethoxyacylvinyl carbamate, o-(N,N-dimethylcarboxamido)benzyl carbamate, 1,1-dimethyl-3-(N,N-dimethylcarboxamido)propyl carbamate, 1,1-dimethylpropynyl carbamate, di(2-pyridyl)methyl carbamate, 2-furanylmethyl carbamate, 2-iodoethyl carbamate, isobornyl carbamate, isobutyl carbamate, isonicotinyl carbamate, p-(p'-methoxyphenylazo)benzyl carbamate, 1-methylcyclobutyl carbamate, 1-methylcyclohexyl carbamate, 1-methyllcyclopropylmethyl carbamate, 1-methyl-1-(3,5-dimethoxyphenyl)ethyl carbamate, 1-methyl-1-(p-phenylazophenyl)ethyl carbamate, 1-methyl-1-phenylethyl carbamate, 1-methyl-1-(4-pyridyl)ethyl carbamate, phenyl carbamate, p-(phenylazo) benzyl carbamate, 2,4,6-tri-t-butylphenyl carbamate, 4-(trimethylammonium)benzyl carbamate, and 2,4,6-trimethylbenzyl carbamate.

Sulfonamide nitrogen protecting groups (e.g., S(=O)$_2$R$^{aa}$) include p-toluenesulfonamide (Ts), benzenesulfonamide, 2,3,6-trimethyl-4-methoxybenzenesulfonamide (Mtr), 2,4,6-trimethoxybenzenesulfonamide (Mtb), 2,6-dimethyl-4-methoxybenzenesulfonamide (Pme), 2,3,5,6-tetramethyl-4-methoxybenzenesulfonamide (Mte), 4-methoxybenzenesulfonamide (Mbs), 2,4,6-trimethylbenzenesulfonamide (Mts), 2,6-dimethoxy-4-methylbenzenesulfonamide (iMds), 2,2,5,7,8-pentamethylchroman-6-sulfonamide (Pmc), methanesulfonamide (Ms), β-trimethylsilylethanesulfonamide (SES), 9-anthracenesulfonamide, 4-(4',8'-dimethoxynaphthylmethyl)benzenesulfonamide (DNMBS), benzylsulfonamide, trifluoromethylsulfonamide, and phenacylsulfonamide.

Other nitrogen protecting groups include phenothiazinyl-(10)-acyl derivative, N'-p-toluenesulfonylaminoacyl derivative, N'-phenylaminothioacyl derivative, N-benzoylphenylalanyl derivative, N-acetylmethionine derivative, 4,5-diphenyl-3-oxazolin-2-one, N-phthalimide, N-dithiasuccinimide (Dts), N-2,3-diphenylmaleimide, N-2,5-dimethylpyrrole, N-1,1,4,4-tetramethyldisilylazacyclopentane adduct (STABASE), 5-substituted 1,3-dimethyl-1,3,5-triazacyclohexan-2-one, 5-substituted 1,3-dibenzyl-1,3,5-triazacyclohexan-2-one, 1-substituted 3,5-dinitro-4-pyridone, N-methylamine, N-allylamine, N-[2-(trimethylsilyl)ethoxy]methylamine (SEM), N-3-acetoxypropylamine, N-(1-isopropyl-4-nitro-2-oxo-3-pyrrolin-3-yl)amine, quaternary ammonium salts, N-benzylamine, N-di(4-methoxyphenyl)methylamine, N-5-dibenzosuberylamine, N-triphenylmethylamine (Tr), N-[(4-methoxyphenyl)diphenylmethyl]amine (MMTr), N-9-phenylfluorenylamine (PhF), N-2,7-dichloro-9-fluorenylmethyleneamine, N-ferrocenylmethylamino (Fcm), N-2-picolylamino N'-oxide, N-1,1-dimethylthiomethyleneamine, N-benzylideneamine, N-p-methoxybenzylideneamine, N-diphenylmethyleneamine, N-[(2-pyridyl)mesityl]methyleneamine, N—(N',N'-dimethylaminomethylene) amine, N,N'-isopropylidenediamine, N-p-nitrobenzylideneamine, N-salicylideneamine, N-5-chlorosalicylideneamine, N-(5-chloro-2-hydroxyphenyl) phenylmethyleneamine, N-cyclohexylideneamine, N-(5,5-dimethyl-3-oxo-1-cyclohexenyl)amine, N-borane derivative, N-diphenylborinic acid derivative, N-[phenyl (pentaacylchromium- or tungsten)acyl]amine, N-copper chelate, N-zinc chelate, N-nitroamine, N-nitrosoamine, amine N-oxide, diphenylphosphinamide (Dpp), dimethylthiophosphinamide (Mpt), diphenylthiophosphinamide (Ppt), dialkyl phosphoramidates, dibenzyl phosphoramidate, diphenyl phosphoramidate, benzenesulfenamide, onitrobenzenesulfenamide (Nps), 2,4-dinitrobenzenesulfenamide, pentachlorobenzenesulfenamide, 2-nitro-4-methoxybenzenesulfenamide, triphenylmethylsulfenamide, and 3-nitropyridinesulfenamide (Npys).

In certain embodiments, a nitrogen protecting group is Bn, Boc, Cbz, Fmoc, trifluoroacetyl, triphenylmethyl, acetyl, or Ts.

In certain embodiments, the oxygen atom substituents are independently substituted (e.g., substituted with one or more halogen) or unsubstituted $C_{1-6}$ alkyl, C(=O)R$^{aa}$, CO$_2$R$^{aa}$, C(=O)N(R$^{bb}$)$_2$, or an oxygen protecting group. In certain embodiments, the oxygen atom substituents are independently substituted (e.g., substituted with one or more halogen) or unsubstituted $C_{1-6}$ alkyl, C(=O)R$^{aa}$, CO$_2$R$^{aa}$, C(=O)N(R$^{bb}$)$_2$, or an oxygen protecting group, wherein R$^{aa}$ is hydrogen, substituted (e.g., substituted with one or more halogen) or unsubstituted $C_{1-6}$ alkyl, or an oxygen protecting group when attached to an oxygen atom; and each R$^{bb}$ is independently hydrogen, substituted (e.g., substituted with one or more halogen) or unsubstituted $C_{1-6}$ alkyl, or a nitrogen protecting group. In certain embodiments, the oxygen atom substituents are independently substituted (e.g., substituted with one or more halogen) or unsubstituted $C_{1-6}$ alkyl or an oxygen protecting group.

In certain embodiments, the substituent present on an oxygen atom is an oxygen protecting group (also referred to herein as an "hydroxyl protecting group"). Oxygen protecting groups include —R$^{aa}$, —N(R$^{bb}$)$_2$, C(=O)SR$^{aa}$, —C(=O)R$^{aa}$, —CO$_2$R$^{aa}$, —C(=O)N(R$^{bb}$)$_2$, —C(=NR$^{bb}$) R$^{aa}$, —C(=NR$^{bb}$)OR$^{aa}$, —C(=NR$^{bb}$)N(R$^{bb}$)$_2$, —S(=O) R$^{aa}$, —SO$_2$R$^{aa}$, —Si(R$^{aa}$)$_3$, —P(R$^{cc}$)$_2$, —P(R$^{cc}$)$_3$$^+$X$^-$, —P(OR$^{cc}$)$_2$, —P(OR$^{cc}$)$_3$$^+$X$^-$, —P(=O)(R$^{aa}$)$_2$, —P(=O) (OR$^{cc}$)$_2$, and —P(=O)(N(R$^{bb}$)$_2$)$_2$, wherein X$^-$, and R$^{aa}$, R$^{bb}$, and R$^{cc}$ are as defined herein. Oxygen protecting groups are well known in the art and include those described in detail in Protecting Groups in Organic Synthesis, T. W. Greene and P. G. M. Wuts, 3$^{rd}$ edition, John Wiley & Sons, 1999, incorporated herein by reference.

Exemplary oxygen protecting groups include methyl, methoxylmethyl (MOM), methylthiomethyl (MTM), t-butylthiomethyl, (phenyldimethylsilyl)methoxymethyl (SMOM), benzyloxymethyl (BOM), p-methoxybenzyloxymethyl (PMBM), (4-methoxyphenoxy)methyl (p-AOM), guaiacolmethyl (GUM), t-butoxymethyl, 4-pentenyloxymethyl (POM), siloxymethyl, 2-methoxyethoxymethyl (MEM), 2,2,2-trichloroethoxymethyl, bis(2-chloroethoxy)methyl, 2-(trimethylsilyl)ethoxymethyl (SEMOR), tetrahydropyranyl (THP), 3-bromotetrahydropyranyl, tetrahydrothiopyranyl, 1-methoxycyclohexyl, 4-methoxytetrahydropyranyl (MTHP), 4-methoxytetrahydrothiopyranyl, 4-methoxytetrahydrothiopyranyl S,S-dioxide, 1-[(2-chloro-4-methyl)phenyl]-4-methoxypiperidin-4-yl (CTMP), 1,4-dioxan-2-yl, tetrahydrofuranyl, tetrahydrothiofuranyl, 2,3,3a,4,5,6,7,7a-octahydro-7,8,8-trimethyl-4,7-methanobenzofuran-2-yl, 1-ethoxyethyl, 1-(2-chloroethoxy) ethyl, 1-methyl-1-methoxyethyl, 1-methyl-1-benzyloxyethyl, 1-methyl-1-benzyloxy-2-fluoroethyl, 2,2,2-trichloroethyl, 2-trimethylsilylethyl, 2-(phenylselenyl)ethyl, t-butyl, allyl, p-chlorophenyl, p-methoxyphenyl, 2,4-dinitrophenyl, benzyl (Bn), p-methoxybenzyl, 3,4-dimethoxybenzyl, o-nitrobenzyl, p-nitrobenzyl, p-halobenzyl, 2,6-dichlorobenzyl, p-cyanobenzyl, p-phenylbenzyl, 2-picolyl, 4-picolyl, 3-methyl-2-picolyl N-oxido, diphenylmethyl, p,p'-dinitrobenzhydryl, 5-dibenzosuberyl, triphenylmethyl, α-naphthyldiphenylmethyl, p-methoxyphenyldiphenylmethyl, di(p-methoxyphenyl)phenylmethyl, tri(p-methoxyphenyl) methyl, 4-(4'-bromophenacyloxyphenyl)diphenylmethyl, 4,4',4"-tris(4,5-dichlorophthalimidophenyl)methyl, 4,4',4"-tris(levulinoyloxyphenyl)methyl, 4,4',4"-tris(benzoyloxyphenyl)methyl, 3-(imidazol-1-yl)bis(4',4"-dimethoxyphenyl)methyl, 1,1-bis(4-methoxyphenyl)-1'-pyrenylmethyl, 9-anthryl, 9-(9-phenyl)xanthenyl, 9-(9-phenyl-10-oxo)anthryl, 1,3-benzodisulfuran-2-yl, benzisothiazolyl S,S-dioxido, trimethylsilyl (TMS), triethylsilyl (TES), triisopropylsilyl (TIPS), dimethylisopropylsilyl (IPDMS), diethylisopropylsilyl (DEIPS), dimethylthexylsilyl, t-butyldimethylsilyl (TBDMS), t-butyldiphenylsilyl (TBDPS), tribenzylsilyl, tri-p-xylylsilyl, triphenylsilyl, diphenylmethylsilyl (DPMS), t-butylmethoxyphenylsilyl (TBMPS), formate, benzoylformate, acetate, chloroacetate, dichloroacetate, trichloroacetate, trifluoroacetate, methoxyacetate, triphenylmethoxyacetate, phenoxyacetate, pchlorophenoxyacetate, 3-phenylpropionate, 4-oxopentanoate (levulinate), 4,4-(ethylenedithio)pentanoate (levulinoyldithioacetal), pivaloate, adamantoate, crotonate, 4-methoxycrotonate, benzoate, p-phenylbenzoate, 2,4,6-trimethylbenzoate (mesitoate), alkyl methyl carbonate, 9-fluorenylmethyl carbonate (Fmoc), alkyl ethyl carbonate, alkyl 2,2,2-trichloroethyl carbonate (Troc), 2-(trimethylsilyl)ethyl carbonate (TMSEC), 2-(phenylsulfonyl) ethyl carbonate (Psec), 2-(triphenylphosphonio) ethyl carbonate (Peoc), alkyl isobutyl carbonate, alkyl vinyl carbonate alkyl allyl carbonate, alkyl p-nitrophenyl carbonate, alkyl benzyl carbonate, alkyl p-methoxybenzyl carbonate, alkyl 3,4-dimethoxybenzyl carbonate, alkyl o-nitrobenzyl carbonate, alkyl p-nitrobenzyl carbonate, alkyl S-benzyl thiocarbonate, 4-ethoxy-1-naphthyl carbonate, methyl dithiocarbonate, 2-iodobenzoate, 4-azidobutyrate, 4-nitro-4-methylpentanoate, o-(dibromomethyl)benzoate, 2-formylbenzenesulfonate, 2-(methylthiomethoxy)ethyl, 4-(methylthiomethoxy)butyrate, 2-(methylthiomethoxymethyl)benzoate, 2,6-dichloro-4-methylphenoxyacetate, 2,6-dichloro-4-(1,1,3,3-tetramethylbutyl)phenoxyacetate, 2,4-bis(1,1-dimethylpropyl)phenoxyacetate, chlorodiphenylacetate, isobutyrate, monosuccinoate, (E)-2-methyl-2-butenoate, o-(methoxyacyl)benzoate, a-naphthoate, nitrate, alkyl N,N,N',N'-tetramethylphosphorodiamidate, alkyl N-phenylcarbamate, borate, dimethylphosphinothioyl, alkyl 2,4-dinitrophenylsulfenate, sulfate, methanesulfonate (mesylate), benzylsulfonate, and tosylate (Ts).

In certain embodiments, an oxygen protecting group is silyl, TBDPS, TBDMS, TIPS, TES, TMS, MOM, THP, t-Bu, Bn, allyl, acetyl, pivaloyl, or benzoyl.

In certain embodiments, the sulfur atom substituents are independently substituted (e.g., substituted with one or more halogen) or unsubstituted $C_{1-6}$ alkyl, —C(=O)$R^{aa}$, —CO$_2$$R^{aa}$, —C(=O)N($R^{bb}$)$_2$, or a sulfur protecting group. In certain embodiments, the sulfur atom substituents are independently substituted (e.g., substituted with one or more halogen) or unsubstituted $C_{1-6}$ alkyl, —C(=O)$R^{aa}$, —CO$_2$$R^{aa}$, —C(=O)N($R^{bb}$)$_2$, or a sulfur protecting group, wherein $R^{aa}$ is hydrogen, substituted (e.g., substituted with one or more halogen) or unsubstituted $C_{1-6}$ alkyl, or an oxygen protecting group when attached to an oxygen atom; and each $R^{bb}$ is independently hydrogen, substituted (e.g., substituted with one or more halogen) or unsubstituted $C_{1-6}$ alkyl, or a nitrogen protecting group. In certain embodiments, the sulfur atom substituents are independently substituted (e.g., substituted with one or more halogen) or unsubstituted $C_{1-6}$ alkyl or a sulfur protecting group.

In certain embodiments, the substituent present on a sulfur atom is a sulfur protecting group (also referred to as a "thiol protecting group"). Sulfur protecting groups include —$R^{aa}$, —N($R^{bb}$)$_2$, —C(=O)S$R^{aa}$, —C(=O)$R^{aa}$, —CO$_2$$R^{aa}$, —C(=O)N($R^{bb}$)$_2$, —C(=N$R^{bb}$)$R^{aa}$, —C(=N$R^{bb}$)O$R^{aa}$, —C(=N$R^{bb}$)N($R^{bb}$)$_2$, —S(=O)$R^{aa}$, —SO$_2$$R^{aa}$, —Si($R^{aa}$)$_3$, —P($R^{cc}$)$_2$, —P($R^{cc}$)$_3$$^+$X$^-$, —P(O$R^{cc}$)$_2$, —P(O$R^{cc}$)$_3$$^+$X$^-$, —P(=O)($R^{aa}$)$_2$, —P(=O)(O$R^{cc}$)$_2$, and —P(=O)(N($R^{bb}$)$_2$)$_2$, wherein $R^{aa}$, $R^{bb}$, and $R^{cc}$ are as defined herein. Sulfur protecting groups are well known in the art and include those described in detail in Protecting Groups in Organic Synthesis, T. W. Greene and P. G. M. Wuts, 3$^{rd}$ edition, John Wiley & Sons, 1999, incorporated herein by reference. In certain embodiments, a sulfur protecting group is acetamidomethyl, t-Bu, 3-nitro-2-pyridine sulfenyl, 2-pyridine-sulfenyl, or triphenylmethyl.

The "molecular weight" of —R, wherein —R is any monovalent moiety, is calculated by subtracting the atomic weight of a hydrogen atom from the molecular weight of the molecule R—H. The "molecular weight" of -L-, wherein -L- is any divalent moiety, is calculated by subtracting the combined atomic weight of two hydrogen atoms from the molecular weight of the molecule H-L-H.

In certain embodiments, the molecular weight of a substituent is lower than 200, lower than 150, lower than 100, lower than 50, or lower than 25 g/mol. In certain embodiments, a substituent consists of carbon, hydrogen, fluorine, chlorine, bromine, iodine, oxygen, sulfur, nitrogen, and/or silicon atoms. In certain embodiments, a substituent consists of carbon, hydrogen, fluorine, chlorine, bromine, and/or iodine atoms. In certain embodiments, a substituent consists of carbon, hydrogen, and/or fluorine atoms. In certain embodiments, a substituent does not comprise one or more, two or more, or three or more hydrogen bond donors. In certain embodiments, a substituent does not comprise one or more, two or more, or three or more hydrogen bond acceptors.

The term "leaving group" is given its ordinary meaning in the art of synthetic organic chemistry and refers to an atom or a group capable of being displaced by a nucleophile. Examples of suitable leaving groups include halogen (such as F, Cl, Br, or I (iodine)), alkoxycarbonyloxy, aryloxycarbonyloxy, alkanesulfonyloxy, arenesulfonyloxy, alkylcarbonyloxy (e.g., acetoxy), arylcarbonyloxy, aryloxy, methoxy, N,O-dimethylhydroxylamino, pixyl, and haloformates. In some cases, the leaving group is a sulfonic acid ester, such as toluenesulfonate (tosylate, —OTs), methanesulfonate (mesylate, —OMs), p-bromobenzenesulfonyloxy (brosylate, —OBs), —OS(=O)$_2$(CF$_2$)$_3$CF$_3$ (nonaflate, —ONf), or trifluoromethanesulfonate (triflate, —OTf). In some cases, the leaving group is a brosylate, such as p-bromobenzenesulfonyloxy. In some cases, the leaving group is a nosylate, such as 2-nitrobenzenesulfonyloxy. In some embodiments, the leaving group is a sulfonate-containing group. In some embodiments, the leaving group is a tosylate group. The leaving group may also be a phosphineoxide (e.g., formed during a Mitsunobu reaction) or an internal leaving group such as an epoxide or cyclic sulfate. Other examples of leaving groups are water, ammonia, alcohols, ether moieties, thioether moieties, zinc halides, magnesium moieties, diazonium salts, and copper moieties.

The term "salt" refers to ionic compounds that result from the neutralization reaction of an acid and a base. A salt is composed of one or more cations (positively charged ions) and one or more anions (negative ions) so that the salt is electrically neutral (without a net charge). Salts of the compounds of this disclosure include those derived from inorganic and organic acids and bases. Examples of acid addition salts are salts of an amino group formed with inorganic acids such as hydrochloric acid, hydrobromic acid, phosphoric acid, sulfuric acid, and perchloric acid, or with organic acids such as acetic acid, oxalic acid, maleic acid, tartaric acid, citric acid, succinic acid, or malonic acid or by using other methods known in the art such as ion exchange. Other salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Salts derived from appropriate bases include alkali metal, alkaline earth metal, ammonium and $N^+(C_{1-4}$ alkyl$)_4$ salts. Representative alkali or alkaline earth metal salts include sodium, lithium, potassium, calcium, magnesium, and the like. Further salts include ammonium, quaternary ammonium, and amine cations formed using counterions such as halide, hydroxide, carboxylate, sulfate, phosphate, nitrate, lower alkyl sulfonate, and aryl sulfonate.

"Compounds" include, e.g., small molecules and macromolecules. Macromolecules include, e.g., polymers, peptides, proteins, carbohydrates, monosaccharides, oligosaccharides, polysaccharides, nucleoproteins, mucoproteins, lipoproteins, synthetic polypeptides or proteins, glycoproteins, steroids, nucleic acids, DNAs, RNAs, nucleotides, nucleosides, oligonucleotides, antisense oligonucleotides, lipids, hormones, vitamins, and cells.

The term "small molecule" refers to molecules, whether naturally-occurring or artificially created (e.g., via chemical synthesis) that have a relatively low molecular weight. Typically, a small molecule is an organic compound (i.e., it contains carbon). The small molecule may contain multiple carbon-carbon bonds, stereocenters, and other functional groups (e.g., amines, hydroxyl, carbonyls, and heterocyclic rings, etc.). In certain embodiments, the molecular weight of a small molecule is not more than 2,000 g/mol. In certain embodiments, the molecular weight of a small molecule is not more than 1,500 g/mol. In certain embodiments, the molecular weight of a small molecule is not more than 1,000 g/mol, not more than 900 g/mol, not more than 800 g/mol, not more than 700 g/mol, not more than 600 g/mol, not more than 500 g/mol, not more than 400 g/mol, not more than 300 g/mol, not more than 200 g/mol, or not more than 100 g/mol. In certain embodiments, the molecular weight of a small molecule is at least 100 g/mol, at least 200 g/mol, at least 300 g/mol, at least 400 g/mol, at least 500 g/mol, at least 600 g/mol, at least 700 g/mol, at least 800 g/mol, or at least 900 g/mol, or at least 1,000 g/mol. Combinations of the above ranges (e.g., at least 200 g/mol and not more than 500 g/mol) are also possible. In certain embodiments, the small molecule is a therapeutically active agent such as a drug (e.g., a molecule approved by the U.S. Food and Drug Administration as provided in the Code of Federal Regulations (C.F.R.)). The small molecule may also be complexed with one or more metal atoms and/or metal ions. In this instance, the small molecule is also referred to as a "small organometallic molecule." Preferred small molecules are biologically active in that they produce a biological effect in animals, preferably mammals, more preferably humans. Small molecules include radionuclides and imaging agents. In certain embodiments, the small molecule is a drug. Preferably, though not necessarily, the drug is one that has already been deemed safe and effective for use in humans or animals by the appropriate governmental agency or regulatory body. For example, drugs approved for human use are listed by the FDA under 21 C.F.R. §§ 330.5, 331 through 361, and 440 through 460, incorporated herein by reference; drugs for veterinary use are listed by the FDA under 21 C.F.R. §§ 500 through 589, incorporated herein by reference. All listed drugs are considered acceptable for use in accordance with the present disclosure.

The term "polymer" refers to a compound comprising eleven or more covalently connected repeating units. In certain embodiments, a polymer is naturally occurring. In certain embodiments, a polymer is synthetic (e.g., not naturally occurring). In certain embodiments, the average molecular weight of a polymer is between 1,000 and 2,000, between 2,000 and 10,000, between 10,000 and 30,000, between 30,000 and 100,000, between 100,000 and 300,000, between 300,000 and 1,000,000, g/mol, inclusive. In certain embodiments, the average molecular weight of a polymer is between 2,000 and 1,000,000, g/mol, inclusive. Polymers may include homopolymers and copolymers.

The term "average molecular weight" may encompass the number average molecular weight ($M_n$), weight average molecular weight ($M_w$), higher average molecular weight ($M_z$ or $M_z+1$), GPC/SEC (gel permeation chromatography/size-exclusion chromatography)-determined average molecular weight ($M_p$), and viscosity average molecular weight ($M_v$). Average molecular weight may also refer to average molecular weight as determined by gel permeation chromatography.

The term "degree of polymerization" (DP) refers to the number of repeating units in a polymer. In certain embodiments, the DP is determined by a chromatographic method, such as gel permeation chromatography. For a homopolymer, the DP refers to the number of repeating units included in the homopolymer. For a copolymer of two types of monomers (e.g., a first monomer and a second monomer) wherein the molar ratio of the two types of monomers is about 1:1, the DP refers to the number of repeating units of either one of the two type of monomers included in the copolymer. For a copolymer of two types of monomers (e.g., a first monomer and a second monomer) wherein the molar ratio of the two types of monomers is not about 1:1, two DPs may be used. A first DP refers to the number of repeating units of the first monomer included in the copolymer, and a second DP refers to the number of repeating units of the second monomer included in the copolymer. Unless provided otherwise, a DP of "xx", wherein xx is an integer, refers to the number of repeating units of either one of the two types of monomers of a copolymer of two types of monomers (e.g., a first monomer and a second monomer) wherein the molar ratio of the two types of monomers is about 1:1. Unless provided otherwise, a DP of "xx-yy", wherein xx and yy are integers, refers to xx being the number of repeating units of the first monomer, and yy being the number of repeating units of the second monomer, of a copolymer of two types of monomers (e.g., a first monomer and a second monomer) wherein the molar ratio of the two types of monomers is not about 1:1.

The term "ring-opening metathesis polymerization (ROMP)" refers to a type of olefin metathesis chain-growth polymerization that is driven by the relief of ring strain in cyclic olefins (e.g. norbornene or cyclopentene). The catalysts used in the ROMP reaction ("metathesis catalyst") include $RuCl_3$/alcohol mixture, bis(cyclopentadienyl)dimethylzirconium(IV), dichloro[1,3-bis(2,6-isopropylphenyl)-2-imidazolidinylidene](benzylidene)(tricyclohexylphosphine)ruthenium(II), dichloro[1,3-Bis(2-methylphenyl)-2-imidazolidinylidene](benzylidene)(tricyclohexylphosphine)ruthenium(II), dichloro[1,3-bis(2,4,6-trimethylphenyl)-2-imidazolidinylidene][3-(2-pyridinyl)propylidene]ruthenium(II), dichloro(3-methyl-2-butenylidene)bis (tricyclopentylphosphine)ruthenium(II), dichloro[1,3-bis(2-methylphenyl)-2-imidazolidinylidene](2-isopropoxyphenylmethylene)ruthenium(II) (Grubbs C571), dichloro(benzylidene)bis(tricyclohexylphosphine)ruthenium(II) (Grubbs I), dichloro[1,3-bis(2,4,6-trimethylphenyl)-2-imidazolidinylidene](benzylidene)(tricyclohexylphosphine) ruthenium(II) (Grubbs II), and dichloro[1,3-bis(2,4,6-trimethylphenyl)-2-imidazolidinylidene](benzylidene)bis(3-bromopyridine)ruthenium(II) (Grubbs III).

The term "solvent" refers to a substance that dissolves one or more solutes, resulting in a solution. A solvent may serve as a medium for any reaction or transformation described herein. The solvent may dissolve one or more reactants or reagents in a reaction mixture. The solvent may facilitate the mixing of one or more reagents or reactants in a reaction mixture. The solvent may also serve to increase or decrease the rate of a reaction relative to the reaction in a different solvent. Solvents can be polar or non-polar, protic or aprotic. Common organic solvents useful in the methods described herein include, but are not limited to, acetone, acetonitrile, benzene, benzonitrile, 1-butanol, 2-butanone, butyl acetate, tert-butyl methyl ether, carbon disulfide carbon tetrachloride, chlorobenzene, 1-chlorobutane, chloroform, cyclohexane, cyclopentane, 1,2-dichlorobenzene, 1,2-dichloroethane, dichloromethane (DCM), N,N-dimethylacetamide N,N-dimethylformamide (DMF), 1,3-dimethyl-3,4,5,6-tetrahydro-2-pyrimidinone (DMPU), 1,4-dioxane, 1,3-dioxane, diethylether, 2-ethoxyethyl ether, ethyl acetate, ethyl alcohol, ethylene glycol, dimethyl ether, heptane, n-hexane, hexanes, hexamethylphosphoramide (HMPA), 2-methoxyethanol, 2-methoxyethyl acetate, methyl alcohol, 2-methylbutane, 4-methyl-2-pentanone, 2-methyl-1-propanol, 2-methyl-2-propanol, 1-methyl-2-pyrrolidinone, dimethylsulfoxide (DMSO), nitromethane, 1-octanol, pentane, 3-pentanone, 1-propanol, 2-propanol, pyridine, tetrachloroethylene, tetrahyrdofuran (THF), 2-methyltetrahydrofuran, toluene, trichlorobenzene, 1,1,2-trichlorotrifluoroethane, 2,2,4-trimethylpentane, trimethylamine, triethylamine, N,N-diisopropylethylamine, diisopropylamine, water, o-xylene, p-xylene.

The term "v/v" refers to volume per volume and is used herein to express concentrations of monomers. Unless otherwise provided, a percent concentration of a second monomer in a first monomer is expressed in v/v. For example, a mixture of a first monomer and 10% second monomer refers to a mixture of a first monomer and a second monomer, wherein the volume of the second monomer is 10% of the combined volumes of the first and second monomers.

"Covalent adaptable networks" include, e.g., "vitrimers." The term "vitrimer" refers to a class of plastics, which are derived from thermosetting polymers (thermosets). Vitrimers comprise molecular, covalent networks, which can change their topology by, e.g., thermally activated bond-exchange reactions. At elevated temperatures (e.g., between 40 and 400° C., inclusive), they may flow like viscoelastic liquids. At lower temperatures (e.g., room temperature), the bond-exchange reactions are immeasurably slow (frozen), and the vitrimers behave like classical thermosets. Vitrimers may be strong glass formers. Their behavior opens new possibilities in the application of thermosets like as a self-healing material or simple processibility in a wide temperature range.

The disclosure is not intended to be limited in any manner by the above exemplary listing of substituents. Additional terms may be defined in other sections of this disclosure.

BRIEF DESCRIPTION OF THE DRAWINGS

The figures are exemplary and do not limit the scope of the present disclosure.

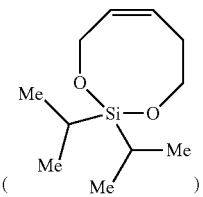 [SMILES: CC(C)[Si]1(C(C)C)OC/C=C\CCO1]

and reprocessing-catalyst-dependent remolding of a copolymer prepared by polymerizing in the presence of a Grubbs' catalyst dicyclopentadiene (DCPD, a first monomer) and iPrSi (a second monomer). The copolymer is referred to as DCPD-co-iPrSi. DCPD-co-iPrSi pressed at 1 ton/ft² did not appear to heal. DCPD-co-iPrSi pressed at 170° C. showed some browning.

Figure 1:
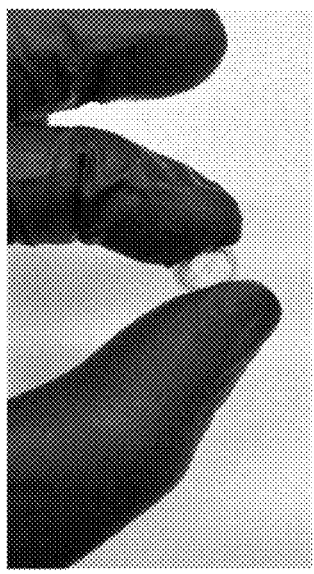
FIG. 1 shows iPrSi-
Figure 1:
Figure 1:
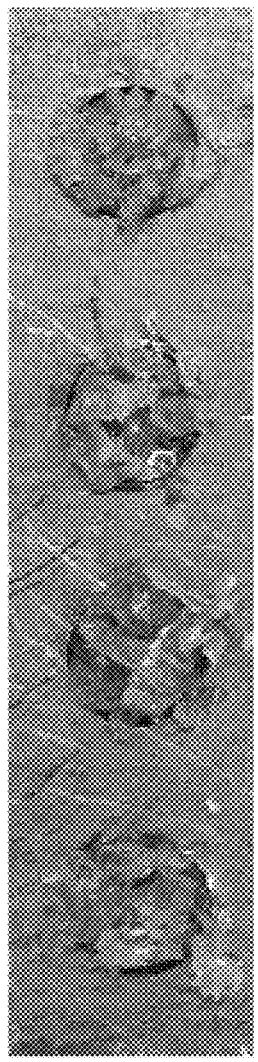
Figure 1:
Figure 2A:
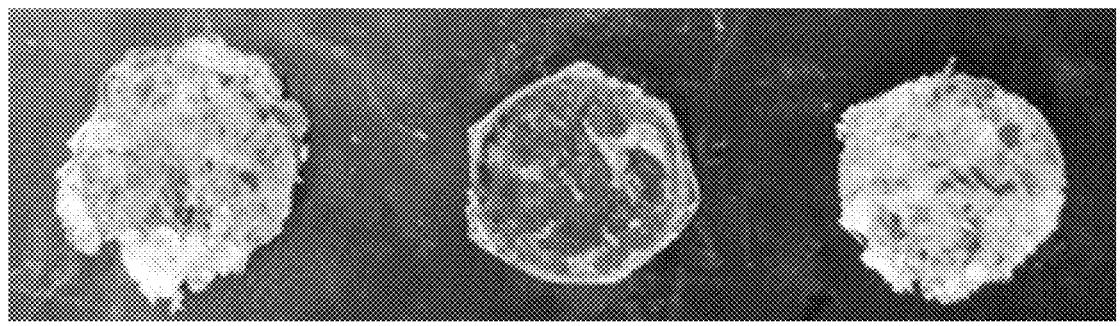
Figure 2B:
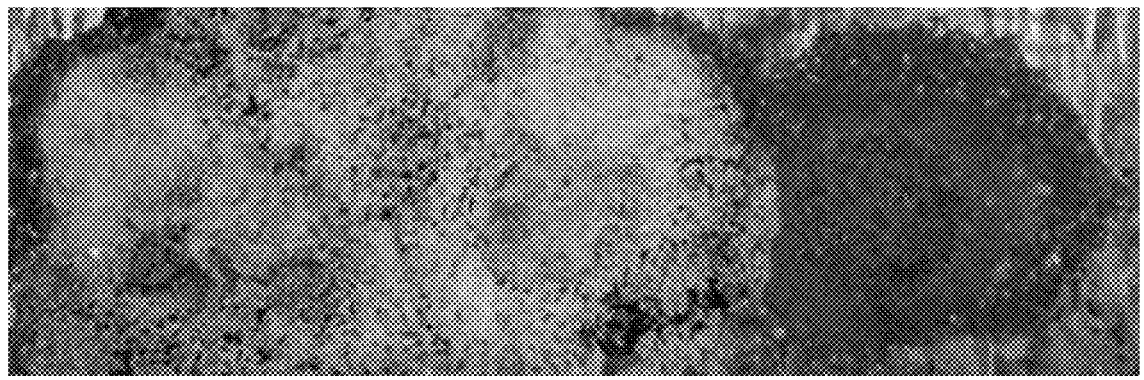

FIGS. 2A and 2B show iPrSi- and reprocessing-catalyst-dependent remolding of DCPD-co-iPrSi of dynamic strands and dynamic crosslinkers under the following conditions: 130° C., 24 hr, 6 ton/ft² pressure. Octanoic acid (OA) as the reprocessing catalyst ("cat."). DCPD-co-iPrSi remolded in an iPrSi- and reprocessing-catalyst-dependent manner (FIG. 2A). A copolymer DCPD-co-iPrSi-co-SiXL, which was prepared by polymerizing in the presence of a Grubbs' catalyst DCPD, iPrSi, and 40%

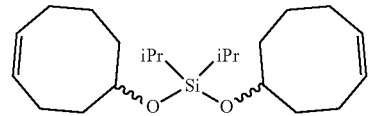 [SMILES: CC(C)[Si](OC1CC/C=C\CCC1)(OC1CC/C=C\CCC1)C(C)C]

(SiXL) did not remold, even in the presence of 1 or 5 phr octanoic acid (FIG. 2B). This suggests dynamic bond location may be an important design parameter in the compositions described herein. This has been demonstrated as successful with both 7-member and 8-member second monomers. The term "phr" refers to part per hundred by mass.

Figure 3:
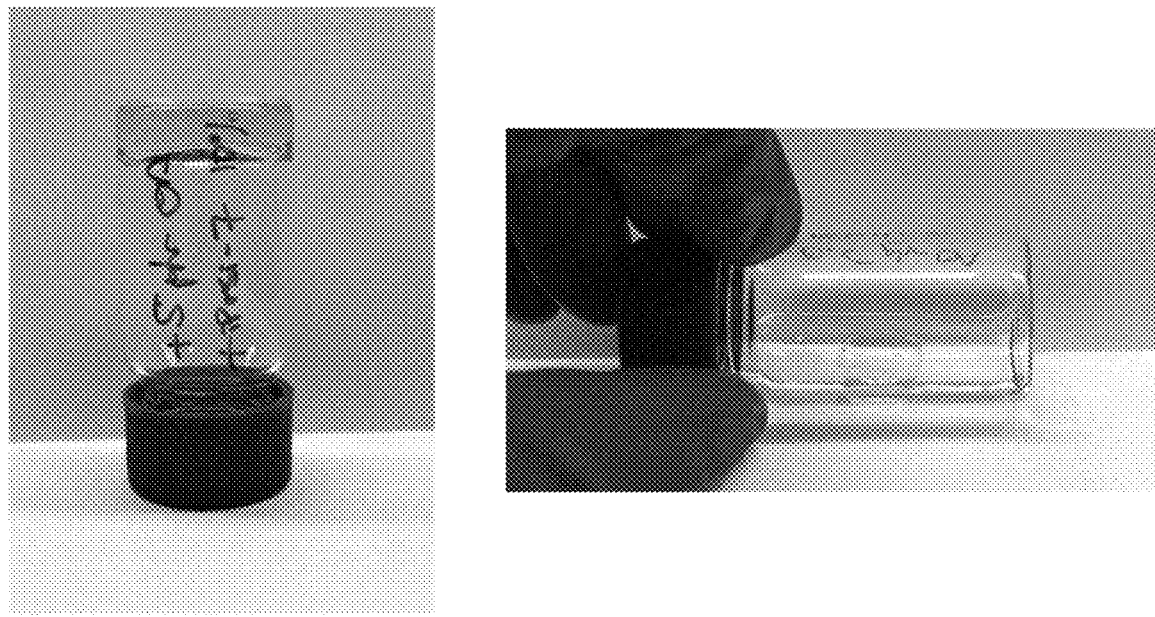

FIG. 3 shows presence of octanoic acid and iPrSi enabled extreme swelling. Left: a composition comprising DCPD-co-iPrSi (where iPrSi was 10%) and 5 phr octanoic acid swelled in THF for 1 month. The composition swelled to complete size of container and incorporated all THF, indicating that exchange had occurred to allow relaxation and expansion to swell. Right: a composition comprising poly-DCPD (where iPrSi was 0%) and 5 phr octanoic acid swelled in THF for 1 month. The composition roughly doubled in size, and octanoic acid did not appear to improve the ability of native poly-DCPD to swell in THF.

Figure 4A:
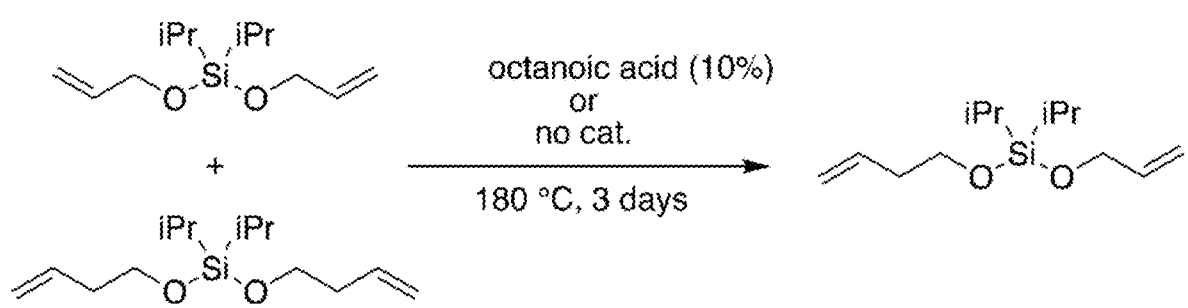
Figure 4B:
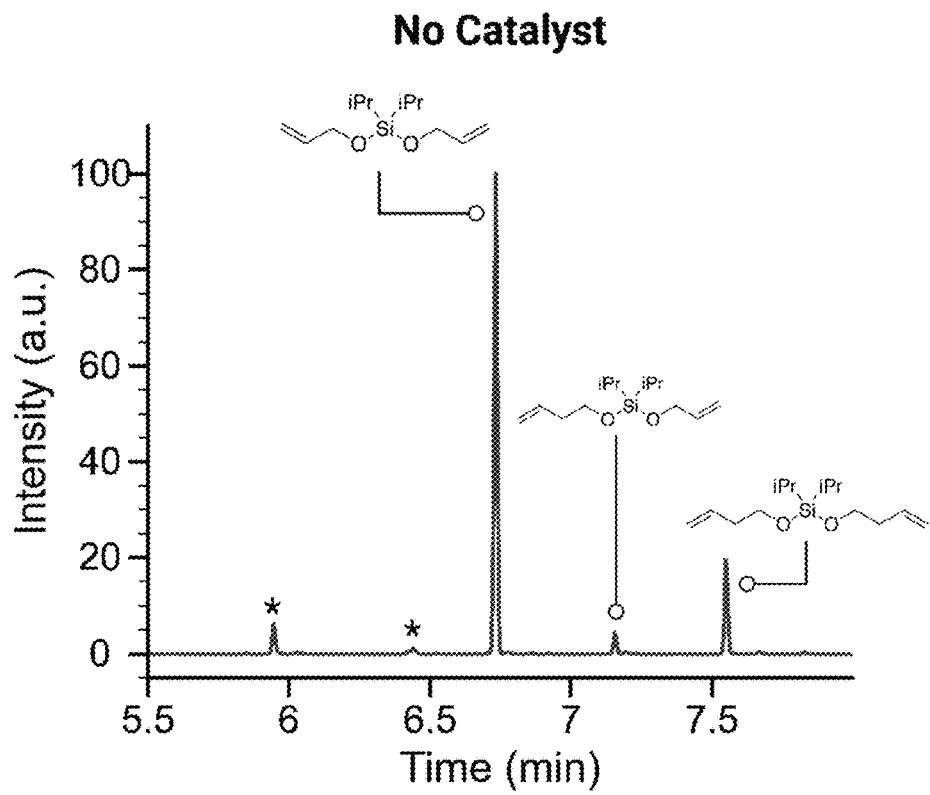
Figure 4C:
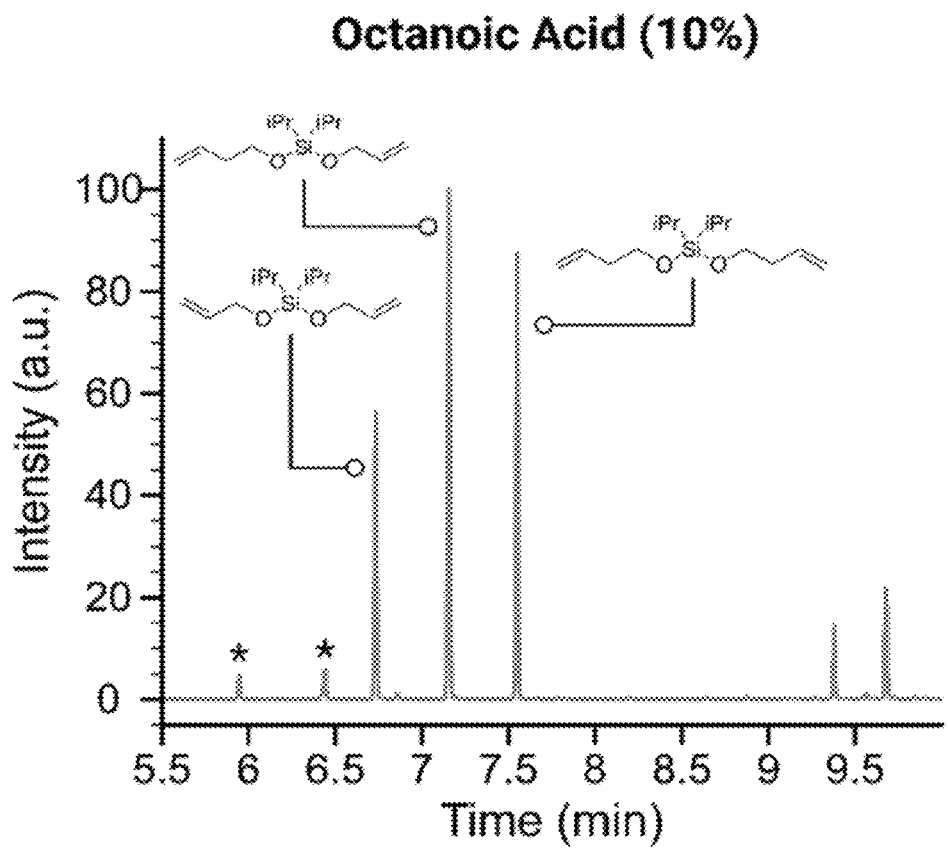

FIGS. 4A to 4C show the chemical composition of octanoic acid and its possible role. FIG. 4A shows a possible reaction mechanism. At elevated temperature, reaction occurs to minute extent in absence of octanoic acid ("no cat."), as shown by a GC-MS spectrum of the reaction mixture (FIG. 4B). Reaction occurs significantly with 10% octanoic acid at hot-press temperatures, as shown by a GC-MS spectrum of the reaction mixture (FIG. 4C).

Figure 5A:
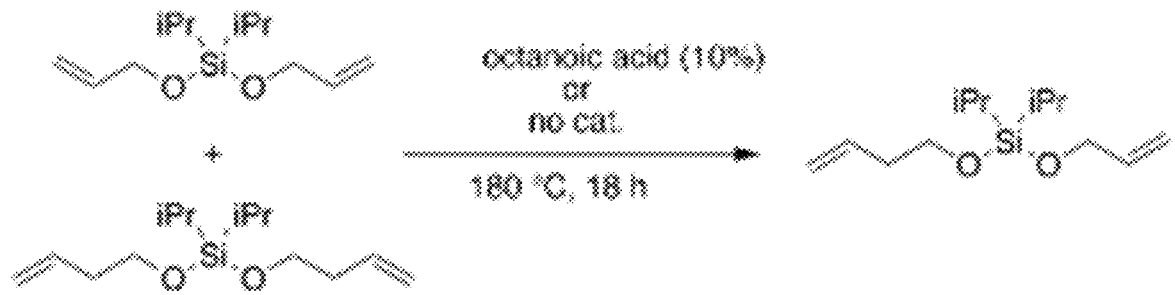
Figure 5B:
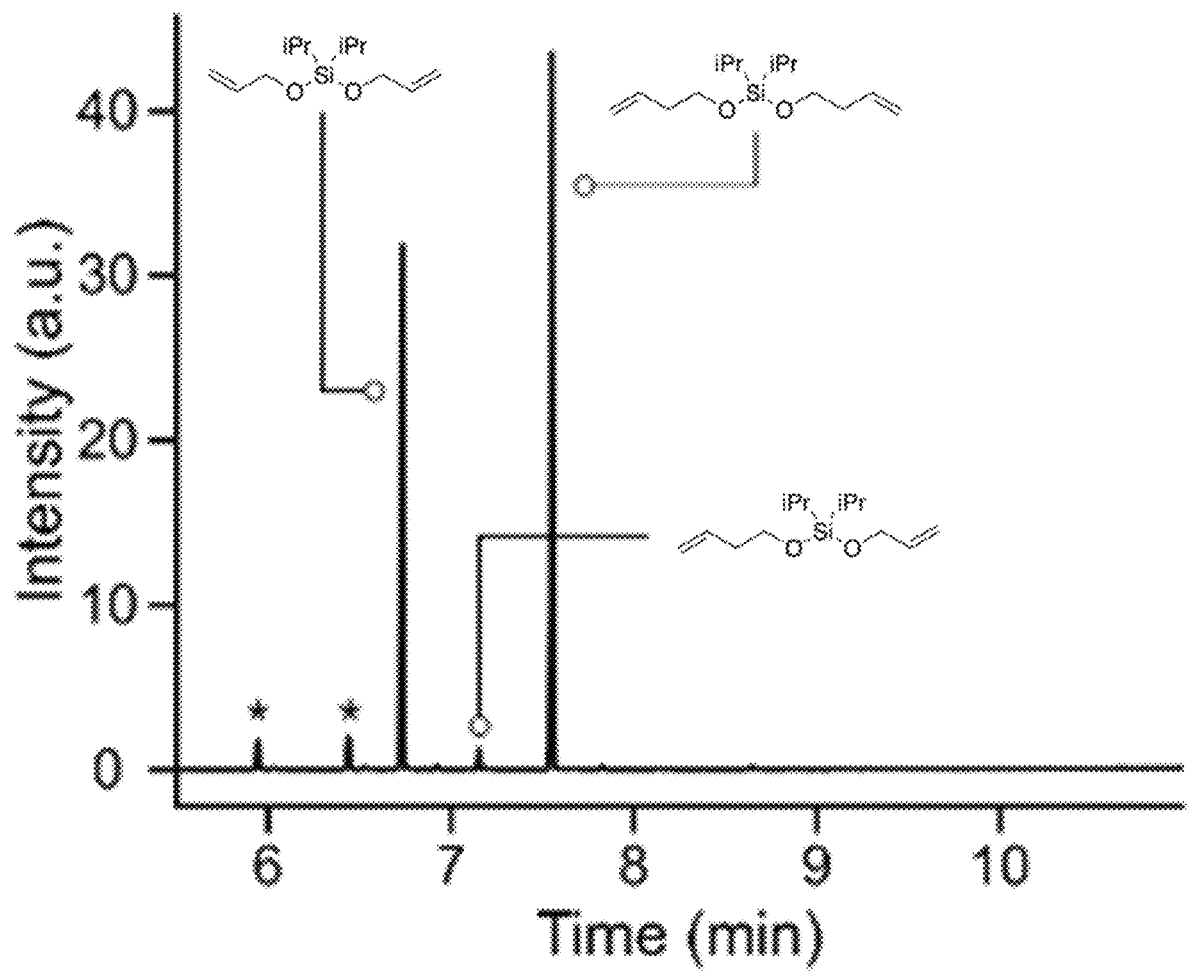
Figure 5C:
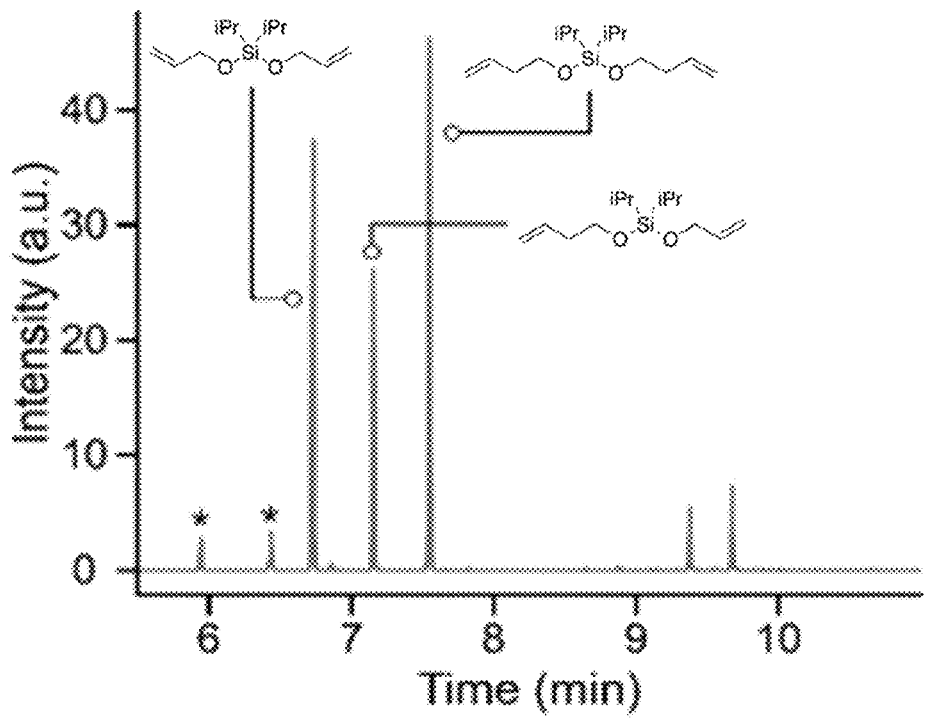
Figure 5D:
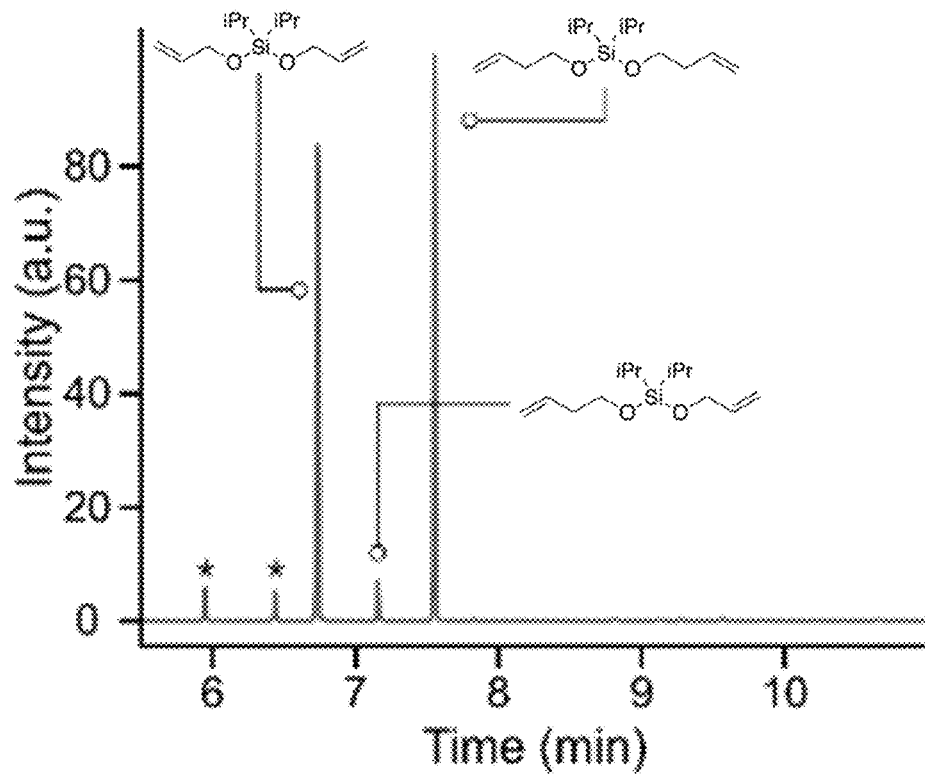
Figure 5E:
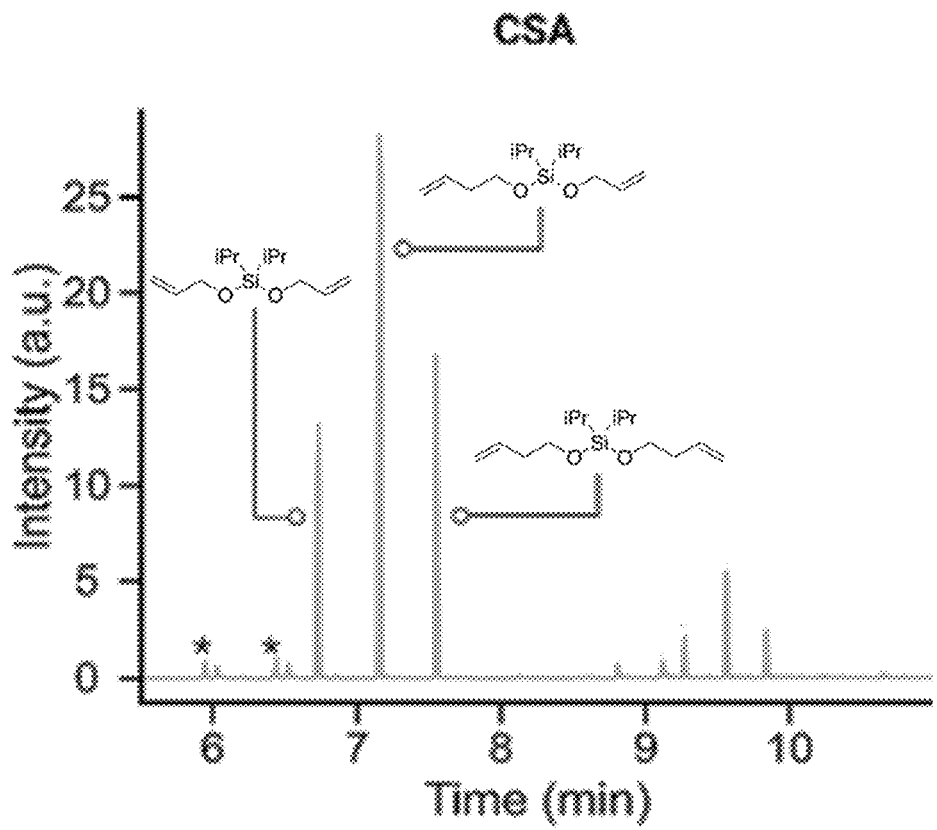
Figure 5F:
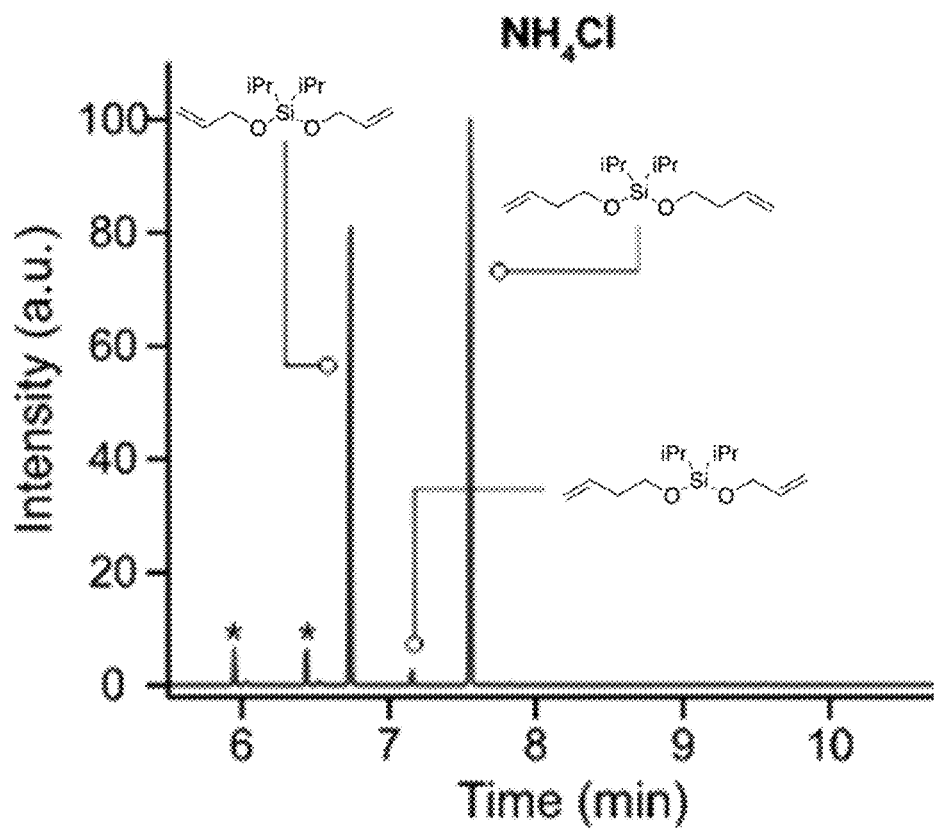
Figure 5G:
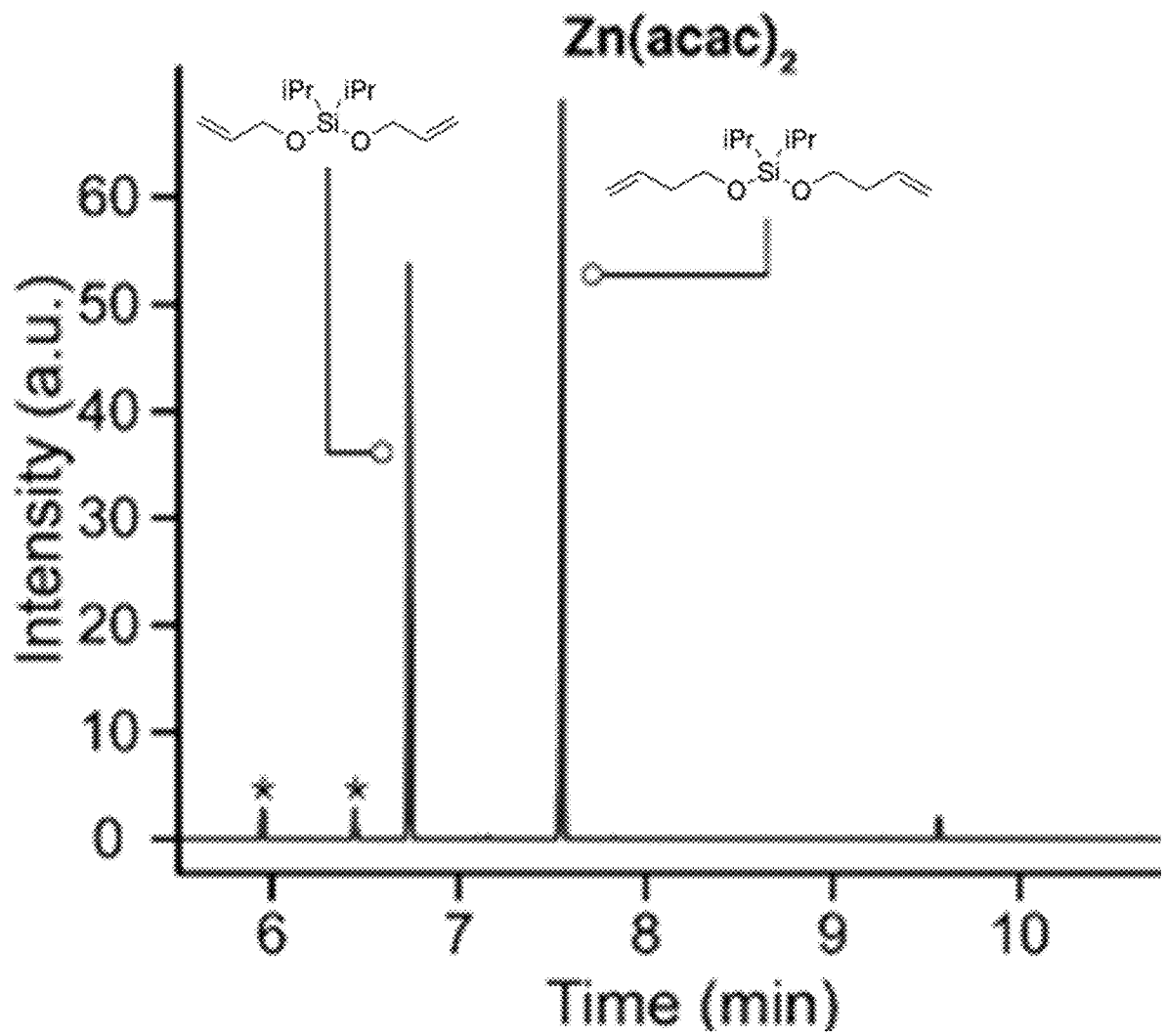

FIGS. 5A to 5G show a possible role of the reprocessing catalyst. FIG. 5A shows a possible reaction mechanism. Compositions comprising DCPD-co-iPrSi and a reprocessing catalyst were left at 180° C. for 18 hours. Some exchange occurs in absence of the reprocessing catalyst (FIG. 5B). Significant exchange occurred with octanoic acid (FIG. 5C). Ammonium chloride seemed to show little exchange (FIG. 5F). 1,8-Diazabicyclo[5.4.0]undec-7-ene (DBU) showed some exchange (FIG. 5D). $Zn(acac)_2$ seemed to completely halt exchange (FIG. 5G). Camphor sulfonic acid (CSA) most rapidly catalyzed exchange (FIG. 5E).

Figure 6A:
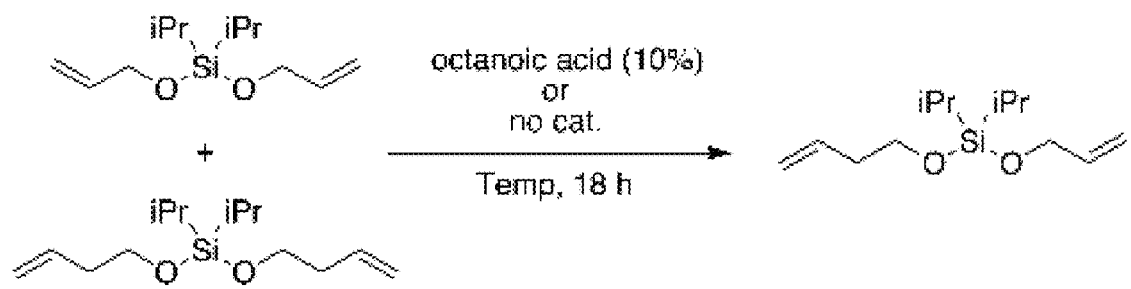
Figure 6B:
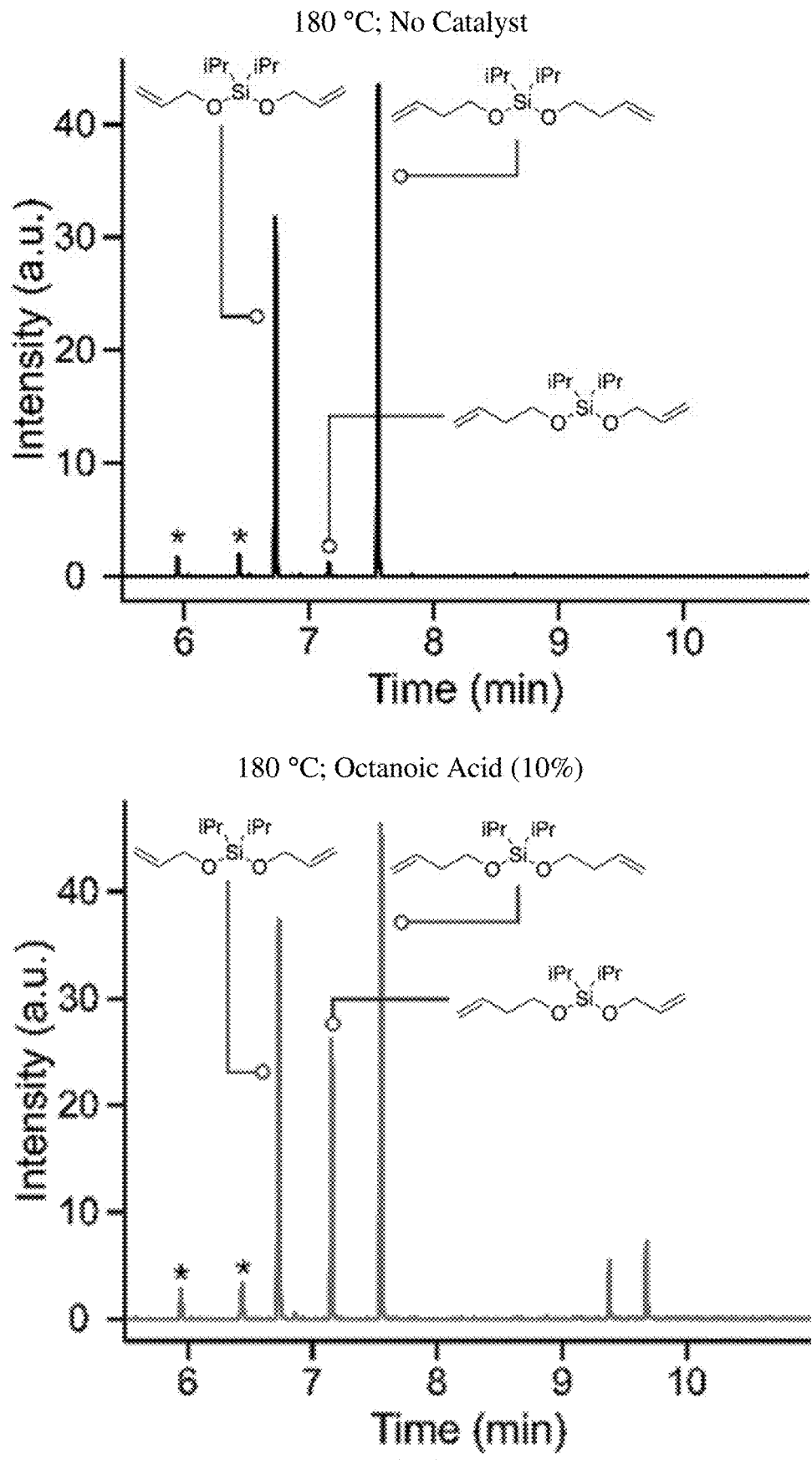
Figure 6C:
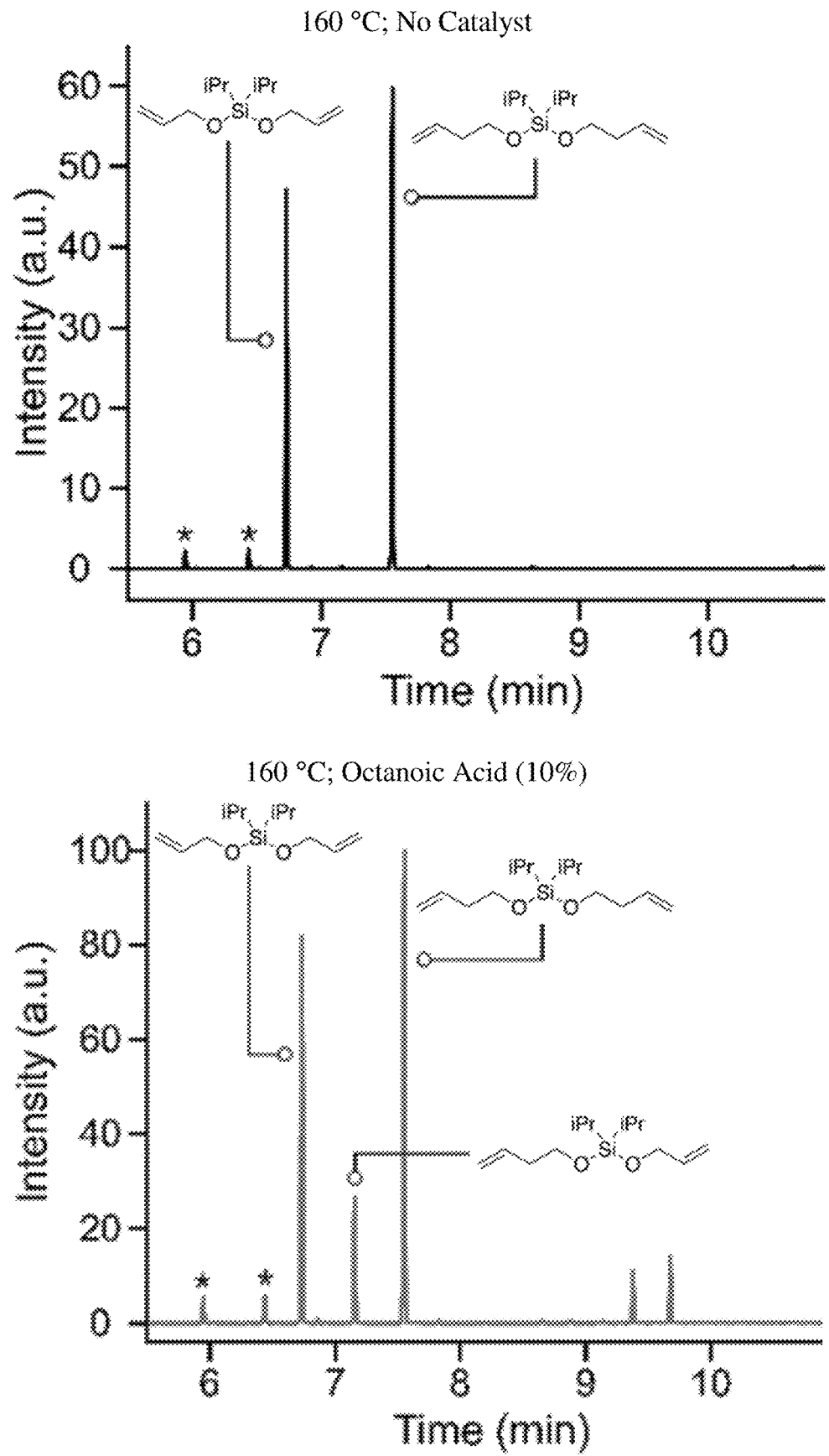
Figure 6D:
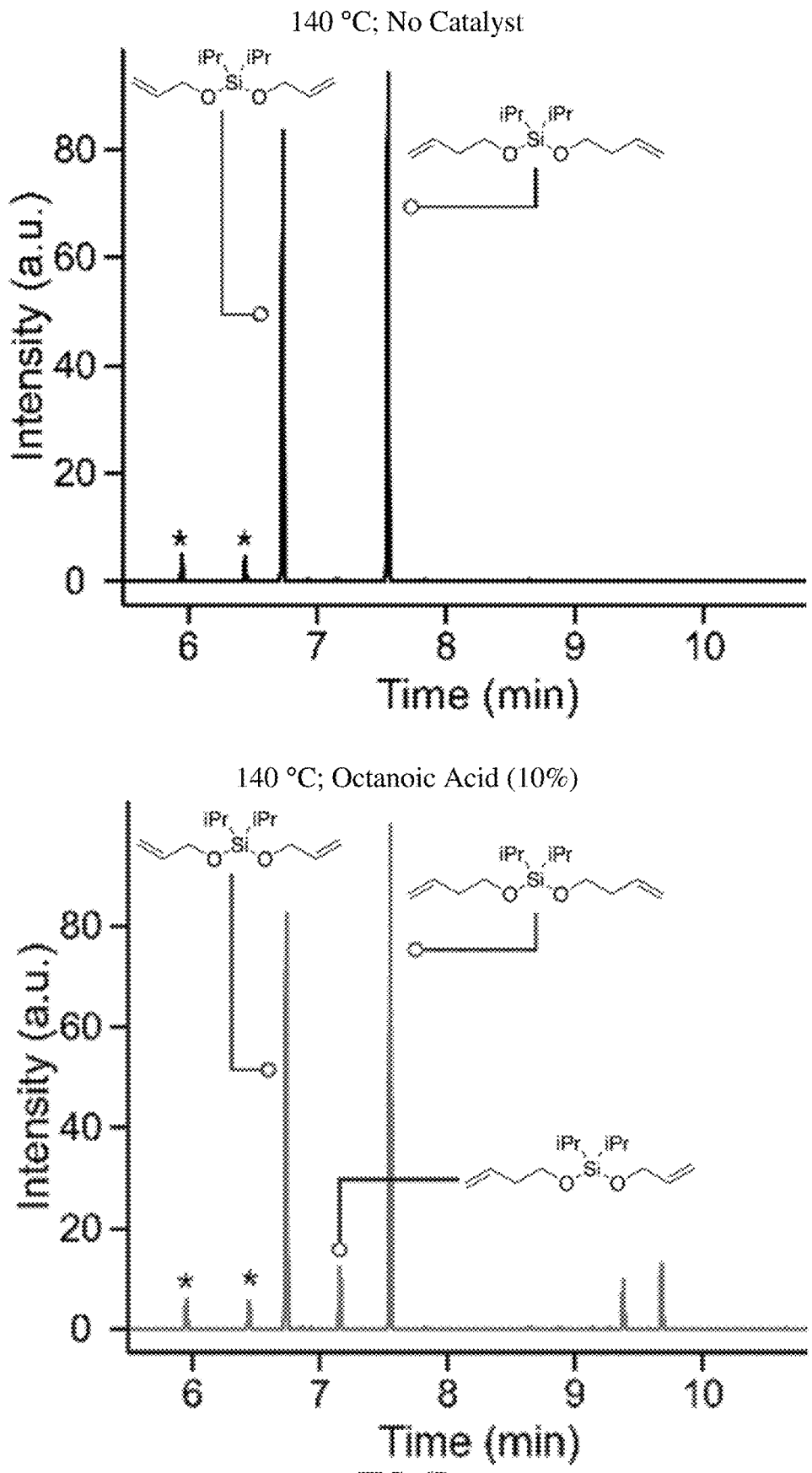
Figure 6E:
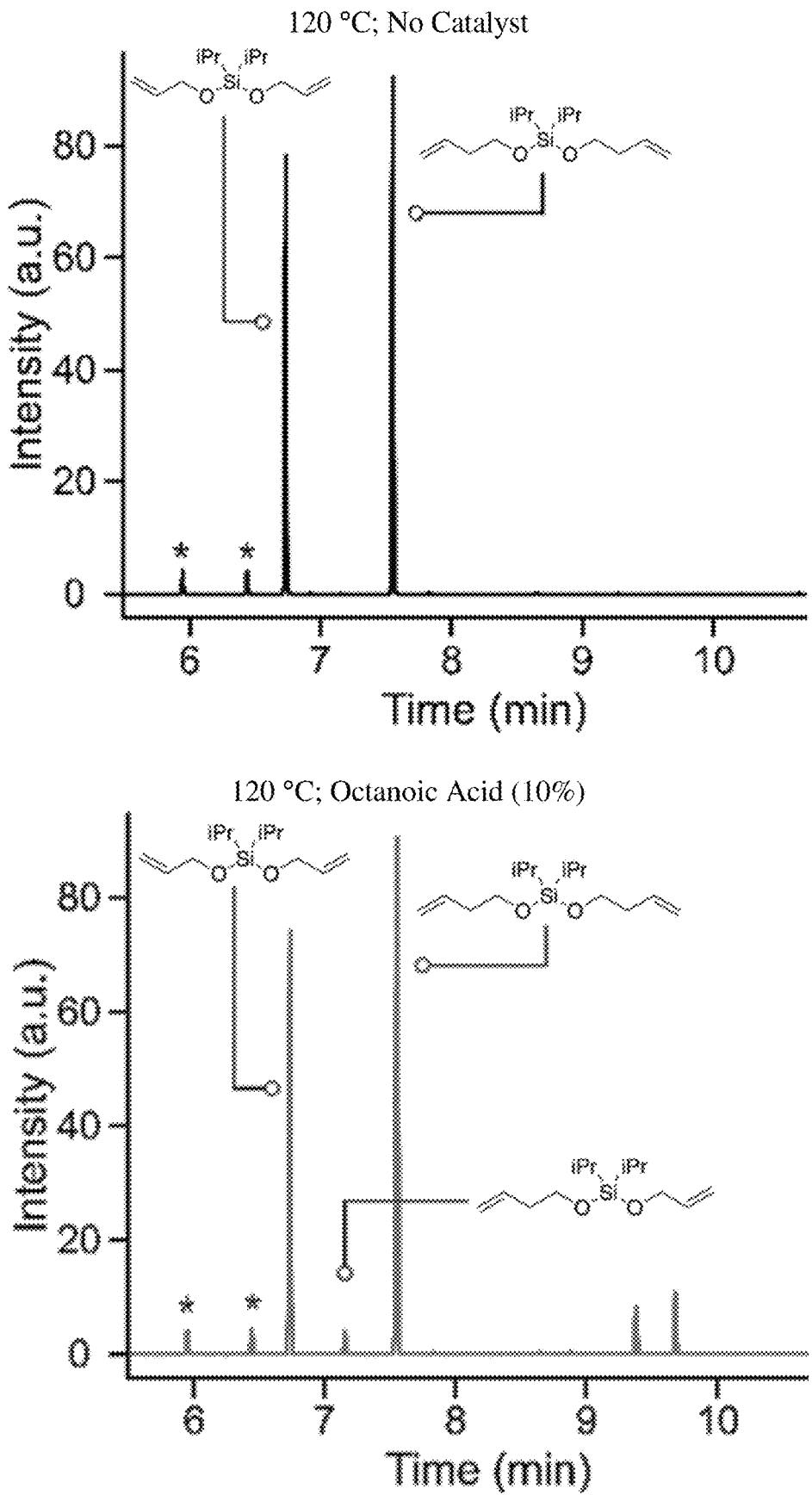
Figure 6F:
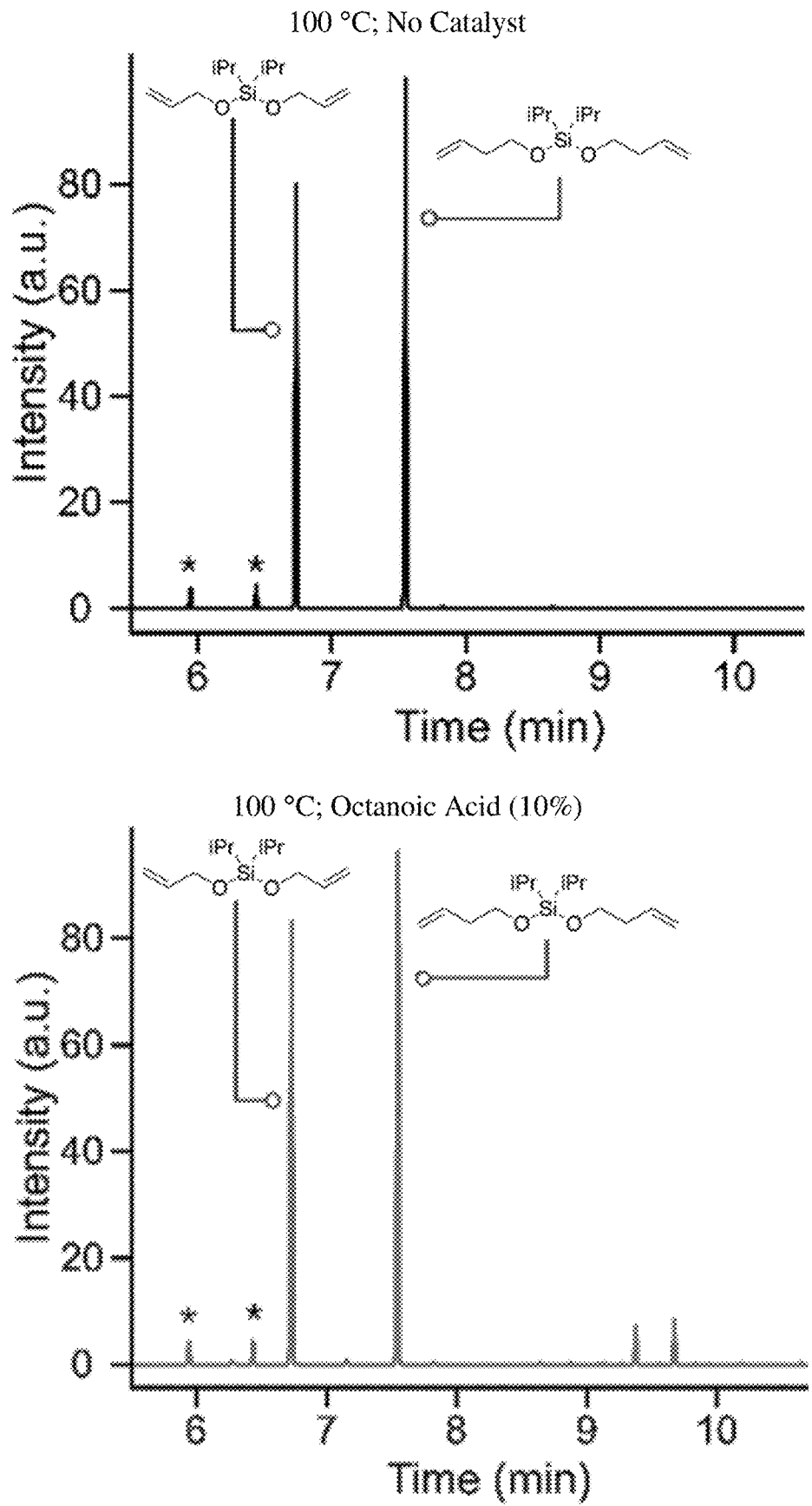

FIGS. 6A to 6F show time- and reprocessing-catalyst-dependent exchange. FIG. 6A shows a possible reaction mechanism. FIG. 6B, top panel: 180° C.; no catalyst. FIG. 6B, bottom panel: 180° C.; octanoic acid (10%). FIG. 6C, top panel: 160° C.; no catalyst. FIG. 6C, bottom panel: 160° C.; octanoic acid (10%). FIG. 6D, top panel: 140° C.; no catalyst. FIG. 6D, bottom panel: 140° C.; octanoic acid (10%). FIG. 6E, top panel: 120° C.; no catalyst. FIG. 6E, bottom panel: 120° C.; octanoic acid (10%). FIG. 6F, top panel: 100° C.; no catalyst. FIG. 6F, bottom panel: 100° C.; octanoic acid (10%).

Figure 7:
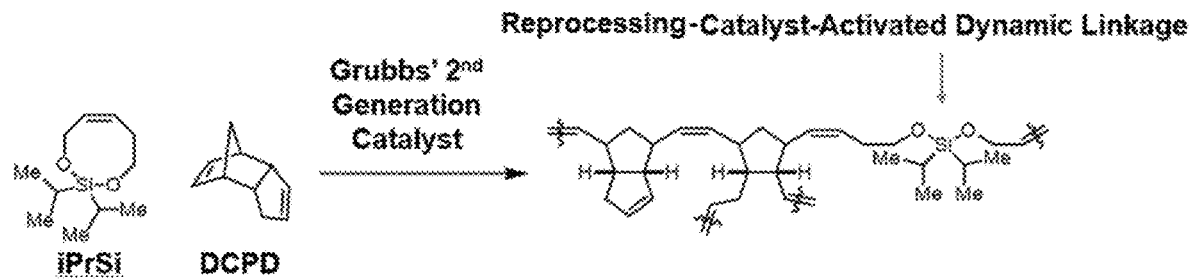

FIG. 7 is a schematic showing a synthesis of a DCPD-co-iPrSi.

Figure 8:
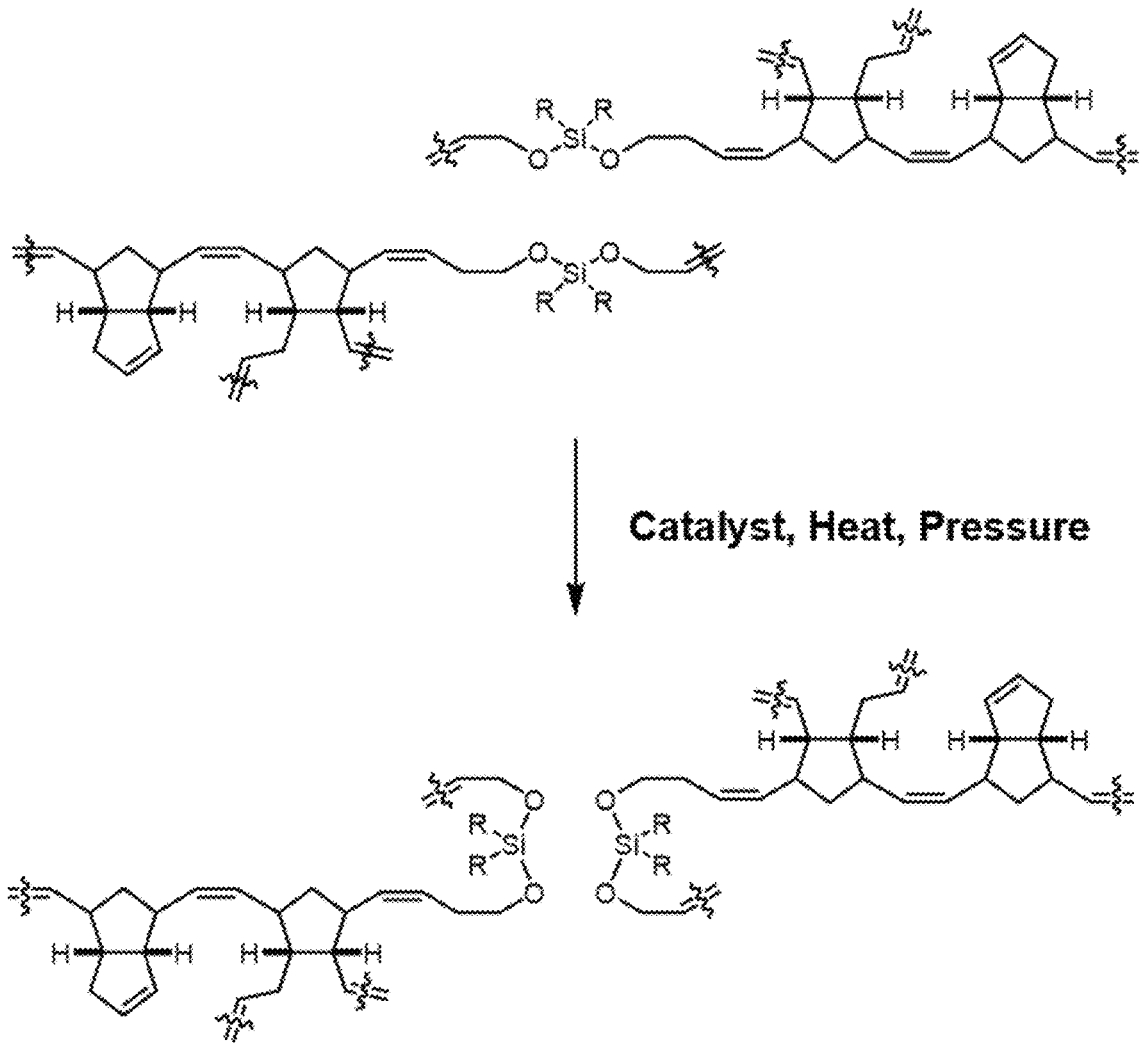

FIG. 8 is a schematic showing the incorporation of dynamic linkages may enable bond exchange in DCPD-co-iPrSi, which may be useful for self-healing of DCPD-co-iPrSi. "Catalyst" refers to reprocessing-catalyst.

DETAILED DESCRIPTION OF CERTAIN EMBODIMENTS OF THE DISCLOSURE

The details of certain embodiments of the invention are set forth in the present section. Other features, objects, and advantages of the invention will be apparent from the Definitions, Figures, Examples, and Claims. The aspects described herein are not limited to specific embodiments, methods, apparati, or configurations, and as such can, of course, vary. The terminology used herein is for the purpose of describing particular aspects only and, unless specifically defined herein, is not intended to be limiting.

In one aspect, the present disclosure provides compositions comprising:

a) a copolymer prepared by a method comprising polymerizing in the presence of a metathesis catalyst:

i) a first monomer, wherein each instance of the first monomer is independently of the formula:

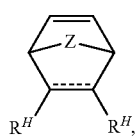

(A)

or salt thereof, wherein:

each instance of Z is independently a single bond, $C(R^P)_2$, or O;

each instance of $R^P$ is independently hydrogen, halogen, or substituted or unsubstituted, $C_{1-6}$ alkyl;

each instance of $=\!\!=\!\!=$ is independently a single or double bond;

each instance of $R^H$ is independently hydrogen, halogen, substituted or unsubstituted alkyl, substituted or unsubstituted alkenyl, substituted or unsubstituted alkynyl, substituted or unsubstituted carbocyclyl, substituted or unsubstituted heterocyclyl, substituted or unsubstituted aryl, substituted or unsubstituted heteroaryl, $-OR^a$, $-OCN$, $-OC(=O)R^a$, $-OC(=S)R^a$, $-OC(=O)OR^a$, $-OC(=O)N(R^a)_2$, $-OS(=O)R^a$, $-OS(=O)OR^a$, $-OS(=O)N(R^a)_2$, $-OS(=O)_2R^a$, $-OS(=O)_2OR^a$, $-OS(=O)_2N(R^a)_2$, $-OSi(R^a)_2$, $-OSi(R^a)_2(OR^a)$, $-OSi(R^a)(OR^a)_2$, $-OSi(OR^a)_3$, oxo, $-N(R^a)_2$, $-N=C(R^a)_2$, $=NR^a$, $-NC$, $-NCO$, $-N_3$, $-NO_2$, $-NR^aC(=O)R^a$, $-NR^aC(=O)OR^a$, $-NR^aC(=O)N(R^a)_2$, $-NR^aS(=O)R^a$, $-NR^aS(=O)OR^a$, $-NR^aS(=O)N(R^a)_2$, $-NR^aS(=O)_2R^a$, $-NR^aS(=O)_2OR^a$, $-NR^aS(=O)_2N(R^a)_2$, $-SR^a$, $-SCN$, $-S(=O)R^a$, $-S(=O)OR^a$, $-S(=O)N(R^a)_2$, $-S(=O)_2R^a$, $-S(=O)_2OR^a$, $-S(=O)_2N(R^a)_2$, $-SeR^a$, halogen, $-CN$, $-C(=NR^a)R^a$, $-C(=NR^a)OR^a$, $-C(=NR^a)N(R^a)_2$, $-C(=O)R^a$, $-C(=O)OR^a$, $-C(=O)SR^a$, $-C(=S)OR^a$, or $-C(=O)N(R^a)_2$;

or the two instances of $R^H$ of one or more instances of

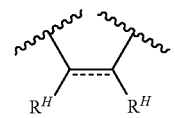

are joined with the intervening carbon atoms to independently form a substituted or unsubstituted, monocyclic carbocyclic ring, substituted or unsubstituted, monocyclic heterocyclic ring, substituted or unsubstituted, monocyclic aryl ring, or substituted or unsubstituted, monocyclic heteroaryl ring; and each instance of $R^a$ is independently hydrogen, substituted or unsubstituted alkyl, substituted or unsubstituted alkenyl, substituted or unsubstituted alkynyl, substituted or unsubstituted, monocyclic carbocyclyl, substituted or unsubstituted, monocyclic heterocyclyl, substituted or unsubstituted, monocyclic aryl, substituted or unsubstituted, monocyclic heteroaryl, a nitrogen protecting group when attached to a nitrogen atom, an oxygen protecting group when attached to an oxygen atom, or a sulfur protecting group when attached to a sulfur atom, or two instances of $R^a$ are joined to form substituted or unsubstituted heterocyclyl or substituted or unsubstituted heteroaryl;

ii) a second monomer, wherein each instance of the second monomer is independently of the formula:

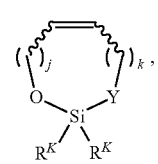

(B)

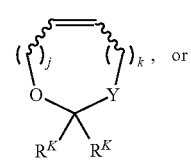

(B1)

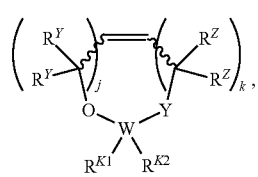

(B2)

or a salt thereof, wherein:

each instance of Y is independently O or $C(R^Q)_2$;

each instance of $R^Q$ is independently hydrogen, halogen, or substituted or unsubstituted, $C_{1-6}$ alkyl;

each instance of $R^K$ is independently hydrogen, halogen, substituted or unsubstituted, $C_{1-10}$ alkyl, substituted or unsubstituted carbocyclyl, substituted or unsubstituted heterocyclyl, substituted or unsubstituted aryl, substituted or unsubstituted heteroaryl, or —$OR^N$;

each instance of $R^N$ is independently hydrogen, substituted or unsubstituted acyl, substituted or unsubstituted, $C_{1-10}$ alkyl, substituted or unsubstituted carbocyclyl, substituted or unsubstituted heterocyclyl, substituted or unsubstituted aryl, substituted or unsubstituted heteroaryl, or an oxygen protecting group;

each instance of j is independently 1, 2, or 3;

in Formulae (B) and (B1), each instance of k is independently 0, 1, 2, or 3; and in Formula (B2):

W is carbon or silicon;

each instance of $R^Y$ is independently hydrogen, halogen, or substituted or unsubstituted, $C_{1-6}$ alkyl;

each instance of $R^Z$ is independently hydrogen, halogen, or substituted or unsubstituted, $C_{1-6}$ alkyl;

$R^{K1}$ is hydrogen, halogen, substituted or unsubstituted, $C_{1-10}$ alkyl, substituted or unsubstituted, $C_{2-10}$ alkenyl, substituted or unsubstituted, $C_{2-10}$ alkynyl, substituted or unsubstituted carbocyclyl, substituted or unsubstituted heterocyclyl, substituted or unsubstituted aryl, substituted or unsubstituted heteroaryl, -$L^{K1}$-(substituted or unsubstituted carbocyclyl), -$L^{K1}$-(substituted or unsubstituted heterocyclyl), -$L^{K1}$-(substituted or unsubstituted aryl), -$L^{K1}$-(substituted or unsubstituted heteroaryl), or $OR^{N1}$;

$L^{K1}$ is —O—, substituted or unsubstituted, $C_{1-10}$ alkylene, substituted or unsubstituted, $C_{2-10}$ heteroalkylene, substituted or unsubstituted carbocyclylene, substituted or unsubstituted heterocyclylene, substituted or unsubstituted arylene, substituted or unsubstituted heteroarylene, or a combination thereof;

$R^{N1}$ is independently hydrogen, substituted or unsubstituted acyl, substituted or unsubstituted, $C_{1-10}$ alkyl, substituted or unsubstituted carbocyclyl, substituted or unsubstituted heterocyclyl, substituted or unsubstituted aryl, substituted or unsubstituted heteroaryl, or an oxygen protecting group;

$R^{K2}$ is halogen, substituted or unsubstituted, $C_{2-10}$ alkenyl, substituted or unsubstituted, $C_{2-10}$ alkynyl, substituted or unsubstituted carbocyclyl, substituted or unsubstituted heterocyclyl, substituted or unsubstituted heteroaryl, -$L^{K2}$-(substituted or unsubstituted carbocyclyl), -$L^{K2}$-(substituted or unsubstituted heterocyclyl), -$L^{K2}$-(substituted or unsubstituted aryl), or —$OR^{N2}$;

$L^{K2}$ is —O—, substituted or unsubstituted, $C_{1-10}$ alkylene, substituted or unsubstituted, $C_{2-10}$ heteroalkylene, substituted or unsubstituted carbocyclylene, substituted or unsubstituted heterocyclylene, substituted or unsubstituted arylene, substituted or unsubstituted heteroarylene, or a combination thereof;

$R^{N2}$ is independently hydrogen, substituted or unsubstituted acyl, substituted or unsubstituted, $C_{1-10}$ alkyl, substituted or unsubstituted carbocyclyl, substituted or unsubstituted heterocyclyl, substituted or unsubstituted aryl, substituted or unsubstituted heteroaryl, or an oxygen protecting group;

or $R^{K1}$ and $R^{K2}$ are joined with the intervening atom to form substituted or unsubstituted carbocyclyl or substituted or unsubstituted heterocyclyl; and each instance of k is independently 1, 2, or 3;

iii) optionally a third monomer, wherein the third monomer is different from the first monomer and the second monomer; and iv) optionally a reprocessing catalyst; and b) optionally the reprocessing catalyst;

wherein the reprocessing catalyst is a Brønsted acid, Lewis acid, Brønsted base, Lewis base, urea, thiourea, carbamate, thiocarbamate, or a salt thereof;

provided that the composition comprises at least one of the reprocessing catalyst of iv) and the reprocessing catalyst of b).

In certain embodiments, the composition comprises at least the reprocessing catalyst of b).

In certain embodiments, the composition comprises the reprocessing catalyst of b) and substantially free of the reprocessing catalyst of iv).

In certain embodiments, the copolymer and the reprocessing catalyst of b) are in the form of a mixture of each other. In certain embodiments, the mixture is substantially free of solvents.

In certain embodiments, the composition comprises at least the reprocessing catalyst of iv).

In certain embodiments, the composition comprises the reprocessing catalyst of iv) and substantially free of the reprocessing catalyst of b).

In another aspect, the present disclosure provides kits comprising:

a) a copolymer prepared by a method comprising polymerizing in the presence of a metathesis catalyst:

i) a first monomer, wherein each instance of the first monomer is independently of the formula:

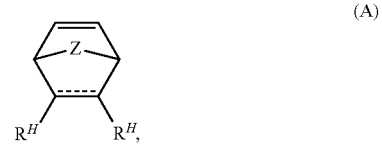

(A)

or salt thereof, wherein:

each instance of Z is independently a single bond, $C(R^P)_2$, or O;

each instance of $R^P$ is independently hydrogen, halogen, or substituted or unsubstituted, $C_{1-6}$ alkyl;

each instance of === is independently a single or double bond;

each instance of $R^H$ is independently hydrogen, halogen, substituted or unsubstituted alkyl, substituted or unsubstituted alkenyl, substituted or unsubstituted alkynyl, substituted or unsubstituted carbocyclyl, substituted or unsubstituted heterocyclyl, substituted or unsubstituted aryl, substituted or unsubstituted heteroaryl, —$OR^a$, —OCN, —OC(=O)$R^a$, —OC(=S)$R^a$, —OC(=O)$OR^a$, —OC(=O)N($R^a$)$_2$, —OS(=O)$R^a$, —OS(=O)$OR^a$, —OS(=O)N($R^a$)$_2$, —OS(=O)$_2R^a$, —OS(=O)$_2OR^a$, —OS(=O)$_2$N($R^a$)$_2$, —OSi($R^a$)$_3$, —OSi($R^a$)$_2$(O$R^a$), —OSi($R^a$)(O$R^a$)$_2$, —OSi(O$R^a$)$_3$, oxo, —N($R^a$)$_2$, —N=C($R^a$)$_2$, =N$R^a$, —NC, —NCO, —N$_3$, —NO$_2$, —N$R^a$C(=O)$R^a$, —N$R^a$C(=O)O$R^a$, —N$R^a$C(=O)N($R^a$)$_2$, —N$R^a$S(=O)$R^a$, —N$R^a$S(=O)O$R^a$, —N$R^a$S(=O)N($R^a$)$_2$, —N$R^a$S(=O)$_2R^a$, —NR$^a$S(=O)$_2$OR$_a$, —NR$^a$S(=O)$_2$N(R$^a$)$_2$, —SR$^a$, —SCN, —S(=O)R$^a$, —S(=O)OR$^a$, —S(=O)N(R$^a$)$_2$, —S(=O)$_2$R$^a$, —S(=O)$_2$OR$_a$, —S(=O)$_2$N(R$^a$)$_2$, —SeR$^a$, halogen, —CN, —C(=NR$^a$)R$^a$, —C(=NR$^a$)OR$^a$, —C(=NR$^a$)N(R$^a$)$_2$, —C(=O)R$^a$, —C(=O)OR$^a$, —C(=O)SR$^a$, —C(=S)OR$^a$, or —C(=O)N(R$^a$)$_2$;

or the two instances of R$^H$ of one or more instances of

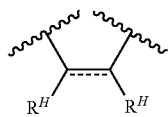

are joined with the intervening carbon atoms to independently form a substituted or unsubstituted, monocyclic carbocyclic ring, substituted or unsubstituted, monocyclic heterocyclic ring, substituted or unsubstituted, monocyclic aryl ring, or substituted or unsubstituted, monocyclic heteroaryl ring; and each instance of R$^a$ is independently hydrogen, substituted or unsubstituted alkyl, substituted or unsubstituted alkenyl, substituted or unsubstituted alkynyl, substituted or unsubstituted, monocyclic carbocyclyl, substituted or unsubstituted, monocyclic heterocyclyl, substituted or unsubstituted, monocyclic aryl, substituted or unsubstituted, monocyclic heteroaryl, a nitrogen protecting group when attached to a nitrogen atom, an oxygen protecting group when attached to an oxygen atom, or a sulfur protecting group when attached to a sulfur atom, or two instances of R$^a$ are joined to form substituted or unsubstituted heterocyclyl or substituted or unsubstituted heteroaryl;

ii) a second monomer, wherein each instance of the second monomer is independently of the formula:

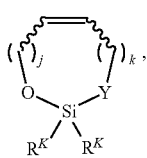 (B)

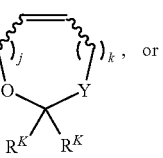 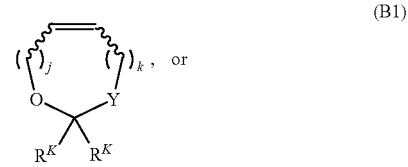 (B1)

(B2)

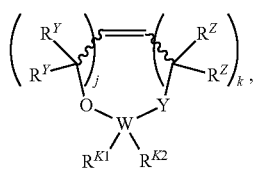

or a salt thereof, wherein:

each instance of Y is independently O or C(R$^Q$)$_2$;

each instance of R$^Q$ is independently hydrogen, halogen, or substituted or unsubstituted, C$_{1-6}$ alkyl;

each instance of R$^K$ is independently hydrogen, halogen, substituted or unsubstituted, C$_{1-10}$ alkyl, substituted or unsubstituted carbocyclyl, substituted or unsubstituted heterocyclyl, substituted or unsubstituted aryl, substituted or unsubstituted heteroaryl, or —OR$^N$;

each instance of R$^N$ is independently hydrogen, substituted or unsubstituted acyl, substituted or unsubstituted, C$_{1-10}$ alkyl, substituted or unsubstituted carbocyclyl, substituted or unsubstituted heterocyclyl, substituted or unsubstituted aryl, substituted or unsubstituted heteroaryl, or an oxygen protecting group;

each instance of j is independently 1, 2, or 3;

in Formulae (B) and (B1), each instance of k is independently 0, 1, 2, or 3; and in Formula (B2):

W is carbon or silicon;

each instance of R$^Y$ is independently hydrogen, halogen, or substituted or unsubstituted, C$_{1-6}$ alkyl;

each instance of R$^Z$ is independently hydrogen, halogen, or substituted or unsubstituted, C$_{1-6}$ alkyl;

R$^{K1}$ is hydrogen, halogen, substituted or unsubstituted, C$_{1-10}$ alkyl, substituted or unsubstituted, C$_{2-10}$ alkenyl, substituted or unsubstituted, C$_{2-10}$ alkynyl, substituted or unsubstituted carbocyclyl, substituted or unsubstituted heterocyclyl, substituted or unsubstituted aryl, substituted or unsubstituted heteroaryl, -L$^{K1}$-(substituted or unsubstituted carbocyclyl), -L$^{K1}$-(substituted or unsubstituted heterocyclyl), -L$^{K1}$-(substituted or unsubstituted aryl), -L$^{K1}$-(substituted or unsubstituted heteroaryl), or —OR$^{N1}$;

L$^{K1}$ is —O—, substituted or unsubstituted, C$_{1-10}$ alkylene, substituted or unsubstituted, C$_{2-10}$ heteroalkylene, substituted or unsubstituted carbocyclylene, substituted or unsubstituted heterocyclylene, substituted or unsubstituted arylene, or unsubstituted heteroarylene, or a combination thereof;

R$^{N1}$ is independently hydrogen, substituted or unsubstituted acyl, substituted or unsubstituted, C$_{1-10}$ alkyl, substituted or unsubstituted carbocyclyl, substituted or unsubstituted heterocyclyl, substituted or unsubstituted aryl, substituted or unsubstituted heteroaryl, or an oxygen protecting group;

R$^{K2}$ is halogen, substituted or unsubstituted, C$_{2-10}$ alkenyl, substituted or unsubstituted, C$_{2-10}$ alkynyl, substituted or unsubstituted carbocyclyl, substituted or unsubstituted heterocyclyl, substituted or unsubstituted heteroaryl, -L$^{K2}$-(substituted or unsubstituted carbocyclyl), -L$^{K2}$-(substituted or unsubstituted heterocyclyl), -L$^{K2}$-(substituted or unsubstituted aryl), or —OR$^{N2}$;

L$^{K2}$ is —O—, substituted or unsubstituted, C$_{1-10}$ alkylene, substituted or unsubstituted, C$_{2-10}$ heteroalkylene, substituted or unsubstituted carbocyclylene, substituted or unsubstituted heterocyclylene, substituted or unsubstituted arylene, or unsubstituted heteroarylene, or a combination thereof;

R$^{N2}$ is independently hydrogen, substituted or unsubstituted acyl, substituted or unsubstituted, C$_{1-10}$ alkyl, substituted or unsubstituted carbocyclyl, substituted or unsubstituted heterocyclyl, substituted or unsubstituted aryl, substituted or unsubstituted heteroaryl, or an oxygen protecting group;

or R$^{K1}$ and R$^{K2}$ are joined with the intervening atom to form substituted or unsubstituted carbocyclyl or substituted or unsubstituted heterocyclyl; and each instance of k is independently 1, 2, or 3;

iii) optionally a third monomer, wherein the third monomer is different from the first monomer and the second monomer; and iv) optionally a reprocessing catalyst; and b) the reprocessing catalyst;

wherein the reprocessing catalyst is a Brønsted acid, Lewis acid, Brønsted base, Lewis base, urea, thiourea, carbamate, thiocarbamate, or a salt thereof.

In another aspect, the present disclosure provides methods of preparing the composition described herein comprising mixing the copolymer with the reprocessing catalyst of b).

In certain embodiments, the step of mixing comprises the presence of a solvent and subsequent substantial removal of the solvent.

In certain embodiments, the solvent is an organic solvent.

In certain embodiments, the solvent is an aprotic organic solvent. In certain embodiments, the solvent is an aprotic ether solvent. In certain embodiments, the solvent is THF. In certain embodiments, the solvent is 2-methyltetrahydrofuran, methyl tertiary-butyl ether, or 1,4-dioxane. In certain embodiments, the boiling point of the solvent at a pressure of 1 atm is between 50 and 60, between 60 and 70, between 70 and 80, between 80 and 100, or between 100 and 120° C., inclusive.

In certain embodiments, the presence of a solvent comprises the presence of the solvent at a temperature between 20 and 30° C., inclusive. In certain embodiments, the presence of a solvent comprises the presence of the solvent at a temperature between 0 and 20, between 30 and 40, or between 40 and 60° C., inclusive. In certain embodiments, the presence of a solvent comprises the presence of the solvent at a temperature between 5 and 10, between 10 and 20, between 20 and 40, or between 40 and 60° C., inclusive, below the boiling point of the solvent at a pressure of 1 atm.

In certain embodiments, the solvent is present in the mixture resulted from the step of mixing for a time period between 1 hour and 2 weeks, inclusive.

In certain embodiments, the subsequent substantial removal of the solvent comprises subsequent substantial removal of the solvent at a pressure between 0.0001 and 0.1 atm, inclusive. In certain embodiments, the subsequent substantial removal of the solvent comprises subsequent substantial removal of the solvent at a pressure between 0.0001 and 0.001, between 0.001 and 0.01, between 0.01 and 0.1, or between 0.1 and 1 atm, inclusive.

In certain embodiments, the subsequent substantial removal of the solvent further comprises subsequent substantial removal of the solvent at a temperature between 0 and 20° C., inclusive, lower than the boiling point of the solvent. In certain embodiments, the subsequent substantial removal of the solvent further comprises subsequent substantial removal of the solvent at a temperature between 0 and 10, between 10 and 20, or between 20 and 40° C., inclusive, lower than the boiling point of the solvent.

Unless otherwise provided, the boiling point of the solvent is the boiling point of the solvent at a pressure of 1 atm.

In certain embodiments, the method of preparing the composition described herein further comprises, prior to the step of mixing, reducing the size of the composition.

In certain embodiments, the average size (e.g., average length or average diameter) of the composition after the step of reducing the size of the composition and prior to the step of mixing is between 1 µm and 1 mm, inclusive.

In another aspect, the present disclosure provides methods of preparing the composition of claim 1 comprising polymerizing:

the first monomer;

the second monomer; and optionally the third monomer;

in the presence of the metathesis catalyst and the reprocessing catalyst of iv).

In certain embodiments, the step of polymerizing is substantially free of a solvent.

In certain embodiments, the step of polymerizing is substantially free of a chain transfer agent.

In certain embodiments, "substantially free" is between 90% and 95%, between 95% and 97%, between 97% and 99%, between 99% and 99.5%, or between 99.5% and 99.9%, free.

In another aspect, the present disclosure provides methods of reprocessing the composition of claim 1 comprising:

heating the composition to an elevated temperature, wherein the elevated temperature is between 40 and 400° C., inclusive; and/or pressing the composition to an elevated pressure, wherein the elevated pressure is between 0.1 and 1,000 ton/ft$^2$, inclusive;

wherein during a time period between 1 hour and 2 weeks, inclusive, the elevated temperature and/or the elevated pressure are substantially maintained.

In certain embodiments, the method comprises:

heating the composition to the elevated temperature; and pressing the composition to the elevated pressure;

wherein during the time period, the elevated temperature and the elevated pressure are substantially maintained.

In certain embodiments, the elevated temperature is between 120 and 180° C., inclusive. In certain embodiments, the elevated temperature is between 150 and 170° C., inclusive. In certain embodiments, the elevated temperature is between 80 and 100 or between 100 and 120, inclusive. In certain embodiments, the elevated temperature is between 120 and 140, between 140 and 160, between 160 and 180, or between 180 and 200° C., inclusive.

In certain embodiments, the elevated pressure is between the ambient pressure and 1,000 ton/ft$^2$, exclusive. In certain embodiments, the elevated pressure is between 1 and 30 ton/ft$^2$, inclusive. In certain embodiments, the elevated pressure is between 3 and 12 ton/ft$^2$, inclusive. In certain embodiments, the elevated pressure is between 1 and 10, between 10 and 20, between 20 and 30, between 30 and 40, between 40 and 60, between 60 and 100, between 100 and 300, or between 300 and 1000, ton/ft$^2$, inclusive.

In certain embodiments, the time period is between 8 hours and 3 days, inclusive. In certain embodiments, the time period is between 8 hours and 3 days, inclusive. In certain embodiments, the time period is between 1 and 8 hours, between 8 and 24 hours, between 1 and 3 days, between 3 and 7 days, or between 7 and 14 days.

In certain embodiments, "at least one instance" is each instance.

In certain embodiments, at least one instance of Z is $C(R^P)_2$. In certain embodiments, each instance of Z is $C(R^P)_2$. In certain embodiments, at least one instance of Z is $CH_2$. In certain embodiments, each instance of Z is $CH_2$.

In certain embodiments, each instance of $R^P$ is hydrogen. In certain embodiments, at least one instance of $R^P$ is hydrogen. In certain embodiments, at least one instance of $R^P$ is halogen. In certain embodiments, at least one instance of $R^P$ is unsubstituted, $C_{1-6}$ alkyl or $C_{1-6}$ alkyl substituted with one or more halogen. In certain embodiments, at least one instance of $R^P$ is unsubstituted methyl.

In certain embodiments, at least one instance of $R^H$ is hydrogen. In certain embodiments, each instance of $R^H$ is hydrogen.

In certain embodiments, at least one instance of $R^H$ is substituted or unsubstituted alkyl (e.g., —$CF_3$). In certain embodiments, at least one instance of $R^H$ is —CN. In certain embodiments, at least one instance of $R^H$ is —C(=O)$OR^a$ (e.g., —C(=O)$OCH_3$). In certain embodiments, at least one instance of $R^H$ is —C(=O)$R^a$. In certain embodiments, at least one instance of $R^H$ is —C(=O)$N(R^a)_2$.

In certain embodiments, at least one instance of the first monomer is of the formula:

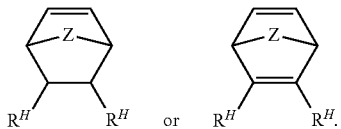

In certain embodiments, at least one instance of the first monomer is of the formula:

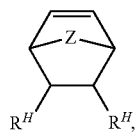

or salt thereof. In certain embodiments, at least one instance of the first monomer is of Formula (D1):

(D1)

or a salt thereof. In certain embodiments, each instance of the first monomer is of Formula (D1), or a salt thereof. In certain embodiments, at least one instance of the first monomer is of the formula:

In certain embodiments, each instance of the first monomer is of the formula:

In certain embodiments, each instance of the first monomer is of the formula:

In certain embodiments, the two instances of $R^H$ of one or more instances of

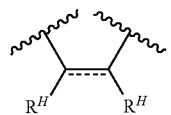

are joined with the intervening carbon atoms to independently form a substituted or unsubstituted, monocyclic carbocyclic ring, or substituted or unsubstituted, monocyclic heterocyclic ring. In certain embodiments, the two instances of $R^H$ of one or more instances of

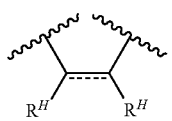

are joined with the intervening carbon atoms to independently form a substituted or unsubstituted, monocyclic cycloalkenyl ring. In certain embodiments, the two instances of $R^H$ of one or more instances of

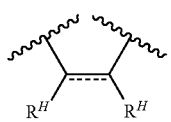

are joined with the intervening carbon atoms to independently form a substituted or unsubstituted, monocyclic, saturated heterocyclic ring. In certain embodiments, at least one instance of the first monomer comprises a substituted or unsubstituted partially unsaturated monocyclic carbocyclic ring or a substituted or unsubstituted partially unsaturated monocyclic heterocyclic ring.

In certain embodiments, at least one instance of the first monomer is of Formula (D2):

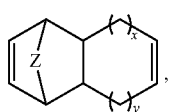

(D2)

or a salt thereof, wherein:
each instance of x is independently 0, 1, or 2; and
each instance of y is independently 0, 1, or 2.

In certain embodiments, each instance of the first monomer is of Formula (D2), or a salt thereof.

In certain embodiments, each instance of x is 0. In certain embodiments, each instance of x is 1. In certain embodiments, each instance of x is 2.

In certain embodiments, each instance of y is 1. In certain embodiments, each instance of y is 0. In certain embodiments, each instance of y is 2.

In certain embodiments, each instance of x is 1, and each instance of y is 1. In certain embodiments, each instance of x is 1, and each instance of y is 0. In certain embodiments, each instance of x is 0, and each instance of y is 1.

In certain embodiments, at least one instance of the first monomer is of the formula:

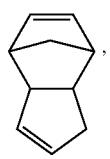

preferably

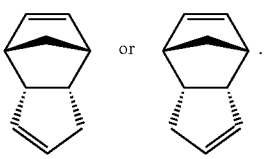 [SMILES: C1=C[C@H]2[C@@H](C1)[C@H]1C=C[C@@H]2C1 ; C1=C[C@@H]2[C@H](C1)[C@@H]1C=C[C@H]2C1]

In certain embodiments, each instance of the first monomer is of the formula:

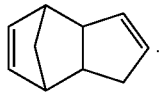

In certain embodiments, each instance of the first monomer is of the formula:

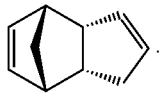

In certain embodiments, each instance of the first monomer is of the formula:

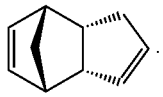

In certain embodiments, at least one instance of the second monomer comprises one non-aromatic C=C or non-aromatic C=C bond. In certain embodiments, at least one instance of the second monomer comprises two, three, or four non-aromatic C=C and/or non-aromatic C=C bonds. In certain embodiments, at least one instance of the second monomer comprises two (i.e., only two) non-aromatic C=C and/or non-aromatic C=C bonds. In certain embodiments, at least one instance of the second monomer comprises only three non-aromatic C=C and/or non-aromatic C=C bonds (i.e., the combined number of non-aromatic C=C bonds and non-aromatic C=C bonds is three). In certain embodiments, at least one instance of the second monomer comprises no C=C bonds.

In certain embodiments, at least one instance of W is carbon. In certain embodiments, at least one instance of W is silicon.

In certain embodiments, at least one instance of Y is O. In certain embodiments, at least one instance of Y is $CH_2$.

In certain embodiments, at least one instance of $R^Q$ is hydrogen.

In certain embodiments, at least one instance of $R^Y$ is hydrogen. In certain embodiments, each instance of $R^Y$ is independently hydrogen or unsubstituted $C_{1-6}$ alkyl. In certain embodiments, at least one instance of $R^Y$ is substituted or unsubstituted, $C_{1-6}$ alkyl.

In certain embodiments, at least one instance of $R^Z$ is hydrogen. In certain embodiments, each instance of $R^Z$ is independently hydrogen or unsubstituted $C_{1-6}$ alkyl. In certain embodiments, at least one instance of $R^Z$ is substituted or unsubstituted, $C_{1-6}$ alkyl.

In certain embodiments, j and k of at least one instance of the second monomer are 1 and 1, respectively. In certain embodiments, j and k of at least one instance of the second monomer are 1 and 2, or 2 and 1, respectively. In certain embodiments, j and k of at least one instance of the second monomer are 1 and 3, or 3 and 1, respectively. In certain embodiments, j and k of at least one instance of the second monomer are 2 and 2, respectively.

In certain embodiments, at least one instance of $R^{K1}$ is substituted or unsubstituted, $C_{1-10}$ alkyl, substituted or unsubstituted, $C_{2-10}$ alkenyl, substituted or unsubstituted, $C_{2-10}$ alkynyl, substituted or unsubstituted carbocyclyl, substituted or unsubstituted heterocyclyl, substituted or unsubstituted aryl, substituted or unsubstituted heteroaryl, $-L^{K1}$-(substituted or unsubstituted carbocyclyl), $-L^{K1}$-(substituted or unsubstituted heterocyclyl), $-L^{K1}$-(substituted or unsubstituted aryl), $-L^{K1}$-(substituted or unsubstituted heteroaryl), or $-OR^{N1}$.

In certain embodiments, at least one instance of $R^K$ is substituted or unsubstituted, $C_{1-6}$ alkyl or substituted or unsubstituted phenyl.

In certain embodiments, at least one instance of $R^{K1}$ or at least one first instance of $R^K$ of a second monomer is substituted or unsubstituted, $C_{1-10}$ alkyl. In certain embodiments, at least one instance of $R^{K1}$ or at least one first instance of $R^K$ of a second monomer is unsubstituted methyl, unsubstituted ethyl, unsubstituted propyl (e.g., unsubstituted n-propyl or unsubstituted isopropyl), or unsubstituted butyl (e.g., unsubstituted n-butyl).

In certain embodiments, at least one instance of $R^{K1}$ or at least one first instance of $R^K$ of a second monomer is substituted or unsubstituted, saturated carbocyclyl. In certain embodiments, at least one instance of $R^{K1}$ or at least one first instance of $R^K$ of a second monomer is unsubstituted cyclopropyl, unsubstituted cyclobutyl, unsubstituted cyclopentyl, unsubstituted cyclohexyl, or unsubstituted cycloheptyl.

In certain embodiments, at least one instance of $R^{K1}$ or at least one first instance of $R^K$ of a second monomer is substituted or unsubstituted, partially unsaturated carbocyclyl. In certain embodiments, at least one instance of $R^{K1}$ or at least one first instance of $R^K$ of a second monomer is substituted or unsubstituted carbocyclyl that comprises only one unsaturated bond in the carbocyclic ring system. In certain embodiments, at least one instance of $R^{K1}$ or at least one first instance of $R^K$ of a second monomer is unsubstituted cyclobutenyl, unsubstituted cyclopentenyl, unsubstituted cyclohexenyl, or unsubstituted cycloheptenyl. In certain embodiments, at least one instance of $R^{K1}$ or at least one first instance of $R^K$ of a second monomer is substituted or unsubstituted carbocyclyl that comprises only two unsaturated bonds in the carbocyclic ring system. In certain embodiments, at least one instance of $R^{K1}$ or at least one first instance of $R^K$ of a second monomer is substituted or unsubstituted carbocyclyl that comprises no C=C bonds in the carbocyclic ring system.

In certain embodiments, at least one instance of $R^{K1}$ is:

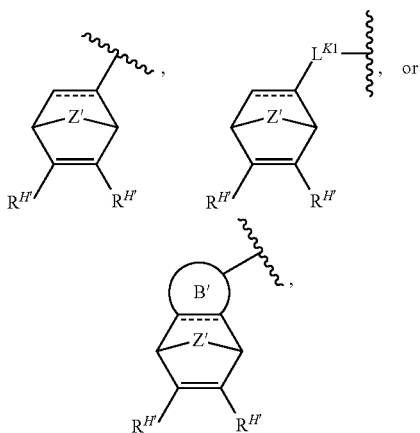

wherein:

is Ring B', wherein Ring B' is a substituted or unsubstituted, monocyclic carbocyclic ring, substituted or unsubstituted, monocyclic heterocyclic ring, substituted or unsubstituted, monocyclic aryl ring, or substituted or unsubstituted, monocyclic heteroaryl ring;

Z' is C($R^{P'}$)$_2$ or O;

each instance of $R^{P'}$ is independently hydrogen, halogen, or substituted or unsubstituted, $C_{1-6}$ alkyl;

=== is a single bond or double bond;

each instance of $R^{H'}$ is independently hydrogen, halogen, substituted or unsubstituted alkyl, substituted or unsubstituted alkenyl, substituted or unsubstituted alkynyl, substituted or unsubstituted carbocyclyl, substituted or unsubstituted heterocyclyl, substituted or unsubstituted aryl, substituted or unsubstituted heteroaryl, —OR$^a$, —OCN, —OC(=O)R$^a$, —OC(=S)R$^a$, —OC(=O)OR$^a$, —OC(=O)N(R$^a$)$_2$, —OS(=O)R$^a$, —OS(=O)OR$^a$, —OS(=O)N(R$^a$)$_2$, —OS(=O)$_2$R$^a$, —OS(=O)$_2$OR$^a$, —OS(=O)$_2$N(R$^a$)$_2$, —OSi(R$^a$)$_3$, —OSi(R$^a$)$_2$(OR$^a$), —OSi(R$^a$)(OR$^a$)$_2$, —OSi(OR$^a$)$_3$, oxo, —N(R$^a$)$_2$, —N=C(R$^a$)$_2$, =NR$^a$, —NC, —NCO, —N$_3$, —NO$_2$, —NR$^a$C(=O)R$^a$, —NR$^a$C(=O)OR$^a$, —NR$^a$C(=O)N(R$^a$)$_2$, —NR$^a$S(=O)R$^a$, —NR$^a$S(=O)OR$^a$, —NR$^a$S(=O)N(R$^a$)$_2$, —NR$^a$S(=O)$_2$R$^a$, —NR$^a$S(=O)$_2$OR$^a$, —NR$^a$S(=O)$_2$N(R$^a$)$_2$, —SR$^a$, —SCN, —S(=O)R$^a$, —S(=O)OR$^a$, —S(=O)N(R$^a$)$_2$, —S(=O)$_2$R$^a$, —S(=O)$_2$OR$_a$, —S(=O)$_2$N(R$^a$)$_2$, —SeR$^a$, halogen, —CN, —C(=NR$^a$)R$^a$, —C(=NR$^a$)OR$^a$, —C(=NR$^a$)N(R$^a$)$_2$, —C(=O)R$^a$, —C(=O)OR$^a$, —C(=O)SR$^a$, —C(=S)OR$^a$, or —C(=O)N(R$^a$)$_2$;

or the two instances of $R^{H'}$ are joined with the intervening carbon atoms to form a substituted or unsubstituted, monocyclic carbocyclic ring, substituted or unsubstituted, monocyclic heterocyclic ring, substituted or unsubstituted, monocyclic aryl ring, or substituted or unsubstituted, monocyclic heteroaryl ring; and each instance of R$^a$ is independently hydrogen, substituted or unsubstituted alkyl, substituted or unsubstituted alkenyl, substituted or unsubstituted alkynyl, substituted or unsubstituted, monocyclic carbocyclyl, substituted or unsubstituted, monocyclic heterocyclyl, substituted or unsubstituted, monocyclic aryl, substituted or unsubstituted, monocyclic heteroaryl, a nitrogen protecting group when attached to a nitrogen atom, an oxygen protecting group when attached to an oxygen atom, or a sulfur protecting group when attached to a sulfur atom, or two instances of R$^a$ are joined to form substituted or unsubstituted heterocyclyl or substituted or unsubstituted heteroaryl.

In certain embodiments, at least one instance of $R^{K1}$ is:

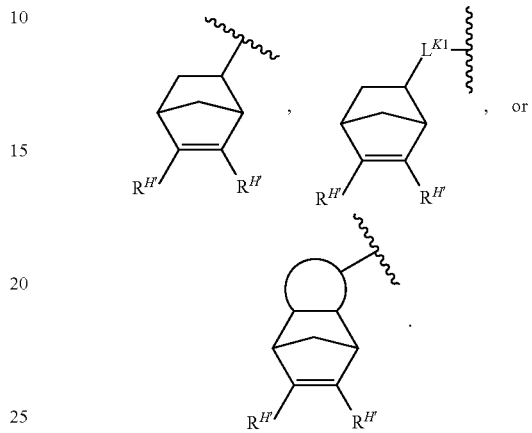

In certain embodiments, Ring B' is substituted or unsubstituted, monocyclic carbocyclic ring. In certain embodiments, Ring B' is substituted or unsubstituted, monocyclic, saturated carbocyclyl. In certain embodiments, Ring B' is unsubstituted cyclopropyl, unsubstituted cyclobutyl, unsubstituted cyclopentyl, unsubstituted cyclohexyl, or unsubstituted cycloheptyl. In certain embodiments, Ring B' is substituted or unsubstituted, monocyclic, partially unsaturated carbocyclyl. In certain embodiments, Ring B' is substituted or unsubstituted, monocyclic carbocyclyl that comprises only one unsaturated bond in the carbocyclic ring system. In certain embodiments, Ring B' is unsubstituted cyclobutenyl, unsubstituted cyclopentenyl, unsubstituted cyclohexenyl, or unsubstituted cycloheptenyl. In certain embodiments, Ring B' is substituted or unsubstituted, monocyclic carbocyclyl that comprises only two unsaturated bonds in the carbocyclic ring system. In certain embodiments, Ring B' is substituted or unsubstituted, monocyclic carbocyclyl that comprises no C=C bonds in the carbocyclic ring system.

In certain embodiments, Z' is CH$_2$.

In certain embodiments, each R$^{H'}$ is hydrogen. In certain embodiments, two instances of R$^{H'}$ are joined with the intervening carbon atoms to form an unsubstituted monocyclic carbocyclic ring. In certain embodiments, two instances of R$^{H'}$ are joined with the intervening carbon atoms to form an unsubstituted monocylic heterocyclic ring.

In certain embodiments, at least one instance of $R^{K1}$ or at least one first instance of $R^K$ of a second monomer is

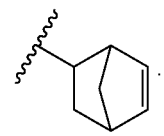 [SMILES: *C1CC2C=CC1C2]

In certain embodiments, at least one instance of $R^{K1}$ or at least one first instance of $R^K$ of a second monomer is -(substituted or unsubstituted, $C_{1-10}$ alkylene)-(substituted or unsubstituted, partially unsaturated carbocyclyl). In certain embodiments, at least one instance of $R^{K1}$ or at least one first instance of $R^K$ of a second monomer is -(unsubstituted $C_{1-10}$ alkylene)-(substituted or unsubstituted carbocyclyl that comprises only one unsaturated bond in the carbocyclic ring system).

In certain embodiments, at least one instance of $R^{K1}$ is substituted or unsubstituted heterocyclyl or -$L^{K1}$-(substituted or unsubstituted heterocyclyl). In certain embodiments, at least one instance of $R^{K1}$ is substituted or unsubstituted heterocyclyl that comprises O—Si in the heterocyclic ring system or -$L^{K1}$-(substituted or unsubstituted heterocyclyl that comprises O—Si in the heterocyclic ring system). In certain embodiments, at least one instance of $R^{K1}$ or at least one first instance of $R^K$ of a second monomer is -(substituted or unsubstituted, $C_{1-10}$ alkylene)-(substituted or unsubstituted heterocyclyl). In certain embodiments, at least one instance of $R^{K1}$ or at least one first instance of $R^K$ of a second monomer is -(substituted or unsubstituted, $C_{1-10}$ alkylene)-(substituted or unsubstituted heterocyclyl that comprises OSi in the heterocyclic ring system). In certain embodiments, at least one instance of $R^{K1}$ is:

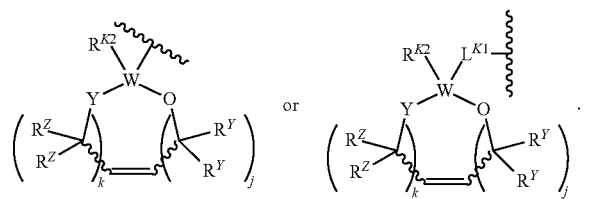

In certain embodiments, at least one instance of $R^{K1}$ or at least one first instance of $R^K$ of a second monomer is -(substituted or unsubstituted phenylene)-(substituted or unsubstituted, partially unsaturated heterocyclyl). In certain embodiments, at least one instance of $R^{K1}$ or at least one first instance of $R^K$ of a second monomer is -(substituted or unsubstituted phenylene)-(substituted or unsubstituted heterocyclyl that comprises only one unsaturated bond in the heterocyclic ring system). In certain embodiments, at least one instance of $R^{K1}$ or at least one first instance of $R^K$ of a second monomer is -(substituted or unsubstituted phenylene)-(substituted or unsubstituted, partially unsaturated heterocyclyl that comprises O—Si in the heterocyclic ring system). In certain embodiments, at least one instance of $R^{K1}$ or at least one first instance of $R^K$ of a second monomer is -(substituted or unsubstituted phenylene)-(substituted or unsubstituted heterocyclyl that comprises O—Si and only one unsaturated bond in the heterocyclic ring system).

In certain embodiments, at least one instance of $R^{K1}$ or at least one first instance of $R^K$ of a second monomer is

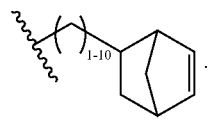

In certain embodiments, at least one instance of $R^{K1}$ or at least one first instance of $R^K$ of a second monomer is

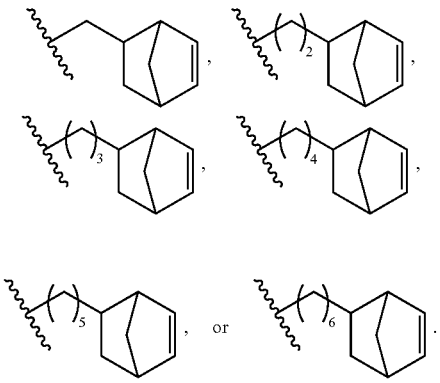

In certain embodiments, at least one instance of $R^{K1}$ or at least one first instance of $R^K$ of a second monomer is hydrogen. In certain embodiments, at least one instance of $R^{K1}$ is —$OR^{N1}$ (e.g., —O(substituted or unsubstituted, $C_{1-10}$ alkyl)).

In certain embodiments, at least one first instance of $R^K$ of a second monomer is —$OR^{N1}$ (e.g., —O(substituted or unsubstituted, $C_{1-10}$ alkyl)).

In certain embodiments, at least one instance of $R^{N1}$ is substituted or unsubstituted, $C_{1-10}$ alkyl. In certain embodiments, at least one instance of $R^{N1}$ is unsubstituted $C_{1-6}$ alkyl.

In certain embodiments, at least one instance of $L^{K1}$ is —O— or substituted or unsubstituted, $C_{1-10}$ alkylene. In certain embodiments, at least one instance of $L^{K1}$ is unsubstituted $C_{1-6}$ alkylene. In certain embodiments, at least one instance of $L^{K1}$ is substituted or unsubstituted phenylene.

In certain embodiments, at least one instance of $R^{K2}$ or at least one second instance of $R^K$ of the second monomer is substituted or unsubstituted, saturated carbocyclyl. In certain embodiments, at least one instance of $R^{K2}$ or at least one second instance of $R^K$ of the second monomer is unsubstituted cyclopropyl, unsubstituted cyclobutyl, unsubstituted cyclopentyl, unsubstituted cyclohexyl, or unsubstituted cycloheptyl.

In certain embodiments, at least one instance of $R^{K2}$ or at least one second instance of $R^K$ of the second monomer is substituted or unsubstituted, partially unsaturated carbocyclyl. In certain embodiments, at least one instance of $R^{K2}$ or at least one second instance of $R^K$ of the second monomer is substituted or unsubstituted carbocyclyl that comprises only one unsaturated bond in the carbocyclic ring system. In certain embodiments, at least one instance of $R^{K2}$ or at least one second instance of $R^K$ of the second monomer is unsubstituted cyclobutenyl, unsubstituted cyclopentenyl, unsubstituted cyclohexenyl, or unsubstituted cycloheptenyl. In certain embodiments, at least one instance of $R^{K2}$ or at least one second instance of $R^K$ of the second monomer is substituted or unsubstituted carbocyclyl that comprises only two unsaturated bonds in the carbocyclic ring system. In certain embodiments, at least one instance of $R^{K2}$ or at least one second instance of $R^K$ of the second monomer is substituted or unsubstituted carbocyclyl that comprises no C=C bonds in the carbocyclic ring system.

In certain embodiments, at least one instance of $R^{K2}$ is:

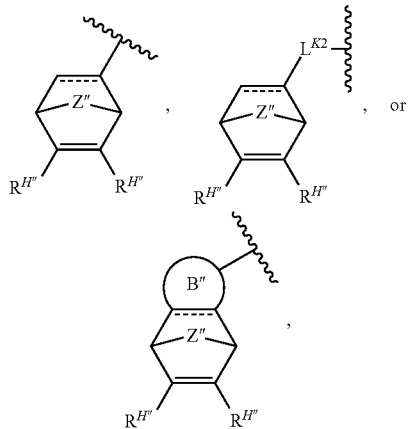

wherein:

is Ring B", wherein Ring B" is a substituted or unsubstituted, monocyclic carbocyclic ring, substituted or unsubstituted, monocyclic heterocyclic ring, substituted or unsubstituted, monocyclic aryl ring, or substituted or unsubstituted, monocyclic heteroaryl ring;

Z" is C($R^{P''}$)$_2$ or O;

each instance of $R^{P''}$ is independently hydrogen, halogen, or substituted or unsubstituted, $C_{1-6}$ alkyl;

=== is a single bond or double bond;

each instance of $R^{H''}$ is independently hydrogen, halogen, substituted or unsubstituted alkyl, substituted or unsubstituted alkenyl, substituted or unsubstituted alkynyl, substituted or unsubstituted carbocyclyl, substituted or unsubstituted heterocyclyl, substituted or unsubstituted aryl, substituted or unsubstituted heteroaryl, —OR$^a$, —OCN, —OC(=O)R$^a$, —OC(=S)R$^a$, —OC(=O)OR$^a$, —OC(=O)N(R$^a$)$_2$, —OS(=O)R$^a$, —OS(=O)OR$^a$, —OS(=O)N(R$^a$)$_2$, —OS(=O)$_2$R$^a$, —OS(=O)$_{2l}$ $_R{}^a$, —OS(=O)$_2$N(R$^a$)$_2$, —OSi(R$^a$)$_3$, —OSi(R$^a$)$_2$(OR$^a$), —OSi(R$^a$)(OR$^a$)$_2$, —OSi(OR$^a$)$_3$, oxo, —N(R$^a$)$_2$, —N=C(R$^a$)$_2$, =NR$^a$, —NC, —NCO, —N$_3$, —NO$_2$, —NR$^a$C(=O)R$^a$, —NR$^a$C(=O)OR$^a$, —NR$^a$C(=O)N(R$^a$)$_2$, —NR$^a$S(=O)R$^a$, —NR$^a$S(=O)OR$^a$, —NR$^a$S(=O)N(R$^a$)$_2$, —NR$^a$S(=O)$_2$R$^a$, —NR$^a$S(=O)$_2$OR$^a$, —NR$^a$S(=O)$_2$N(R$^a$)$_2$, —SR$^a$, —SCN, —S(=O)R$^a$, —S(=O)OR$^a$, —S(=O)N(R$^a$)$_2$, —S(=O)$_2$R$^a$, —S(=O)$_2$OR$^a$, —S(=O)$_2$N(R$^a$)$_2$, —SeR$^a$, halogen, —CN, —C(=NR$^a$)R$^a$, —C(=NR$^a$)OR$^a$, —C(=NR$^a$)N(R$^a$)$_2$, —C(=O)R$^a$, —C(=O)OR$^a$, —C(=O)SR$^a$, —C(=S)OR$^a$, or —C(=O)N(R$^a$)$_2$;

or the two instances of $R^{H''}$ are joined with the intervening carbon atoms to form a substituted or unsubstituted, monocyclic carbocyclic ring, substituted or unsubstituted, monocyclic heterocyclic ring, substituted or unsubstituted, monocyclic aryl ring, or substituted or unsubstituted, monocyclic heteroaryl ring; and each instance of R$^a$ is independently hydrogen, substituted or unsubstituted alkyl, substituted or unsubstituted alkenyl, substituted or unsubstituted alkynyl, substituted or unsubstituted, monocyclic carbocyclyl, substituted or unsubstituted, monocyclic heterocyclyl, substituted or unsubstituted, monocyclic aryl, substituted or unsubstituted, monocyclic heteroaryl, a nitrogen protecting group when attached to a nitrogen atom, an oxygen protecting group when attached to an oxygen atom, or a sulfur protecting group when attached to a sulfur atom, or two instances of R$^a$ are joined to form substituted or unsubstituted heterocyclyl or substituted or unsubstituted heteroaryl.

In certain embodiments, at least one instance of $R^{K2}$ is:

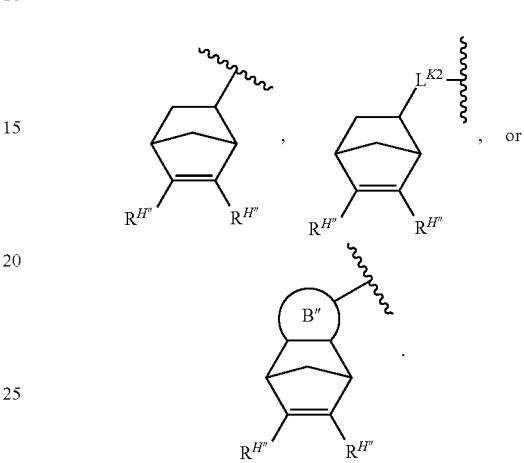

In certain embodiments, Ring B" is substituted or unsubstituted, monocyclic carbocyclic ring. In certain embodiments, Ring B" is substituted or unsubstituted, monocyclic, saturated carbocyclyl. In certain embodiments, Ring B" is unsubstituted cyclopropyl, unsubstituted cyclobutyl, unsubstituted cyclopentyl, unsubstituted cyclohexyl, or unsubstituted cycloheptyl. In certain embodiments, Ring B" is substituted or unsubstituted, monocyclic, partially unsaturated carbocyclyl. In certain embodiments, Ring B" is substituted or unsubstituted, monocyclic carbocyclyl that comprises only one unsaturated bond in the carbocyclic ring system. In certain embodiments, Ring B" is unsubstituted cyclobutenyl, unsubstituted cyclopentenyl, unsubstituted cyclohexenyl, or unsubstituted cycloheptenyl. In certain embodiments, Ring B" is substituted or unsubstituted, monocyclic carbocyclyl that comprises only two unsaturated bonds in the carbocyclic ring system. In certain embodiments, Ring B" is substituted or unsubstituted, monocyclic carbocyclyl that comprises no C=C bonds in the carbocyclic ring system.

In certain embodiments, Z" is CH$_2$.

In certain embodiments, each $R^{H''}$ is hydrogen. In certain embodiments, two instances of $R^{H''}$ are joined with the intervening carbon atoms to form an unsubstituted monocyclic carbocyclic ring. In certain embodiments, two instances of $R^{H''}$ are joined with the intervening carbon atoms to form an unsubstituted monocylic heterocyclic ring.

In certain embodiments, at least one instance of $R^{K2}$ or at least one second instance of $R^K$ of the second monomer is

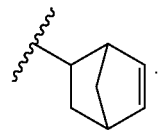 [SMILES: *C1CC2C=CC1C2]

In certain embodiments, at least one instance of $R^{K2}$ or at least one second instance of $R^K$ of the second monomer is -(substituted or unsubstituted, $C_{1-10}$ alkylene)-(substituted or unsubstituted, partially unsaturated carbocyclyl). In certain embodiments, at least one instance of $R^{K2}$ or at least one second instance of $R^K$ of the second monomer is -(unsubstituted $C_{1-10}$ alkylene)-(substituted or unsubstituted carbocyclyl that comprises only one unsaturated bond in the carbocyclic ring system).

In certain embodiments, at least one instance of $R^{K2}$ is substituted or unsubstituted heterocyclyl or -$L^{K2}$-(substituted or unsubstituted heterocyclyl). In certain embodiments, at least one instance of $R^{K2}$ is substituted or unsubstituted heterocyclyl that comprises O—Si in the heterocyclic ring system or -$L^{K2}$-(substituted or unsubstituted heterocyclyl that comprises O—Si in the heterocyclic ring system). In certain embodiments, at least one instance of $R^{K2}$ or at least one second instance of $R^K$ of the second monomer is -(substituted or unsubstituted, $C_{1-10}$ alkylene)-(substituted or unsubstituted heterocyclyl). In certain embodiments, at least one instance of $R^{K2}$ or at least one second instance of $R^K$ of the second monomer is -(substituted or unsubstituted, $C_{1-10}$ alkylene)-(substituted or unsubstituted heterocyclyl that comprises O—Si in the heterocyclic ring system). In certain embodiments, at least one instance of $R^{K2}$ is:

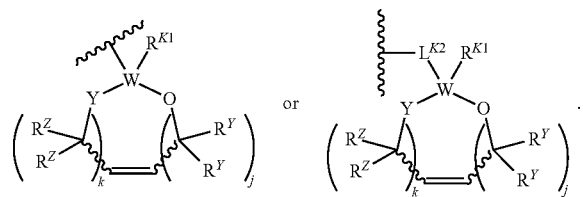

In certain embodiments, at least one instance of $R^{K2}$ or at least one second instance of $R^K$ of the second monomer is -(substituted or unsubstituted phenylene)-(substituted or unsubstituted, partially unsaturated heterocyclyl). In certain embodiments, at least one instance of $R^{K2}$ or at least one second instance of $R^K$ of the second monomer is -(substituted or unsubstituted phenylene)-(substituted or unsubstituted heterocyclyl that comprises only one unsaturated bond in the heterocyclic ring system). In certain embodiments, at least one instance of $R^{K2}$ or at least one second instance of $R^K$ of the second monomer is -(substituted or unsubstituted phenylene)-(substituted or unsubstituted, partially unsaturated heterocyclyl that comprises O—Si in the heterocyclic ring system). In certain embodiments, at least one instance of $R^{K2}$ or at least one second instance of $R^K$ of the second monomer is -(substituted or unsubstituted phenylene)-(substituted or unsubstituted heterocyclyl that comprises O—Si and only one unsaturated bond in the heterocyclic ring system).

In certain embodiments, at least one instance of $R^{K2}$ or at least one second instance of $R^K$ of the second monomer is

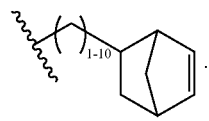

In certain embodiments, at least one instance of $R^{K2}$ or at least one second instance of $R^K$ of the second monomer is

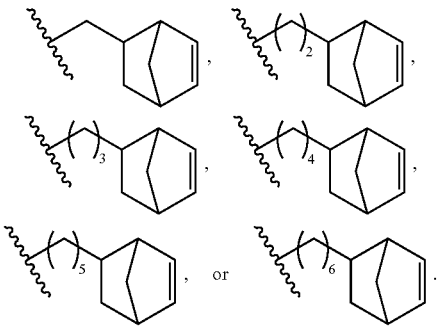

In certain embodiments, at least one instance of $R^{K2}$ or at least one second instance of $R^K$ of the second monomer is hydrogen. In certain embodiments, at least one instance of $R^{K2}$ is —$OR^{N2}$ (e.g., —O(substituted or unsubstituted, $C_{1-10}$ alkyl)).

In certain embodiments, at least one instance of $R^{N2}$ is substituted or unsubstituted, $C_{1-10}$ alkyl. In certain embodiments, at least one instance of $R^{N2}$ is unsubstituted $C_{1-6}$ alkyl.

In certain embodiments, at least one instance of $L^{K2}$ is —O— or substituted or unsubstituted, $C_{1-10}$ alkylene. In certain embodiments, at least one instance of $L^{K2}$ is unsubstituted $C_{1-6}$ alkylene. In certain embodiments, at least one instance of $L^{K2}$ is substituted or unsubstituted phenylene.

In certain embodiments, at least one second instance of $R^K$ of the second monomer is substituted or unsubstituted, $C_{1-10}$ alkyl. In certain embodiments, at least one second instance of $R^K$ of the second monomer is unsubstituted methyl, unsubstituted ethyl, unsubstituted propyl (e.g., unsubstituted n-propyl or unsubstituted isopropyl), or unsubstituted butyl (e.g., unsubstituted n-butyl). In certain embodiments, at least one second instance of $R^K$ of the second monomer is substituted or unsubstituted phenyl. In certain embodiments, at least one second instance of $R^K$ of the second monomer is —$OR^N$ (e.g., —O(substituted or unsubstituted, $C_{1-10}$ alkyl)).

In certain embodiments, $R^{K1}$ and $R^{K2}$ of at least one instance of the second monomer are joined with the intervening atom to form substituted or unsubstituted, partially unsaturated carbocyclyl. In certain embodiments, $R^{K1}$ and $R^{K2}$ of at least one instance of the second monomer are joined with the intervening atom to form substituted or unsubstituted, monocyclic carbocyclyl that comprises only one unsaturated bond in the carbocyclic ring system. In certain embodiments, $R^{K1}$ and $R^{K2}$ of at least one instance of the second monomer are joined with the intervening atom to form unsubstituted cyclobutenyl, unsubstituted cyclopentenyl, unsubstituted cyclohexenyl, or unsubstituted cycloheptenyl. In certain embodiments, $R^{K1}$ and $R^{K2}$ of at least one instance of the second monomer are joined with the intervening atom to form substituted or unsubstituted, monocyclic carbocyclyl that comprises only two unsaturated bonds in the carbocyclic ring system. In certain embodiments, $R^{K1}$ and $R^{K2}$ of at least one instance of the second monomer are joined with the intervening atom to form substituted or unsubstituted carbocyclyl that comprises no C=C bonds in the carbocyclic ring system.

In certain embodiments, $R^{K1}$ and $R^{K2}$ of at least one instance of the second monomer are joined with the intervening atom to form substituted or unsubstituted, partially unsaturated heterocyclyl. In certain embodiments, $R^{K1}$ and $R^{K2}$ of at least one instance of the second monomer are joined with the intervening atom to form substituted or unsubstituted, monocyclic heterocyclyl that comprises only one unsaturated bond in the heterocyclic ring system. In certain embodiments, $R^{K1}$ and $R^{K2}$ of at least one instance of the second monomer are joined with the intervening atom to form substituted or unsubstituted, monocyclic heterocyclyl that comprises only two unsaturated bonds in the heterocyclic ring system. In certain embodiments, $R^{K1}$ and $R^{K2}$ of at least one instance of the second monomer are joined with the intervening atom to form substituted or unsubstituted heterocyclyl that comprises no C=C bonds in the heterocyclic ring system.

In certain embodiments, at least one instance of the second monomer comprises only one non-aromatic unsaturated bond. In certain embodiments, each instance of the second monomer comprises only one non-aromatic unsaturated bond. In certain embodiments, at least one instance of the second monomer comprises only two non-aromatic unsaturated bonds.

In certain embodiments, the C=C bond in the heterocyclic ring that comprises O—W—Y is of the (Z)-configuration. In certain embodiments, the C=C bond in the heterocyclic ring that comprises O—W—Y is of the (E)-configuration.

In certain embodiments, at least one instance of the second monomer is of the formula:

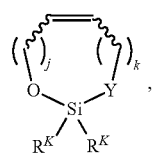

(B)

or a salt thereof.

In certain embodiments, at least one instance of the second monomer is of the formula:

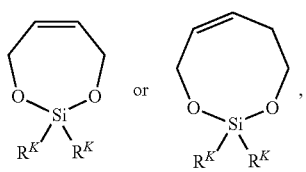

or a salt thereof.

In certain embodiments, at least one instance of the second monomer is of the formula:

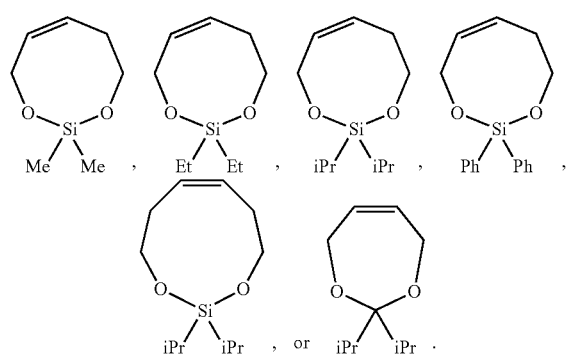

In certain embodiments, at least one instance of the second monomer is of the formula:

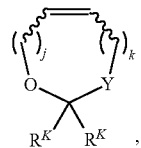

(B1)

or a salt thereof.

In certain embodiments, at least one instance of the second monomer is of the formula:

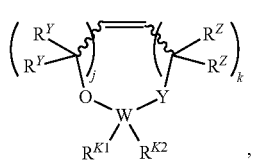

(B2)

or a salt thereof.

In certain embodiments, at least one instance of the second monomer is of the formula:

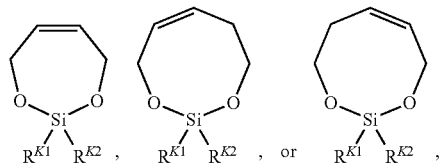

or a salt thereof.

In certain embodiments, at least one instance of the second monomer is of the formula:

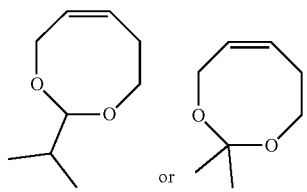

In certain embodiments, at least one instance of the second monomer is of the formula:

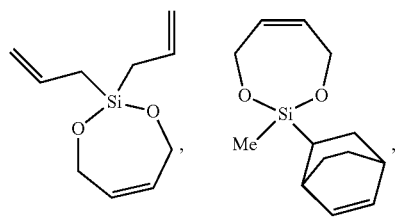

-continued

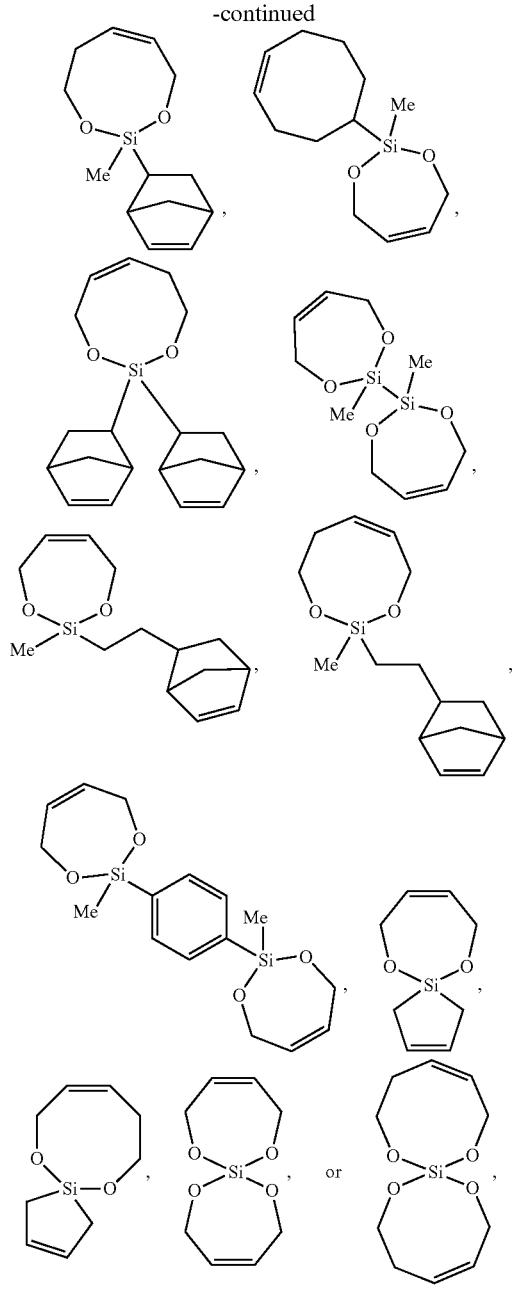

In certain embodiments, at least one instance of the second monomer is of the formula:

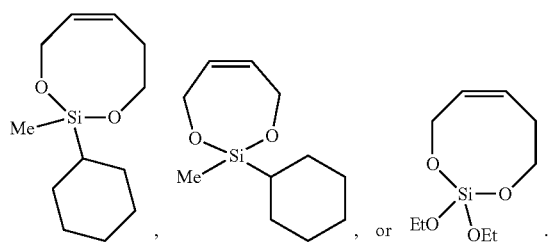

In certain embodiments, at least one instance of the second monomer is of the formula:

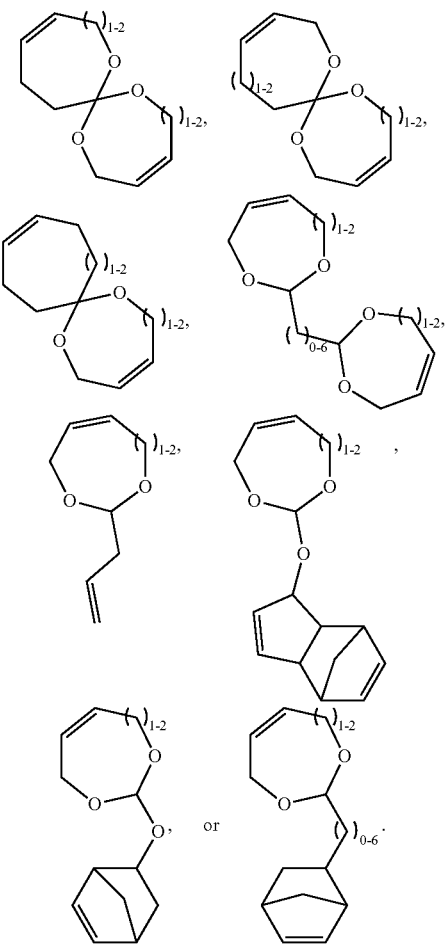

In certain embodiments, the molar ratio of the first monomer to the second monomer is between 1:1 and 100:1, inclusive. In certain embodiments, the molar ratio of the first monomer to the second monomer is between 3:1 and 30:1, inclusive. In certain embodiments, the molar ratio of the first monomer to the second monomer is between 1:1 and 3:1, between 3:1 and 10:1, between 10:1 and 30:1, or between 30:1 and 100:1, inclusive.

In certain embodiments, the method of preparing the copolymer further comprises exposing the copolymer to a solvent.

In certain embodiments, the method of preparing the copolymer further comprises solid-liquid phase separation.

In certain embodiments, the method of preparing the copolymer further comprises curing.

In some embodiments, curing forms a resin. In certain embodiments, curing is carried out at 70 to 150° C., inclusive. In certain embodiments, curing is carried out at 100 to 150° C., inclusive. In certain embodiments, curing is carried out at 100 to 130° C., inclusive. In certain embodiments, curing is carried out at 110 to 120° C., inclusive. In some embodiments, curing is carried out at about 110° C. In some embodiments, curing is carried out at about 120° C. In some embodiments, curing is carried out for 1 minute to 3 hours, inclusive. In some embodiments, curing is carried out for 15 minutes to 1 hour, inclusive. In some embodiments, curing is carried out for 15 minutes. In some embodiments, curing is carried out for 30 minutes. In some embodiments, curing is carried out for 1 hour. In certain embodiments, curing is carried out at ambient pressure. In some embodiments, curing is carried out at lower-than-ambient pressure. In some embodiments, curing is carried out at higher-than-ambient pressure.

The preparation of the copolymers may involve a metathesis reaction. In certain embodiments, the metathesis reaction is a ring-opening metathesis polymerization (ROMP) (see, e.g., Liu et al. *J. Am. Chem. Soc.* 2012, 134, 16337; Liu, J.; Gao, A. X.; Johnson, J. A. *J V is Exp* 2013, e50874).

In certain embodiments, the metathesis catalyst (e.g., ROMP catalyst) is a tungsten (W), molybdenum (Mo), or ruthenium (Ru) catalyst. In certain embodiments, the metathesis catalyst is a ruthenium catalyst. Metathesis catalysts useful in the synthetic methods described herein include catalysts as depicted below, and as described in Grubbs et al., *Acc. Chem. Res.* 1995, 28, 446-452; U.S. Pat. No. 5,811,515; Schrock et al., *Organometallics* (1982) 1 1645; Gallivan et al., *Tetrahedron Letters* (2005) 46:2577-2580; Furstner et al., *J. Am. Chem. Soc.* (1999) 121:9453; and *Chem. Eur. J.* (2001) 7:5299; the entire contents of each of which are incorporated herein by reference.

In certain embodiments, the metathesis catalyst is a ruthenium metathesis catalyst. In certain embodiments, the metathesis catalyst is a Grubbs' catalyst. In certain embodiments, the Grubbs' catalyst is selected from the group consisting of:

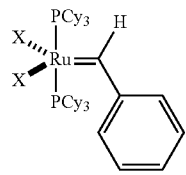

X = Cl; Br; I
Cy = cyclohexyl

Benzylidenebis (tricyclohexylphosphine)dichlororuthenium (X=Cl); Benzylidenebis-(tricyclohexylphosphine)-dibromoruthenium (X=Br); Benzylidenebis-(tricyclohexylphosphine)diiodoruthenium (X=I);

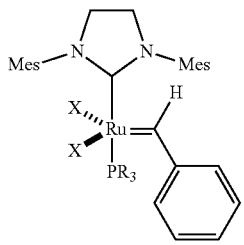

X = Cl; Br; I
R = cyclohexyl (Cy); phenyl (Ph); benzyl (Bn)

1,3-(Bis(mesityl)-2-imidazolidinylidene)dichloro-(phenylmethylene) (tricyclohexyl-phosphine)ruthenium (X=Cl; R=cyclohexyl); 1,3-(Bis(mesityl)-2-imidazolidinylidene)dibromo-(phenylmethylene) (tricyclohexyl-phosphine)ruthenium (X=Br; R=cyclohexyl); 1,3-(Bis(mesityl)-2-imidazolidinylidene)diiodo-(phenylmethylene) (tricyclohexyl-phosphine)ruthenium (X=I; R=cyclohexyl); 1,3-(Bis(mesityl)-2-imidazolidinylidene)dichloro-(phenylmethylene) (triphenylphosphine)ruthenium (X=Cl; R=phenyl); 1,3-(Bis(mesityl)-2-imidazolidinylidene)dichloro-(phenylmethylene) (tribenzylphosphine)ruthenium (X=Cl; R=benzyl);

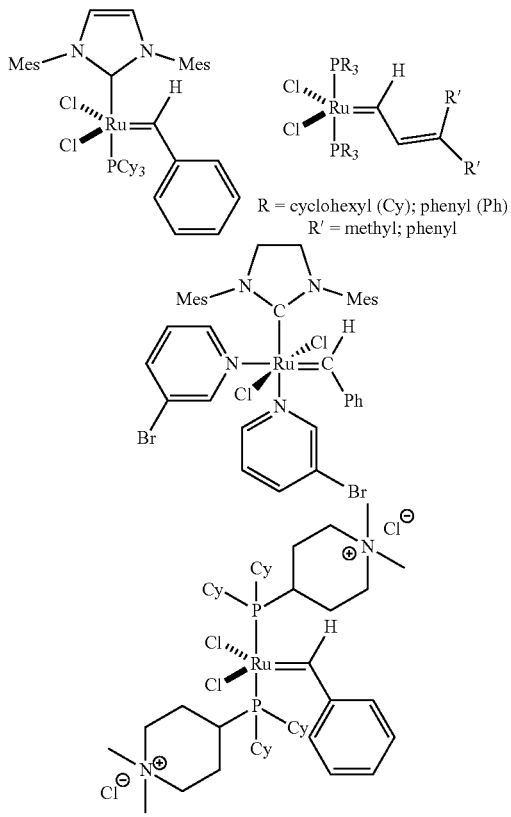

R = cyclohexyl (Cy); phenyl (Ph)
R' = methyl; phenyl

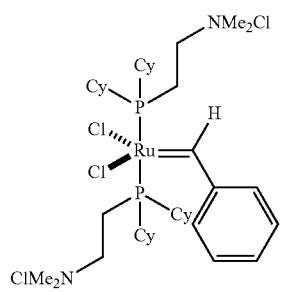

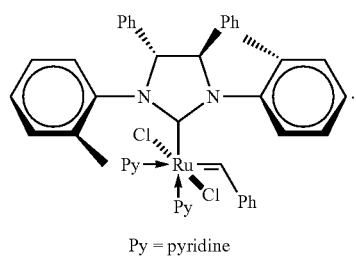

Py = pyridine
Ph = phenyl

In certain embodiments, the metathesis catalyst is a Grubbs-Hoveyda catalyst. In certain embodiments, the Grubbs-Hoveyda catalyst is selected from the group consisting of:

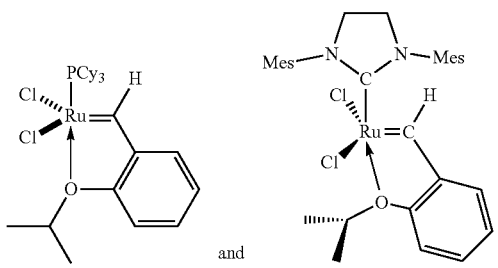

and

In certain embodiments, the metathesis catalyst is selected from the group consisting of:

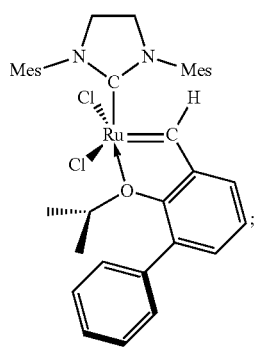

Blechart Catalyst

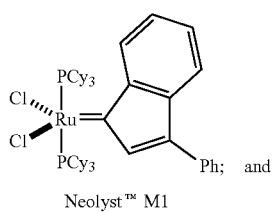

Neolyst™ M1

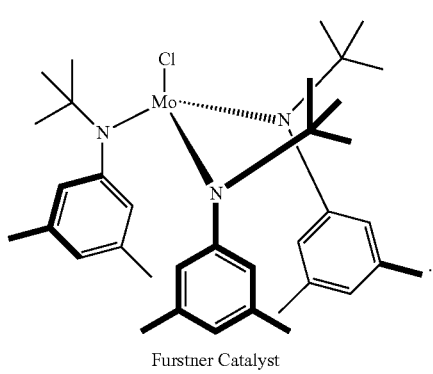

Furstner Catalyst

In certain embodiments, the metathesis catalyst is of the formula:

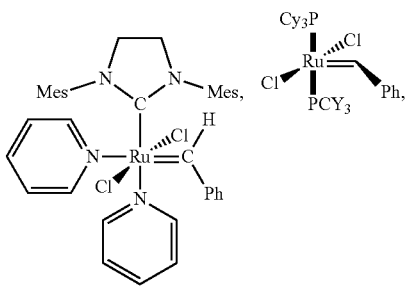

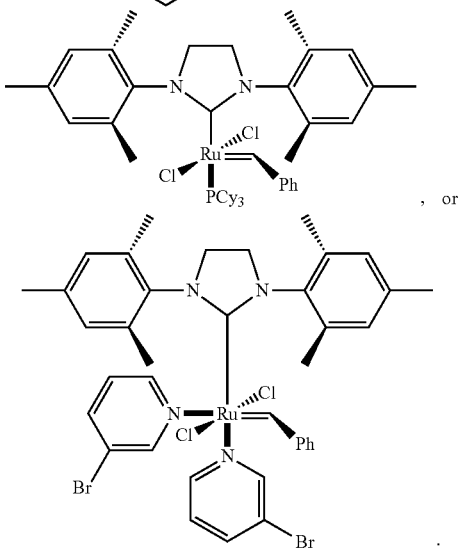

, or

The ROMP can be conducted in one or more aprotic solvents. The term "aprotic solvent" means a non-nucleophilic solvent having a boiling point range above ambient temperature, preferably from about 25° C. to about 190° C. at atmospheric pressure. In certain embodiments, the aprotic solvent has a boiling point from about 80° C. to about 160° C. at atmospheric pressure. In certain embodiments, the aprotic solvent has a boiling point from about 80° C. to about 150° C. at atmospheric pressure. Examples of such solvents are methylene chloride, acetonitrile, toluene, DMF, diglyme, THF, and DMSO.

The ROMP can be quenched with a vinyl ether of the formula

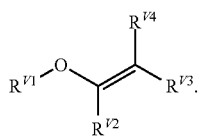

Each of $R^{V1}$, $R^{V2}$, $R^{V3}$, and $R^{V4}$ is independently optionally substituted alkyl, optionally substituted alkenyl, optionally substituted alkynyl, optionally substituted carbocyclyl, optionally substituted phenyl, optionally substituted heterocyclyl, or optionally substituted heteroaryl. In certain embodiments, $R^{V1}$ is optionally substituted alkyl, and $R^{V2}$, $R^{V3}$, and $R^{V4}$ are hydrogen. In certain embodiments, $R^{V1}$ is unsubstituted alkyl, and $R^{V2}$, $R^{V3}$, and $R^{V4}$ are hydrogen. In certain embodiments, $R^{V1}$ is substituted alkyl, and $R^{V2}$, $R^{V3}$, and $R^{V4}$ are hydrogen. In certain embodiments, $R^{V1}$ is methyl, and $R^{V2}$, $R^{V3}$, and $R^{V4}$ are hydrogen. In certain embodiments, $R^{V1}$ is ethyl, and $R^{V2}$, $R^{V3}$, and $R^{V4}$ are hydrogen. In certain embodiments, $R^{V1}$ is propyl, and $R^{V2}$, $R^{V3}$, and $R^{V4}$ are hydrogen. In certain embodiments, $R^{V1}$ is optionally substituted alkenyl, and $R^{V2}$, $R^{V3}$, and $R^{V4}$ are hydrogen. In certain embodiments, $R^{V1}$ is unsubstituted alkenyl, and $R^{V2}$, $R^{V3}$, and $R^{V4}$ are hydrogen. In certain embodiments, $R^{V1}$ is vinyl, and $R^{V2}$, $R^{V3}$, and $R^{V4}$ are hydrogen. In certain embodiments, at least one of $R^{V1}$, $R^{V2}$, $R^{V3}$, and $R^{V4}$ is conjugated with a diagnostic agent as defined above. In certain embodiments, the ROMP is quenched by ethyl vinyl ether. Excess ethyl vinyl ether can be removed from the copolymer by vacuum.

In certain embodiments, the ratio of the combined molar amounts of the first monomer, second monomer, and third monomer if present to the molar amount of the metathesis catalyst is between 500:1 and 1,000:1, between 1,000:1 and 3,000:1, between 3,000:1 and 10,000:1, between 10,000:1 and 30,000:1, between 30,000:1 and 100,000:1, or between 100,000:1 and 500,000:1, inclusive. In certain embodiments, the ratio of the combined molar amounts of the first monomer, second monomer, and third monomer if present to the molar amount of the metathesis catalyst is between 500:1 and 500,000:1, inclusive. In certain embodiments, the ratio of the combined molar amounts of the first monomer, second monomer, and third monomer if present to the molar amount of the metathesis catalyst is between 1,000:1 and 6,000:1, inclusive. In certain embodiments, the ratio of the combined molar amounts of the first monomer, second monomer, and third monomer if present to the molar amount of the metathesis catalyst is between 2,000:1 and 3,000:1, inclusive.

In certain embodiments, the crosslinking degree of the copolymer is between 1% and 10%, between 10% and 20%, between 20% and 30%, between 30% and 40%, or between 40% and 50%, inclusive, mole:mole. In certain embodiments, the crosslinking degree of the copolymer is between 1% and 50%, inclusive, mole:mole. In certain embodiments, the crosslinking degree of the copolymer is between 10% and 30%, inclusive, mole:mole. In certain embodiments, the crosslinking degree of the copolymer is between 15% and 20%, inclusive, mole:mole.

In certain embodiments, the average molecular weight of the copolymer as determined by gel permeation chromatography is between 10 kDa and 100,000 kDa, inclusive. In certain embodiments, the average molecular weight of the copolymer as determined by gel permeation chromatography is between 10 kDa and 100 kDa, between 100 kDa and 1,000 kDa, between 1,000 kDa and 10,000 kDa, between 10,000 kDa and 100,000 kDa, inclusive. In certain embodiments, the average molecular weight of the copolymer as determined by gel permeation chromatography is a number average molecular weight.

In certain embodiments, the copolymer is a random copolymer.

In certain embodiments, the reprocessing catalyst is a Brønsted acid, or a salt thereof. In certain embodiments, the reprocessing catalyst is a Brønsted acid, or a salt thereof, wherein the pKa of the Brønsted acid is between 0 and 6 (e.g., between 0 and 2, between 2 and 4, between 4 and 6), inclusive, as determined at about 20° C. in an aqueous solution. In certain embodiments, the reprocessing catalyst is selected from the group consisting of sulfonic acids, sulfinic acids, sulfonamides, sulfinimides, phosphoric acids, phosphonic acids, tetrazoles, and salts thereof. In certain embodiments, the reprocessing catalyst is a sulfonic acid. In certain embodiments, the reprocessing catalyst is camphor sulfonic acid. In certain embodiments, the reprocessing catalyst is a carboxylic acid. In certain embodiments, the reprocessing catalyst is a salt of a carboxylic acid. In certain embodiments, the reprocessing catalyst is an alkali metal salt, alkaline earth metal salt, or $NH_4^+$ salt, of a carboxylic acid. In certain embodiments, the reprocessing catalyst is an unsubstituted $C_{2-20}$ alkanoic acid. In certain embodiments, the reprocessing catalyst is unsubstituted n-octanoic acid. In certain embodiments, the reprocessing catalyst is a salt (e.g., alkali metal salt) of unsubstituted n-octanoic acid. In certain embodiments, the reprocessing catalyst is a Lewis acid. In certain embodiments, the reprocessing catalyst is a Lewis acid, and the Lewis acid comprises B(III), Al(III), Sc(III), Ti(IV), Fe(II), Fe(III), Zn(II), or Sn(II). In certain embodiments, the reprocessing catalyst is a Lewis acid, and the Lewis acid does not comprise Zn(II). In certain embodiments, the reprocessing catalyst is a Lewis acid, and the Lewis acid comprises B(III), Al(III), Sc(III), Ti(IV), Fe(II), Fe(III), or Sn(II).

In certain embodiments, the reprocessing catalyst is a Lewis base, or a salt thereof. In certain embodiments, the reprocessing catalyst is a salt of a Lewis base, and the salt of the Lewis base comprises anilinium, pyridinium, triazolium, or imidazolium. In certain embodiments, the reprocessing catalyst is an unsubstituted non-aromatic cyclic amine (e.g., where at least one nitrogen atom is a non-aromatic ring atom). In certain embodiments, the reprocessing catalyst is 1,8-diazabicyclo[5.4.0]undec-7-ene. In certain embodiments, the reprocessing catalyst is an unsubstituted trialkyl amine. In certain embodiments, the reprocessing catalyst is an aromatic amine. In certain embodiments, the reprocessing catalyst is N,N-diisopropylethylamine, 1,5-diazabicyclo(4.3.0)non-5-ene, 2,6-di-tert-butylpyridine, a phosphazene base, lithium diisopropylamide, sodium bis(trimethylsilyl)amide, potassium bis(trimethylsilyl)amide, or lithium tetramethylpiperidide.

In certain embodiments, the reprocessing catalyst is selected from the group consisting of ureas, thioureas, carbamates, thiocarbamates, xanthates, thiocarboxylic acids, dithiocarboxylic acids, and salts thereof. In certain embodiments, the reprocessing catalyst is a urea, thiourea, carbamate, thiocarbamate, or a salt thereof.

In certain embodiments, the reprocessing catalyst is not an ammonium halide. In certain embodiments, the reprocessing catalyst is not zinc triflate, lithium methoxide, tetra-n-butylammonium fluoride, ammonium chloride, or zinc acetylacetonate. In certain embodiments, the reprocessing catalyst is not camphor sulfonic acid. In certain embodiments, the reprocessing catalyst is not DBU.

In certain embodiments, the molar ratio of the second monomer to the reprocessing catalyst is between 30:1 and 1:10, inclusive. In certain embodiments, the molar ratio of the second monomer to the reprocessing catalyst is between 30:1 and 10:1, between 10:1 and 3:1, between 3:1 and 1:1, between 1:1 and 0.3:1, or between 0.3:1 and 0.1:1, inclusive.

In certain embodiments, the molar ratio of the second monomer to the reprocessing catalyst is between 5:1 and 1:2, inclusive. In certain embodiments, the molar ratio of the second monomer to the reprocessing catalyst is between 10:3 and 5:6, inclusive. In certain embodiments, the molar ratio of the second monomer to the reprocessing catalyst is between 100:1 and 30:1, between 30:1 and 10:1, between 10:1 and 3:1, between 3:1 and 1:1, or between 1:1 and 0.3:1, inclusive.

EXAMPLES

In order that the invention described herein may be more fully understood, the following examples are set forth. The synthetic and biological examples described herein are offered to illustrate the present disclosure and are not to be construed in any way as limiting their scope.

Example 1: Preparation of Dcpd-Co-Iprsi

Dicyclopentadiene (DCPD) was distilled to remove impurities. DCPD was heated to 40° C. and mixed with iPrSi (either 10% or 20%, v/v), then added to finely powdered Grubbs' 2nd generation catalyst (GII) at a final concentration of 2 mg GII/mL monomer. The resulting mixture was vortexed until all solids were dissolved, then added in 150 µL aliquots to vials and cured at 120° C. for 30 minutes.

Example 2: Remolding of Dcpd-Co-Iprsi

DCPD-co-iPrSi, prepared as described in Example 1, was swollen in THF overnight, finely cut, then dried overnight under vacuum. The dried DCPD-co-iPrSi was then run under a hand grinder to reduce the size further. The ground DCPD-co-iPrSi was then soaked with a reprocessing catalyst (e.g., OA) in THF overnight, after which THF was removed under vacuum, the residue was dried under vacuum at 60° C. overnight. The dried residue was loaded into a sheet mold and hot pressed at the described time, temperature, and pressure. The results showed that the combinations of iPrSi in DCPD-co-iPrSi and the reprocessing catalyst (e.g., OA) allowed DCPD-co-iPrSi to be remolded. These constitute covalent adaptable networks with 100% static crosslinks and no dangling functionalities required for exchange.

Example 3: Set-Up of Small-Molecule Model Exchange Experiments

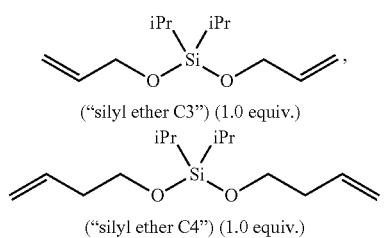

("silyl ether C3") (1.0 equiv.)

("silyl ether C4") (1.0 equiv.)

and octanoic acid (10 mol %) were added to a 4 mL vial, sealed, and heated in a reaction Pie-Block for 18 h. The reaction mixture was cooled, and an aliquot taken and diluted to 50 ppm in DCM for analysis via GC-MS. Exemplary results are shown in FIG. 4C.

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

What is claimed is:

1. A composition comprising:
   a) a copolymer prepared by a method comprising polymerizing in the presence of a metathesis catalyst:
      i) a first monomer, wherein each instance of the first monomer is independently of the formula:

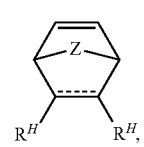

(A)

or salt thereof, wherein:
each instance of Z is independently a single bond, $C(R^P)_2$, or O;
each instance of $R^P$ is independently hydrogen, halogen, or substituted or unsubstituted, $C_{1-6}$ alkyl;
each instance of ---- is independently a single or double bond;
each instance of $R^H$ is independently hydrogen, halogen, substituted or unsubstituted alkyl, substituted or unsubstituted alkenyl, substituted or unsubstituted alkynyl, substituted or unsubstituted carbocyclyl, substituted or unsubstituted heterocyclyl, substituted or unsubstituted aryl, substituted or unsubstituted heteroaryl, —$OR^a$, —OCN, —OC(=O)$R^a$, —OC(=S)$R^a$, —OC(=O)O$R^a$, —OC(=O)N($R^a$)$_2$, —OS(=O)$R^a$, —OS(=O)O$R^a$, —OS(=O)N($R^a$)$_2$, —OS(=O)$_2$$R^a$, —OS(=O)$_2$O$R^a$, —OS(=O)$_2$N($R^a$)$_2$, —OSi($R^a$)$_3$, —OSi($R^a$)$_2$(O$R^a$), —OSi($R^a$)(O$R^a$)$_2$, —OSi(O$R^a$)$_3$, oxo, —N($R^a$)$_2$, —N=C($R^a$)$_2$, =N$R^a$, —NC, —NCO, —N$_3$, —NO$_2$, —N$R^a$C(=O)$R^a$, —N$R^a$C(=O)O$R^a$, —N$R^a$C(=O)N($R^a$)$_2$, —N$R^a$S(=O)$R^a$, —N$R^a$S(=O)O$R^a$, —N$R^a$S(=O)N($R^a$)$_2$, —N$R^a$S(=O)$_2$$R^a$, —N$R^a$S(=O)$_2$O$R^a$, —N$R^a$S(=O)$_2$N($R^a$)$_2$, —S$R^a$, —SCN, —S(=O)$R^a$, —S(=O)O$R^a$, —S(=O)N($R^a$)$_2$, —S(=O)$_2$$R^a$, —S(=O)$_2$O$R^a$, —S(=O)$_2$N($R^a$)$_2$, —Se$R^a$, halogen, —CN, —C(=N$R^a$)$R^a$, —C(=N$R^a$)O$R^a$, —C(=N$R^a$)N($R^a$)$_2$, —C(=O)$R^a$, —C(=O)O$R^a$, —C(=O)S$R^a$, —C(=S)O$R^a$, or —C(=O)N($R^a$)$_2$;
or the two instances of $R^H$ of one or more instances of

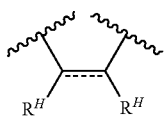

are joined with the intervening carbon atoms to independently form a substituted or unsubstituted, monocyclic carbocyclic ring, substituted or unsubstituted, monocyclic heterocyclic ring, substituted or unsubstituted, monocyclic aryl ring, or substituted or unsubstituted, monocyclic heteroaryl ring; and
each instance of $R^a$ is independently hydrogen, substituted or unsubstituted alkyl, substituted or unsubstituted alkenyl, substituted or unsubstituted alkynyl, substituted or unsubstituted, monocyclic carbocyclyl, substituted or unsubstituted, monocyclic heterocyclyl, substituted or unsubstituted, monocyclic aryl, substituted or unsubstituted, monocyclic heteroaryl, a nitrogen protecting group when attached to a nitrogen atom, an oxygen protecting group when attached to an oxygen atom, or a sulfur protecting group when attached to a sulfur atom, or two instances of $R^a$ are joined to form substituted or unsubstituted heterocyclyl or substituted or unsubstituted heteroaryl;
ii) a second monomer, wherein each instance of the second monomer is independently of the formula:

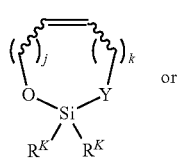

(B)

or

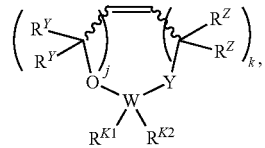

(B2)

or a salt thereof, wherein:
each instance of Y is independently O or $C(R^Q)_2$;
each instance of $R^Q$ is independently hydrogen, halogen, or substituted or unsubstituted, $C_{1-6}$ alkyl;
each instance of $R^K$ is independently hydrogen, halogen, substituted or unsubstituted, $C_{1-10}$ alkyl, substituted or unsubstituted carbocyclyl, substituted or unsubstituted heterocyclyl, substituted or unsubstituted aryl, substituted or unsubstituted heteroaryl, or —$OR^N$;
each instance of $R^N$ is independently hydrogen, substituted or unsubstituted acyl, substituted or unsubstituted, $C_{1-10}$ alkyl, substituted or unsubstituted carbocyclyl, substituted or unsubstituted heterocyclyl, substituted or unsubstituted aryl, substituted or unsubstituted heteroaryl, or an oxygen protecting group;
each instance of j is independently 1, 2, or 3;
in Formula (B), each instance of k is independently 0, 1, 2, or 3; and
in Formula (B2):
W is silicon;
each instance of $R^Y$ is independently hydrogen, halogen, or substituted or unsubstituted, $C_{1-6}$ alkyl;
each instance of $R^Z$ is independently hydrogen, halogen, or substituted or unsubstituted, $C_{1-6}$ alkyl;
$R^{K1}$ is hydrogen, halogen, substituted or unsubstituted, $C_{1-10}$ alkyl, substituted or unsubstituted, $C_{2-10}$ alkenyl, substituted or unsubstituted, $C_{2-10}$ alkynyl, substituted or unsubstituted carbocyclyl, substituted or unsubstituted heterocyclyl, substituted or unsubstituted aryl, substituted or unsubstituted heteroaryl, -$L^{K1}$-(substituted or unsubstituted carbocyclyl), -$L^{K1}$-(substituted or unsubstituted heterocyclyl), -$L^{K1}$-(substituted or unsubstituted aryl), -$L^{K1}$-(substituted or unsubstituted heteroaryl), or —$OR^{N1}$;
$L^{K1}$ is —O—, substituted or unsubstituted, $C_{1-10}$ alkylene, substituted or unsubstituted, $C_{2-10}$ heteroalkylene, substituted or unsubstituted carbocyclylene, substituted or unsubstituted heterocyclylene, substituted or unsubstituted arylene, substituted or unsubstituted heteroarylene, or a combination thereof;
$R^{N1}$ is independently hydrogen, substituted or unsubstituted acyl, substituted or unsubstituted, $C_{1-10}$ alkyl, substituted or unsubstituted carbocyclyl, substituted or unsubstituted heterocyclyl, substituted or unsubstituted aryl, substituted or unsubstituted heteroaryl, or an oxygen protecting group;
$R^{K2}$ is halogen, substituted or unsubstituted, $C_{2-10}$ alkenyl, substituted or unsubstituted, $C_{2-10}$ alkynyl, substituted or unsubstituted carbocyclyl, substituted or unsubstituted heterocyclyl, substituted or unsubstituted heteroaryl, -$L^{K2}$-(substituted or unsubstituted carbocyclyl), -$L^{K2}$-(substituted or unsubstituted heterocyclyl), -$L^{K2}$-(substituted or unsubstituted aryl), or —$OR^{N2}$;

$L^{K2}$ is —O—, substituted or unsubstituted, $C_{1-10}$ alkylene, substituted or unsubstituted, $C_{2-10}$ heteroalkylene, substituted or unsubstituted carbocyclylene, substituted or unsubstituted heterocyclylene, substituted or unsubstituted arylene, substituted or unsubstituted heteroarylene, or a combination thereof;

$R^{N2}$ is independently hydrogen, substituted or unsubstituted acyl, substituted or unsubstituted, $C_{1-10}$ alkyl, substituted or unsubstituted carbocyclyl, substituted or unsubstituted heterocyclyl, substituted or unsubstituted aryl, substituted or unsubstituted heteroaryl, or an oxygen protecting group;

or $R^{K1}$ and $R^{K2}$ are joined with the intervening atom to form substituted or unsubstituted carbocyclyl or substituted or unsubstituted heterocyclyl; and each instance of k is independently 1, 2, or 3;

iii) optionally a third monomer, wherein the third monomer is different from the first monomer and the second monomer; and iv) optionally a reprocessing catalyst; and b) optionally a reprocessing catalyst;

wherein the reprocessing catalyst is an unsubstituted $C_{2-20}$ alkanoic acid, a sulfonic acid, a sulfinic acid, a phosphoric acid, a phosphonic acid, a Lewis acid, a Lewis base, a urea, a thiourea, a carbamate, or a thiocarbamate;

provided that:

the reprocessing catalyst is not an ammonium halide; and the composition comprises at least one of the reprocessing catalyst of iv) and the reprocessing catalyst of b).

2. A kit comprising:

a) a copolymer prepared by a method comprising polymerizing in the presence of a metathesis catalyst:

i) a first monomer, wherein each instance of the first monomer is independently of the formula:

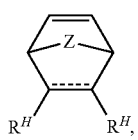

(A)

or salt thereof, wherein:

each instance of Z is independently a single bond, $C(R^P)_2$, or O;

each instance of $R^P$ is independently hydrogen, halogen, or substituted or unsubstituted, $C_{1-6}$ alkyl;

each instance of ---- is independently a single or double bond;

each instance of $R^H$ is independently hydrogen, halogen, substituted or unsubstituted alkyl, substituted or unsubstituted alkenyl, substituted or unsubstituted alkynyl, substituted or unsubstituted carbocyclyl, substituted or unsubstituted heterocyclyl, substituted or unsubstituted aryl, substituted or unsubstituted heteroaryl, —$OR^a$, —OCN, —OC(=O)$R^a$, —OC(=S)$R^a$, —OC(=O)O$R^a$, —OC(=O)N($R^a$)$_2$, —OS(=O)$R^a$, —OS(=O)O$R^a$, —OS(=O)N($R^a$)$_2$, —OS(=O)$_2R^a$, —OS(=O)$_2$O$R^a$, —OS(=O)$_2$N($R^a$)$_2$, —OSi($R^a$)$_3$, —OSi($R^a$)$_2$(O$R^a$), —OSi($R^a$)(O$R^a$)$_2$, —OSi(O$R^a$)$_3$, oxo, —N($R^a$)$_2$, —N=C($R^a$)$_2$, =N$R^a$, —NC, —NCO, —N$_3$, —NO$_2$, —NR$^a$C(=O)$R^a$, —NR$^a$C(=O)O$R^a$, —NR$^a$C(=O)N($R^a$)$_2$, —NR$^a$S(=O)$R^a$, —NR$^a$S(=O)O$R^a$, —NR$^a$S(=O)N($R^a$)$_2$, —NR$^a$S(=O)$_2R^a$, —NR$^a$S(=O)$_2$O$R^a$, —NR$^a$S(=O)$_2$N($R^a$)$_2$, —S$R^a$, —SCN, —S(=O)$R^a$, —S(=O)O$R^a$, —S(=O)N($R^a$)$_2$, —S(=O)$_2R^a$, —S(=O)$_2$O$R^a$, —S(=O)$_2$N($R^a$)$_2$, —Se$R^a$, halogen, —CN, —C(=N$R^a$)$R^a$, —C(=N$R^a$)O$R^a$, —C(=N$R^a$)N($R^a$)$_2$, —C(=O)$R^a$, —C(=O)O$R^a$, —C(=O)S$R^a$, —C(=S)O$R^a$, or —C(=O)N($R^a$)$_2$;

or the two instances of $R^H$ of one or more instances of

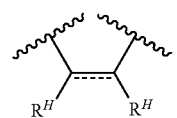

are joined with the intervening carbon atoms to independently form a substituted or unsubstituted, monocyclic carbocyclic ring, substituted or unsubstituted, monocyclic heterocyclic ring, substituted or unsubstituted, monocyclic aryl ring, or substituted or unsubstituted, monocyclic heteroaryl ring; and each instance of $R^a$ is independently hydrogen, substituted or unsubstituted alkyl, substituted or unsubstituted alkenyl, substituted or unsubstituted alkynyl, substituted or unsubstituted, monocyclic carbocyclyl, substituted or unsubstituted, monocyclic heterocyclyl, substituted or unsubstituted, monocyclic aryl, substituted or unsubstituted, monocyclic heteroaryl, a nitrogen protecting group when attached to a nitrogen atom, an oxygen protecting group when attached to an oxygen atom, or a sulfur protecting group when attached to a sulfur atom, or two instances of $R^a$ are joined to form substituted or unsubstituted heterocyclyl or substituted or unsubstituted heteroaryl;

ii) a second monomer, wherein each instance of the second monomer is independently of the formula:

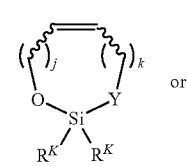

(B)

or

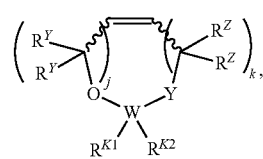

(B2)

or a salt thereof, wherein:

each instance of Y is independently O or $C(R^Q)_2$;

each instance of $R^Q$ is independently hydrogen, halogen, or substituted or unsubstituted, $C_{1-6}$ alkyl;

each instance of $R^K$ is independently hydrogen, halogen, substituted or unsubstituted, $C_{1-10}$ alkyl, substituted or unsubstituted carbocyclyl, substituted or unsubstituted heterocyclyl, substituted or unsubstituted aryl, substituted or unsubstituted heteroaryl, or —$OR^N$;

each instance of $R^N$ is independently hydrogen, substituted or unsubstituted acyl, substituted or unsubstituted, $C_{1-10}$ alkyl, substituted or unsubstituted carbocyclyl, substituted or unsubstituted heterocyclyl, substituted or unsubstituted aryl, substituted or unsubstituted heteroaryl, or an oxygen protecting group;

each instance of j is independently 1, 2, or 3;

in Formula (B), each instance of k is independently 0, 1, 2, or 3; and in Formula (B2):

W is silicon;

each instance of $R^Y$ is independently hydrogen, halogen, or substituted or unsubstituted, $C_{1-6}$ alkyl;

each instance of $R^Z$ is independently hydrogen, halogen, or substituted or unsubstituted, $C_{1-6}$ alkyl;

$R^{K1}$ is hydrogen, halogen, substituted or unsubstituted, $C_{1-10}$ alkyl, substituted or unsubstituted, $C_{2-10}$ alkenyl, substituted or unsubstituted, $C_{2-10}$ alkynyl, substituted or unsubstituted carbocyclyl, substituted or unsubstituted heterocyclyl, substituted or unsubstituted aryl, substituted or unsubstituted heteroaryl, -$L^{K1}$-(substituted or unsubstituted carbocyclyl), -$L^{K1}$-(substituted or unsubstituted heterocyclyl), -$L^{K1}$-(substituted or unsubstituted aryl), -$L^{K1}$-(substituted or unsubstituted heteroaryl), or —$OR^{N1}$;

$L^{K1}$ is —O—, substituted or unsubstituted, $C_{1-10}$ alkylene, substituted or unsubstituted, $C_{2-10}$ heteroalkylene, substituted or unsubstituted carbocyclylene, substituted or unsubstituted heterocyclylene, substituted or unsubstituted arylene, substituted or unsubstituted heteroarylene, or a combination thereof;

$R^{N1}$ is independently hydrogen, substituted or unsubstituted acyl, substituted or unsubstituted, $C_{1-10}$ alkyl, substituted or unsubstituted carbocyclyl, substituted or unsubstituted heterocyclyl, substituted or unsubstituted aryl, substituted or unsubstituted heteroaryl, or an oxygen protecting group;

$R^{K2}$ is halogen, substituted or unsubstituted, $C_{2-10}$ alkenyl, substituted or unsubstituted, $C_{2-10}$ alkynyl, substituted or unsubstituted carbocyclyl, substituted or unsubstituted heterocyclyl, substituted or unsubstituted heteroaryl, -$L^{K2}$-(substituted or unsubstituted carbocyclyl), -$L^{K2}$-(substituted or unsubstituted heterocyclyl), -$L^{K2}$-(substituted or unsubstituted aryl), or —$OR^{N2}$;

$L^{K2}$ is —O—, substituted or unsubstituted, $C_{1-10}$ alkylene, substituted or unsubstituted, $C_{2-10}$ heteroalkylene, substituted or unsubstituted carbocyclylene, substituted or unsubstituted heterocyclylene, substituted or unsubstituted arylene, substituted or unsubstituted heteroarylene, or a combination thereof;

$R^{N2}$ is independently hydrogen, substituted or unsubstituted acyl, substituted or unsubstituted, $C_{1-10}$ alkyl, substituted or unsubstituted carbocyclyl, substituted or unsubstituted heterocyclyl, substituted or unsubstituted aryl, substituted or unsubstituted heteroaryl, or an oxygen protecting group;

or $R^{K1}$ and $R^{K2}$ are joined with the intervening atom to form substituted or unsubstituted carbocyclyl or substituted or unsubstituted heterocyclyl; and each instance of k is independently 1, 2, or 3;

iii) optionally a third monomer, wherein the third monomer is different from the first monomer and the second monomer; and iv) optionally a reprocessing catalyst; and b) a reprocessing catalyst;

wherein the reprocessing catalyst is an unsubstituted $C_{2-20}$ alkanoic acid, a sulfonic acid, a sulfinic acid, a phosphoric acid, a phosphonic acid, a Lewis acid, a Lewis base, a urea, a thiourea, a carbamate, or a thiocarbamate, provided that:

the reprocessing catalyst is not an ammonium halide.

3. A method of preparing the composition of claim 1 comprising mixing the copolymer with the reprocessing catalyst of b).

4. A method of preparing the composition of claim 1 comprising polymerizing:

the first monomer;

the second monomer; and optionally the third monomer;

in the presence of the metathesis catalyst and the reprocessing catalyst of iv).

5. A method of reprocessing the composition of claim 1 comprising:

heating the composition to an elevated temperature, wherein the elevated temperature is between 40 and 400° C., inclusive; and/or pressing the composition to an elevated pressure, wherein the elevated pressure is between 0.1 and 1,000 ton/ft², inclusive;

wherein during a time period between 1 hour and 2 weeks, inclusive, the elevated temperature and/or the elevated pressure are substantially maintained.

6. The composition of claim 1, wherein the reprocessing catalyst is an unsubstituted $C_{2-20}$ alkanoic acid, sulfonic acid, a sulfinic acid, a phosphoric acid, a phosphonic acid, or a Lewis acid.

7. The composition of claim 1, wherein the reprocessing catalyst is an unsubstituted $C_{2-20}$ alkanoic acid.

8. The composition of claim 6, wherein the molar ratio of the second monomer to the reprocessing catalyst is between 30:1 and 1:10, inclusive.

9. The composition of claim 6, wherein at least one instance of Z is $C(R^P)_2$.

10. The composition of claim 9, wherein at least one instance of the first monomer is of the formula:

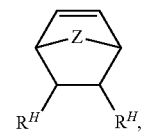

or salt thereof.

11. The composition of claim 9, wherein at least one instance of the first monomer is of Formula (D2):

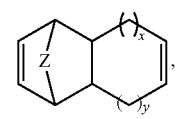

(D2)

or a salt thereof, wherein:

each instance of x is independently 0, 1, or 2; and each instance of y is independently 0, 1, or 2.

12. The composition of claim 6, wherein at least one instance of the first monomer is of the formula:

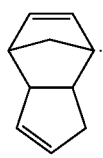

13. The composition of claim 6, wherein each instance of the first monomer is of the formula:

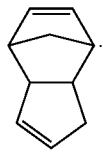

14. The composition of claim 6, wherein at least one instance of the second monomer is of the formula:

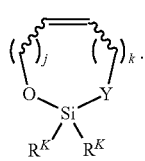
(B)

15. The composition of claim 14, wherein each instance of Y is O.

16. The composition of claim 6, wherein at least one instance of the second monomer is of the formula:

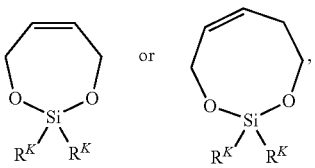

or a salt thereof.

17. The composition of claim 16, wherein at least one instance of $R^K$ is substituted or unsubstituted, $C_{1-6}$ alkyl or substituted or unsubstituted phenyl.

18. The composition of claim 16, wherein each instance of $R^K$ is unsubstituted $C_{1-6}$ alkyl.

19. The composition of claim 6, wherein at least one instance of the second monomer is of the formula:

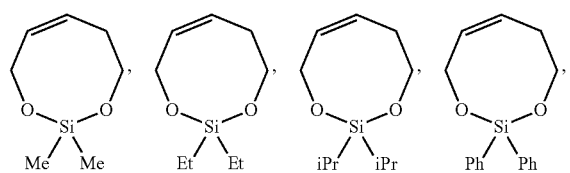

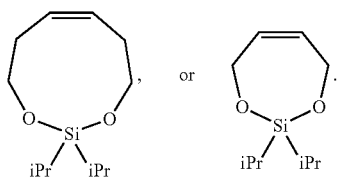

20. The composition of claim 6, wherein each instance of the second monomer is of the formula:

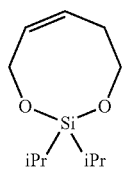

21. The composition of claim 13, wherein each instance of the second monomer is of the formula:

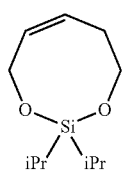

22. The composition of claim 6, wherein the molar ratio of the first monomer to the second monomer is between 3:1 and 30:1, inclusive.

23. The composition of claim 6, wherein the metathesis catalyst is a Grubbs' catalyst.

24. The composition of claim 6, wherein the ratio of the combined molar amounts of the first monomer, second monomer, and third monomer if present to the molar amount of the metathesis catalyst is between 500:1 and 500,000:1, inclusive.

25. The composition of claim 6, wherein the average molecular weight of the copolymer as determined by gel permeation chromatography is between 10 kDa and 100,000 kDa, inclusive.

26. The composition of claim 6, wherein the reprocessing catalyst is unsubstituted n-octanoic acid.

27. The composition of claim 21, wherein the reprocessing catalyst is unsubstituted n-octanoic acid.

28. The composition of claim 6, wherein the reprocessing catalyst is a Lewis acid.

29. The composition of claim 28, wherein the Lewis acid comprises B(III), Al(III), Sc(III), Ti(IV), Fe(II), Fe(III), Zn(II), or Sn(II).

30. The kit of claim 2, wherein the reprocessing catalyst is an unsubstituted $C_{2-20}$ alkanoic acid, sulfonic acid, a sulfinic acid, a phosphoric acid, a phosphonic acid, or a Lewis acid.

31. The kit of claim 2, wherein the reprocessing catalyst is an unsubstituted $C_{2-20}$ alkanoic acid.

32. The kit of claim 2, wherein the reprocessing catalyst is unsubstituted n-octanoic acid.

33. The kit of claim 30, wherein each instance of the first monomer is of the formula:

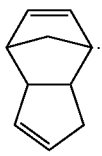

34. The kit of claim 30, wherein each instance of the second monomer is of the formula:

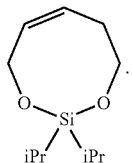

35. The kit of claim 33, wherein each instance of the second monomer is of the formula:

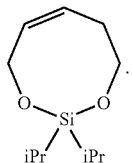

36. The kit of claim 35, wherein the reprocessing catalyst is unsubstituted n-octanoic acid.

\* \* \* \* \*